United States Patent [19]

Satoh

[11] Patent Number: 5,276,875

[45] Date of Patent: Jan. 4, 1994

[54] STATE CONTROL SYSTEM FOR A DISTRIBUTED PROCESSING SYSTEM

[75] Inventor: Yoshiaki Satoh, Kanagawa, Japan

[73] Assignee: Fuji Xerox Co., Ltd., Tokyo, Japan

[21] Appl. No.: 506,601

[22] Filed: Apr. 10, 1990

[30] Foreign Application Priority Data

Apr. 11, 1989 [JP] Japan .................. 1-91531

[51] Int. Cl.⁵ .............................................. G06F 9/00
[52] U.S. Cl. .............................. 395/650; 364/DIG. 1; 364/281.3; 364/281.0; 364/230.0; 364/221.9
[58] Field of Search ....... 395/650; 364/DIG. 2; 281.3; 281.0; 230.0; 221.9

[56] References Cited

U.S. PATENT DOCUMENTS 4,727,548  2/1988  Dickey ................................. 371/49
5,041,866  8/1991  Imoto ................................... 355/38

Primary Examiner—Gareth D. Shaw
Assistant Examiner—A. Katbab
Attorney, Agent, or Firm—Finnegan, Henderson, Farabow, Garrett & Dunner

[57] ABSTRACT

A state control system designed to work in a sequence of processing operations divided into a plurality of states, with jobs specified for performance in each of the states, and to make a transition to the next state on condition that all the jobs have been completed in each state. The state control system comprises a state control section for rewriting a current state on condition that the jobs in the current state have been completed. According to the state control system, the corpulence of only modules which perform control over the jobs and give instructions to the remote units can be prevented. Further, the state control system can make it relatively easy to equalize the sizes of the individual modules, with a reduction in the concentration of the processing operations in some particular modules and also an increase in the independence of the individual modules through establishment of clearly defined roles for the individual modules.

19 Claims, 37 Drawing Sheets

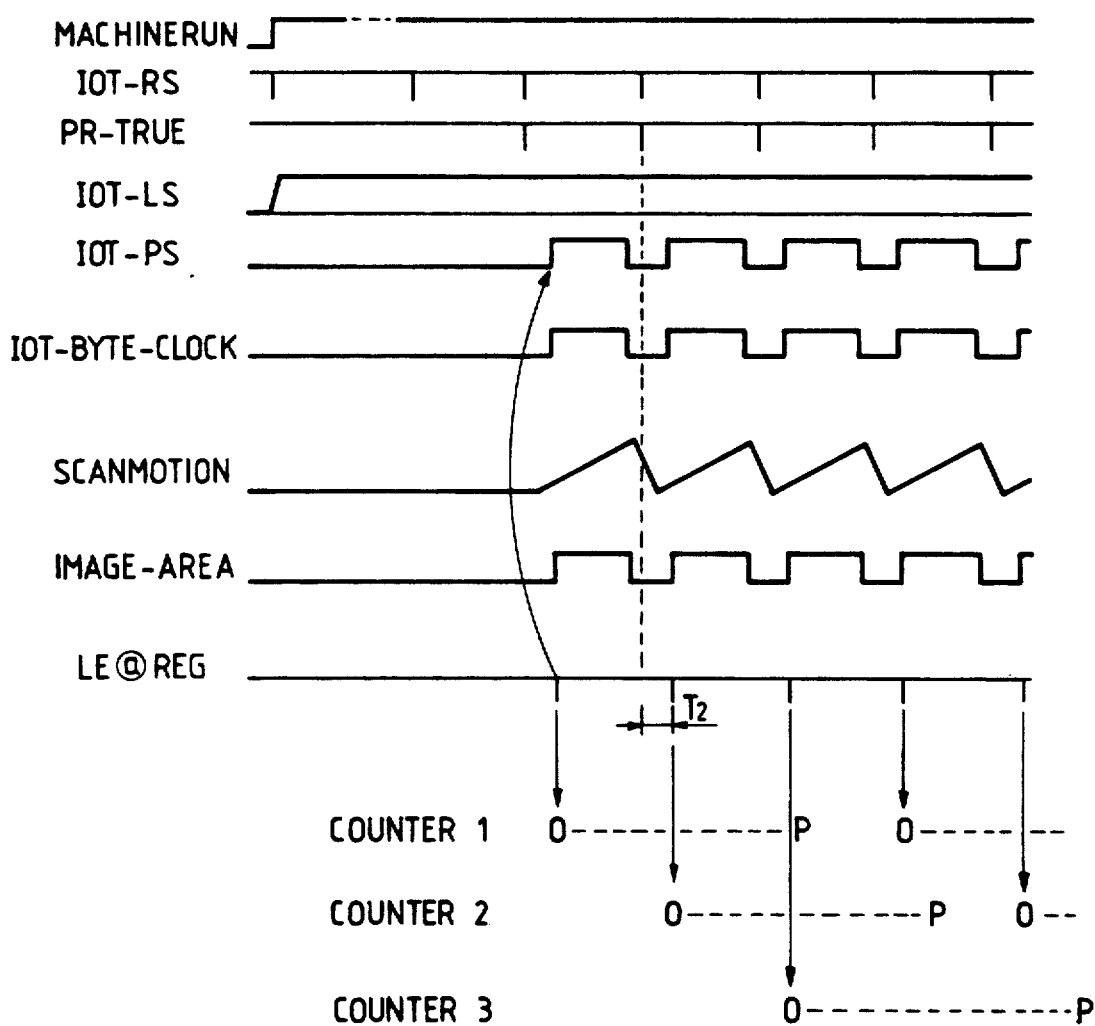

- - - → : SERIAL COMMUNICATION INTERFACE
⟷ : INTERMODULAR COMMUNICATION INTERFACE

| 0 | INITIALIZING |
|---|---|
| 1 | STANDLY |
| 2 | SETUP |
| 3 | CYCLE |
| 4 | DIAGNOSTIC |

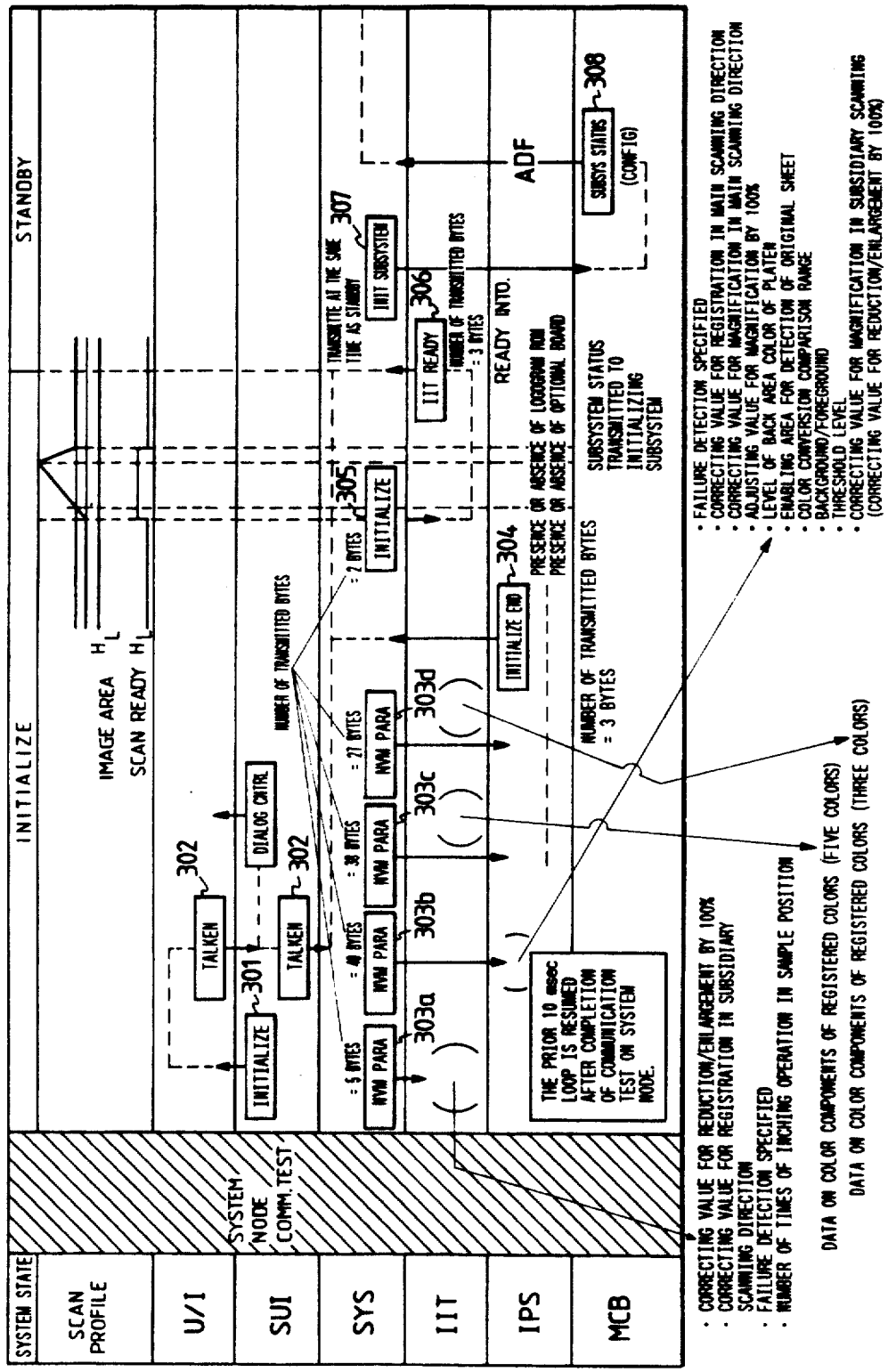

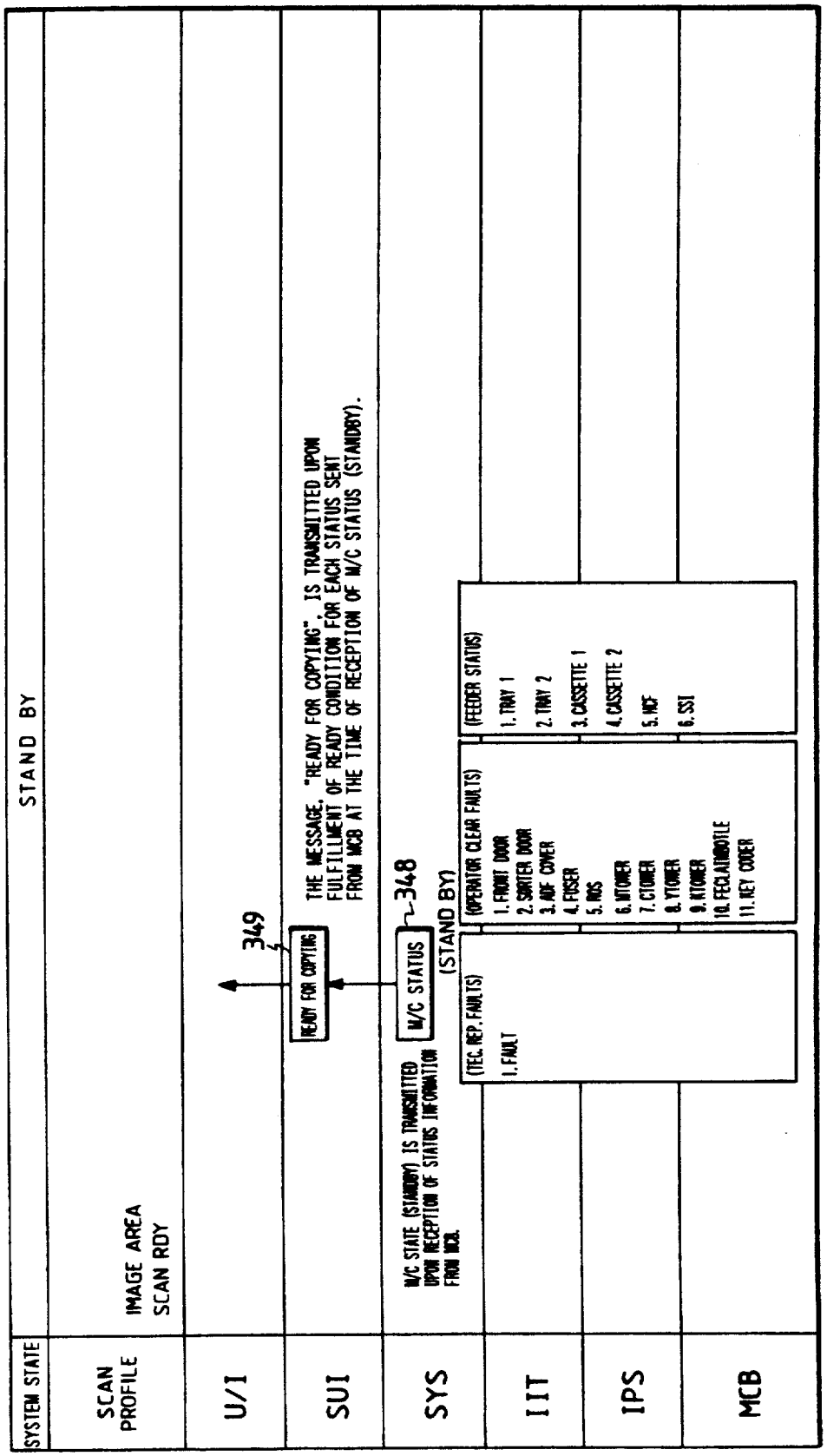

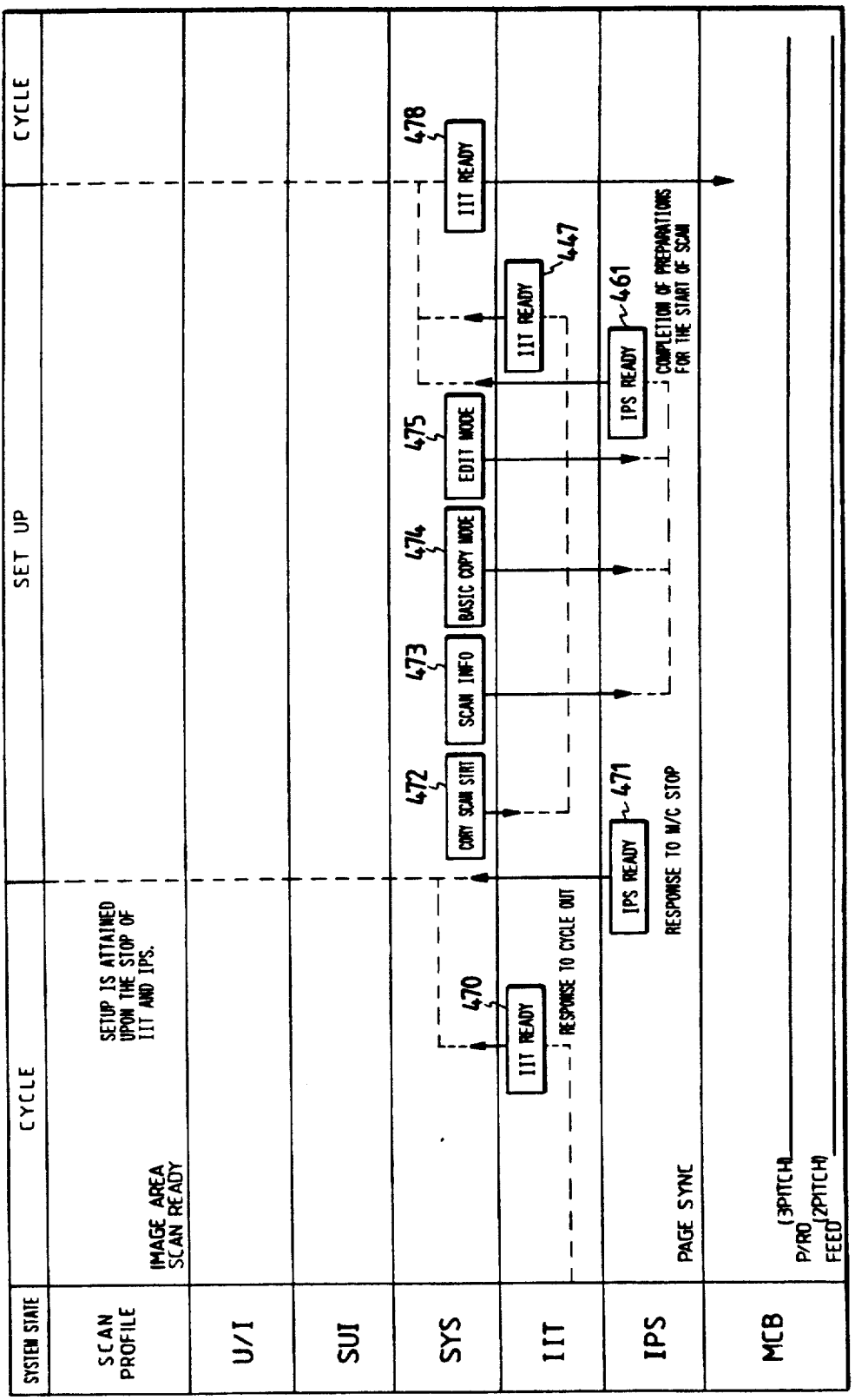

STATE CONTROL SYSTEM FOR A DISTRIBUTED PROCESSING SYSTEM

BACKGROUND OF THE INVENTION

The present invention relates to a state control system in a recording equipment or apparatus incorporating a distributed CPU system.

In such a recording equipment as a copying machine, it has been in practice to employ a distributed CPU system, in which the entire system is divided into a plurality of subsystems, which individually perform their respectively required processes, and a main system performs an overall coordinating control over the operations of such subsystem, thereby integrating them into an organically structured system. In this system, a user interface (U/I), for example, constantly monitors the condition of keys. When the user enters any input with operations on the keys, the U/I judges what job mode has been input, and transmit a signal to the main system. Upon the reception of such a signal, the main system issues instructions to the individual subsystems to make preparations. Then, in response, the subsystems give a command indicating the completion of preparations, and the main system verifies the completion of the preparations by the system as a whole and thereafter gives a command for the execution of the job to the individual subsystems.

In order to perform the processes mentioned above in an unfailing and smooth way, it has also been in practice until the present time to divide the operating sequence into several states and to specify beforehand the processes which the individual subsystems should perform in each state, with such states being controlled by the main system. That is to say, the main system rewrites the state when the process to be executed in a given state has been completed and monitors the status of execution of the process to be performed in the next state. The control of the states in this manner has simplified the overall control of all the subsystems with an effective grasp of the status of the individual subsystems, thereby achieving efficient control over an expanding system and also accomplishing greater accuracy and a higher speed in the execution of the processes by the system as a whole in such a way that this system setup provides adequate means and measures for dealing with the multiple functions incorporated into recording machines or the like and with the higher operating speed of such machines.

Now, the conventional distributed CPU system offers the merit that it can operate with a fewer number of intermodular interfaces since it uses a small number of modules to perform the job control and to give instructions to the individual subsystems as the U/I performs the job control, such as the monitoring of the operations on the keys, the types and substance of the jobs input into the system, and the presence or absence of any contradiction of the job demanded by the input, while the main system issues instructions to the individual subsystems on the basis of the job mode which is transmitted from the U/I and gives execution commands to the individual systems on the basis of the responses from them. Yet, such a system presents the problem that the processing operations are concentrated on the U/I and the main system, with the result that the modules which perform such operations grow considerably large. In addition, the existing system is also faced with the problem that it can not be modified readily because alterations of the specifications require complicated work as an addition, change, or reduction of a given subsystem is necessarily accompanied with modifications of the main system, which gives instructions to the individual subsystems since the main system performs overall control of the entire system. Therefore, it is difficult to improve the productivity of the software, to detect bugs in it and to correct them, and such difficulties present problems from the viewpoint of the manufacturing processes.

The present invention has been made in order to overcome the problems mentioned above.

SUMMARY OF THE INVENTION

The object of this invention consists in realizing a system capable of executing an enormous amount of processing work through distribution of the processes and offering an adequate means of dealing properly with the incorporation of multiple functions, such as full-color reproduction, in image processing equipment.

Another object of this invention is to develop a system whereby the individual modules can pass independent judgment on the commands they receive, so that the interfaces among the modules may be reduced and that the concentration of processing operations on the individual modules may be prevented.

Still another object of this invention is to set the states in their respective correspondence to the modules, thereby increasing the independence of the individual modules and thus making it easier to deal adequately with modifications or the like of the specifications of the system.

In order to accomplish these objectives, the state control system according to the present invention is designed to be a state control system wherein the sequence of the processing operations is divided into a plurality of states, $2a, 2b, \ldots 2n$, as illustrated in FIG. 1, with the jobs to be performed in each of the said states being specified in advance, and a transition to the next state is made on condition that all the jobs in each of the states have been completed. Hence, this state control system is characterized by being provided with a state control section which performs control over the states, and executing the rewriting of the state 2 on condition that the jobs in the current state have been completed.

The present invention establishes a state control system with a construction in which the modules, $1a, 1b, \ldots 1n$, are set in correspondence to the individual modules, and this system design has made it possible to prevent the corpulence of only modules which perform control over the jobs and give instructions to the remote units, as is found to be the case with the existing systems, and has also made it relatively easy to equalize the sizes of the individual modules, with a reduction in the concentration of the processing operations in some particular modules and also an increase in the independence of the individual modules through establishment of clearly defined roles for the individual modules. These features have produced greater ease and facility in making such modifications as the addition, alteration, or elimination of subsystems and have therefore made it possible to deal flexibly with changes in the specifications of the system.

Moreover, the rewriting of the states is effected by rewriting the relevant data in the shared RAM when the conditions of the individual subsystems are fulfilled in the currently activated state, each of the modules making reference to the data as so rewritten and to those modules in pertinent correspondence to the rewritten state being called upon by the main system at the intervals of 10 msec. and being put into an activated status. Hence, this system does not require any special subsystem to control the states and can therefore avoid a condition in which one module grows into an abnormally large size.

In addition, the initialization of the states is executed by utilizing the zero clear operation performed in the RAM test which the monitor conducts when the power is turned on, and it is not necessary for this system to take any special measure in this respect.

Furthermore, the rewriting of a given state to the next state is effected only on the basis of the point whether or not the module activated at the particular moment simply fulfills the requisite conditions, and it is therefore not necessary for the system to perform any constant monitoring on the status of all the subsystems.

BRIEF DESCRIPTION OF THE DRAWINGS

FIGS. 5(a) through 5(e) illustrate the copying layers;

FIG. 15 (b) illustrates the states as written into the shared RAM of the present system;

FIGS. 17(a) through 17(d) illustrate the correlations among the interfaces;

FIGS. 19(a) through 19(e) illustrate the correlations among the interfaces in the manual mode for executing the synthesizing copying process;

DETAILED DESCRIPTION OF THE PREFERRED EMBODIMENT

Reference will now be made in detail to the construction of the state control system according to the present invention as illustrated in the accompanying drawings, in which like reference numbers designate like or corresponding parts throughout the several drawings.

In the description to follow, some preferred embodiments of the present invention will be used as examples. It should be understood, however, that the present invention is not limited to these examples of its preferred embodiment, but may also be applied effectively to other forms of its embodiment to such an extent as will not deviate from the technical scope defined for the present invention. The embodiment described in this specification is divided into the following sections and subsections. Sections I and II present a summary description of the total configuration of the system in a copying machine to which the present invention has been applied. In the context of this overall description, Section III describes in detail some examples of the preferred embodiments of the present invention as realized in the total configuration of the copying machine.

(I) Introduction
(I-1) System Configuration
(I-2) Construction of Electrical Control System
(II) System Details
(III) State Control System

(I) Introduction

(I-1) System Configuration

Figure 1:
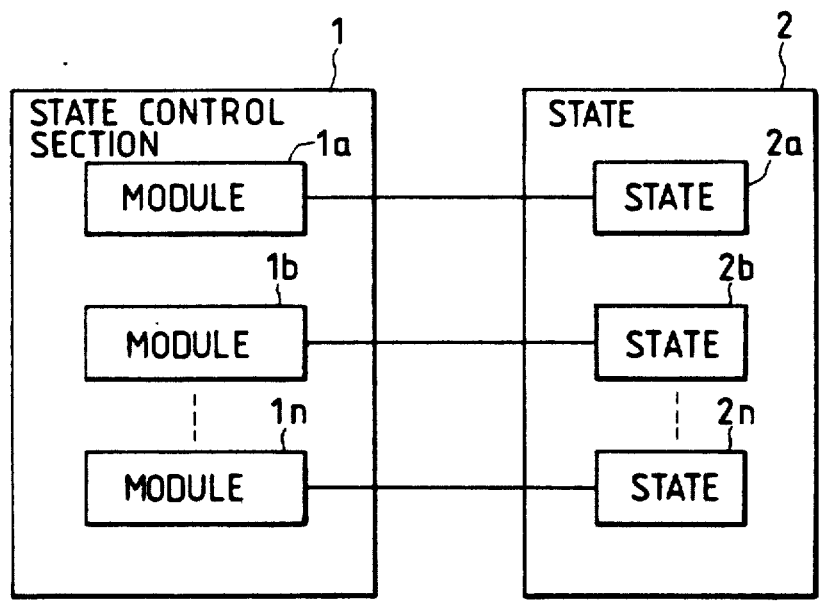
FIG. 1 is a chart illustrating the configuration of the state control system according to the present invention.
Figure 2:
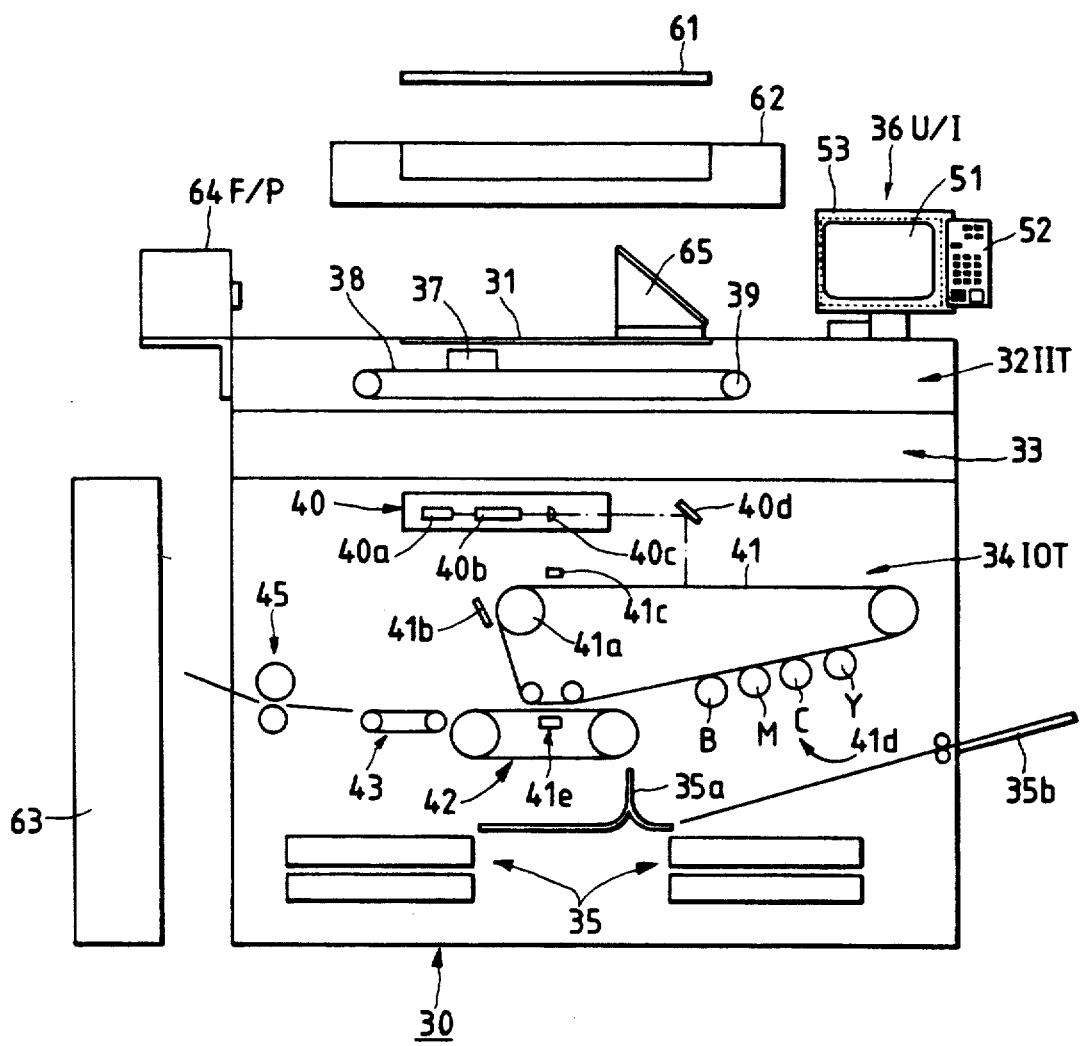
FIG. 2 illustrates one example of the overall construction of the color copying machine to which the present invention has been applied.

FIG. 2 shows one example of the overall configuration of a color copying machine to which this Invention is applied.

In the color copying machine to which this invention is applied, a base machine 30 is composed of a platen glass plate 31, on which the original sheet is placed, an image input terminal (IIT) 32, an electrical control system housing section 33, an image output terminal (IOT) 34, and a paper tray 35, and a user interface (U/I) 36. The base machine 30 is optionally provided with an editing pad 61, an automatic document feeder (ADF) 62, a sorter 63, and a film projector (F/P) 64.

Electrical hardware is required for controlling the IIT, the IOT, the U/I, and so forth mentioned above, and the electrical hardware for these is divided into a plurality of circuit boards for the individual units of the processing operations, such as the IIT, the IPS for processing the image signals output from the IIT, the U/I, and the F/P. These circuit boards are assembled, together with the SYS board for controlling them and the master control board (MCB) for controlling the IOT, the ADF, the sorter, etc., into the electrical control system housing section 33.

The IIT 32 is composed of an imaging unit 37 as well as a wire 38, a driving pulley 39, and so forth, which are used for driving the said imaging unit 37. The IIT 32 reads the color images on an original sheet in the form of image signals in each of the primary colors of light, namely, blue (B), green (G), and red (R), by means of the CCD line sensor and color filters, converts the said image signals into digital image signals, and sends out the said digital image signals to the image processing system (IPS).

In the IPS, the B, G, and R signals mentioned above are transformed into the primary colors of the toner, i.e.

Y (Yellow), C (Cyan), M (Magenta), and K (Black). Then, the IPS performs various forms of data processing on the data so obtained for the purpose of enhancing the reproducing fidelity in terms of coloration, chromatic gradation, precision and fineness, etc. and converts the toner signals of the process color in harmonious gradation into binary toner signals and thereafter outputs the said toner signals to the IOT 34.

The IOT 34, which is provided with a scanner 40 and a photosensitive material belt 41, converts the image signals from the above-mentioned IPS into optical signals in the laser output section 40a and forms a latent image corresponding to the image of the original sheet on the photosensitive material belt 41 by way of the polygon mirror 40b, the f/θ lens 40c, and the reflecting mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, with the transfer unit 42 being rotated four turns, for example, for full-color copying in four full colors. The sheet of paper onto which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the SSI (Single Sheet Inserter) 35b.

The U/I 36 is designed for use by the user to make the selections of the desired functions and to give instructions regarding the conditions for the execution of the selected functions, and this system is provided with a color display unit 51 and a hard control panel 52 installed by the side of the said display unit, and it is further combined with an infrared ray touch board 53, so that instructions can be given directly with the "soft buttons" on the screen.

Next, a description is made of the optional items to be used with the base machine 30. One of the optional items is the editing pad 61, which is an input device based on a system of coordinates and permits the editing of various types of images with an input pen or a memory card when the said editing pad is placed on the platen glass plate 31. Moreover, the base machine 30 is so designed as to accept the installation of the existing ADF 62 and the existing sorter 63.

Furthermore, one of the features characteristic of this example of embodiment is the capability of the system to produce a color copy directly from color film, with a mirror unit (M/U) 65 being mounted on the platen glass plate 31, the film image being projected onto the said unit from the F/P 64, and the projected image being read as image signals by means of the imaging unit 37 of the IIT 32. Negative film, positive film, and slides can be used as the original sheet materials for this process, and this unit is provided with an automatic focusing device and an automatic changing device for the rectifying filter.

(I-2) Construction of Electrical Control System

This Section presents a description with respect to the hardware architecture, the software architecture, and the division of states.

(A) Hardware Architecture and Software Architecture

In case a color CRT is used as a user interface (UI) as is the case with the present system, the amount of data will be increased because of the color displaying features as compared with the case where a monochromatic display is used, and also there will be an increase in the amount of data if it is attempted to construct a user-friendly UI by incorporating into it additional contrivances regarding the composition of the display screen and the transition of the screens.

In dealing with such an increase in the amount of data, it would be possible to employ a CPU mounted with a memory device in a larger capacity, and yet such a step would result in using a larger board, which will present such problems as the difficulty in accommodating it in the main unit of the copying machine, the difficulty in taking flexible measures for dealing with the changes in the specifications, and a resulting increase in the costs.

Therefore, the system according to the present invention has been designed, with respect to this copying machine, to deal adequately with such an increase in the amount of the data by setting up separate CPU's as remote units to form a distributed control system, embodying therein those techniques which can be applied in common to other models or machines, such as the CRT controller.

Figure 3:
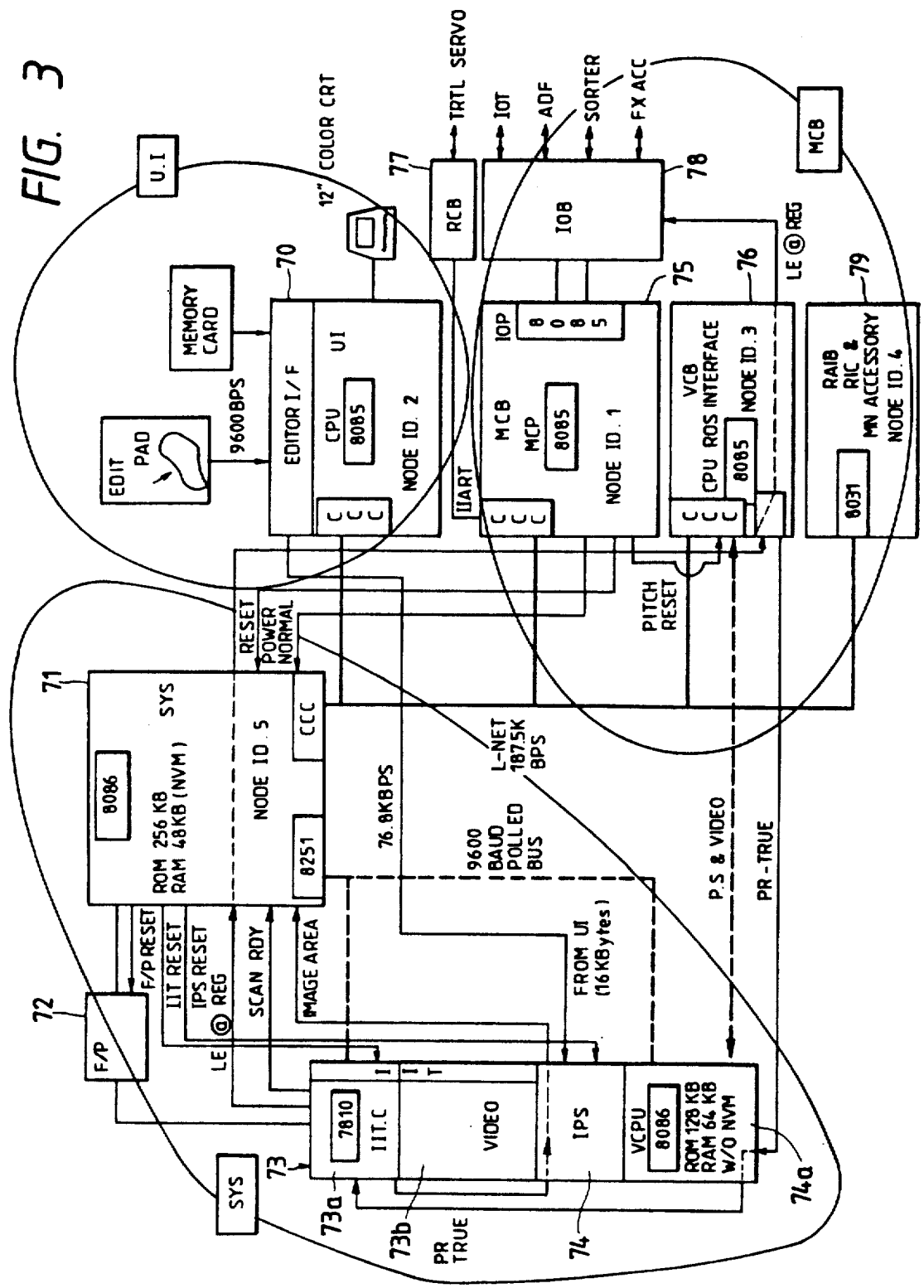
FIG. 3 illustrates the hardware architecture.

The hardware for the electrical system is divided into the three types of systems, namely, the UI system, the SYS system, and the MCB system, as illustrated in FIG. 3. The UI system includes the UI remote unit 70 while the SYS system contains in a distributed architecture the F/P remote unit 72, which performs the control of the F/P, the IIT remote unit 73, which performs the reading of the original sheets, and the IPS remote unit 74, which performs the various forms of the processing of the images. The IIT remote unit 73 is provided with the IIT controller 73a, which performs control over the imaging unit, and the VIDEO circuit 73b, which converts the read image signals into digital signals and transmits them to the IPS remote unit 74, and this IIT remote unit 73, as well as the IPS remote unit 74, is controlled by means of the VCPU 74a. The SYS (System) remote unit 71 is provided in order to function as a system which performs the overall and coordinating control of the above-mentioned remote units and those individual remote units to be mentioned later.

Now that the SYS remote unit 71 is in need of an enormous memory capacity for the execution of such programs as the one for controlling the transition of the screens for the UI, the SYS remote unit 71 is equipped with 8086, which is mounted with a 16-bit microcomputer, and yet a microprocessor other than 8086, i.e. such a microprocessor as 68000, for example, can also be employed.

Moreover, the MCB system is provided with the VCB (Video Control Board) remote unit 76, which is a Raster Output Scan (ROS) interface for receiving the video signals from the IPS remote unit 74 for use of the said signals in the formation of latent images by laser on the photosensitive material belt and for sending forth the said signals to the IOT, with the RCB remote unit 77 for the servo operation of the image transfer device (turtle), further with the IOB remote unit 78 for its operation as the I/0 port for the IOT, the ADF, the sorter, and the accessories, and with the accessory remote unit 79, all of these forming separate units in a distributed system, and the MCB (Master Control Board) remote unit 75 is provided for the purpose of coordinating and controlling all these remote units for the overall system operations.

Furthermore, the individual remote units shown in the Figure are respectively composed of single boards. In this Figure, moreover, the bold solid line represents the LNET high-speed communication network at 187.5 kbps, and the bold broken line indicates the master/slave type serial communication network at 9,600 bps, while the slender solid line indicates the hot line, which is the transmission channel for the control signals. Also, the line marked 76.8 kbps in the Figure is the exclusive-purpose transmission line for use in the issuing of notices of the information on the images drawn on the editing pad, the information on the copying modes as input from the memory card, and the graphic information in the editing area from the UI remote unit 70 to the IPS remote unit 74. Furthermore, the item marked CCC (Communication Control Chip) in the Figure is the integrated circuit (IC) which supports the protocol for the high-speed communication line LNET.

As described in the foregoing part, the architecture of the hardware is divided into the three major systems, which are the UI system, the SYS system, and the MCB system, and the assignment of these processing functions are described in the following part with reference to the software architecture presented in FIG. 4. In this regard, the arrow marks in the Figure represent the relationship of the signals in the transmission and reception of the data by the LNET high-speed communication network at 187.5 bps and the master/slave system serial communication network at 9,600 bps or in the transmission of the control signals as performed via the hot line, as shown in FIG. 3.

The UI remote unit 70 is composed of the LL UI (Low Level UI) module 80 and the module (not shown in the Figure) which performs the processing operations with respect to the editing pad and the memory card. The LL UI module 80 is the same as what is ordinarily known as the CRT controller, and thus it is a software module for displaying the image screen on the color CRT, and hence it is controlled by the SYS UI module 81 or the MCB UI module 86 what picture image screen is to be put on display from time to time. It should be evident from this that this architecture makes it possible to develop the UI remote unit for common use with other models or other equipments. The reason is that the CRT controller is to be used together with the CRT although it differs from one model to another what a screen composition should be used and how the transitions of the screens should take place.

The SYS remote unit 71 is composed of the three modules, i.e. the SYS UI module 81, the SYSTEM module 82, and the SYS. DIAG module 83.

The SYS UI module 81 is a software module which controls the transition of the screens, and the SYSTEM module 82 is a module which contains the software for making the selection of the F/F (Feature Function), by which it is recognized what coordinates on the soft panel have been selected on a given screen, i.e. what job has been selected, the job validation software, by which the job is finally checked to determine whether or not the conditions for the execution of the copying job contain any contradiction, and the software for controlling the communications with the other modules for the transmission and reception of such various types of information on the selection of the F/F, the job recovery, and the machine state.

The SYS. DIAG module 83 is the module which operates in the customer simulation mode, in which the machine performs its copying operation in the diagnostic state for conducting a self-diagnosis. As the customer simulation mode is put into action for performing the same operations as in the ordinary copying process, and the SYS. DIAG module 83 is thus the same in substance as the SYSTEM module 82, but, since it is used in the diagnostic state, which is a special state, this module is described separately from, but in partial overlapping with, the SYSTEM module 82.

Moreover, the IIT remote unit 73 accommodates the IIT module 84, which performs the control of the stepping motor used for the imaging unit, and the IPS remote unit 74 accommodates the IPS module 85, which performs the various processing operations concerning the IPS, and these modules are controlled by the SYSTEM module 82.

In the meanwhile, the MCB remote unit 75 accommodates the individual software modules, i.e. the MCB UI module 86, which is a software for controlling the transition of screens in the diagnostic mode, in the Auditron mode, and in case of any fault, such as jamming, the IOT module 90, which performs such processing operations necessary for the performance of the copying operations as the control of the photosensitive material belt, the control of the developing agent, and the control of the fuser, the ADF module 91, which performs the control of the ADF, and the SORTER module 92, which performs the control of the sorter, as well as the copier executive module 87, which performs control over these software modules, and the DIAG. executive module 88, which performs the various kinds of diagnoses, and the Auditron module 89, which performs the processing of the copying charges through its access made to the electronic counter by the cipher numbers.

Moreover, the RCB remote unit 77 accommodates therein the turtle servo module 93, which performs the control of the action of the image transfer device, and the said turtle servo module 93 is placed under the control of the IOT module 90 in order to take charge of the image transferring process of the Xerography cycle. In this regard, the reason why the copier executive module 87 and the DIAG. executive module 83 are overlapping with each other is the same as the reason for the overlapping of the SYSTEM module 82 and the SYS. DIAG module 83.

The assignments of the processing operations mentioned above are now described below with reference to the copying operations. The copying operations show repetitions of quite similar motions except for the differences in the colors developed, and, as illustrated in FIG. 5 (a), the operations can be viewed in terms of several separate layers.

One sheet of copy in color is produced by repeating several times the minimum unit of operation called "pitch". In specific terms, the pitch relates to such actions as how the developing device, the transfer device, and so forth should be operated for the performance of the copying operations for a single color, how the detection of jamming should be performed, and, if the pitch operation is performed with respect to the three colors, Y, M, and C, one sheet of copy in three colors is finished, and, if the said operation is performed for the four colors, Y, M, C, and K, one sheet of full-color copy in the four colors is finished. These form the copying layer, and, in terms of concrete operations, this layer represents the processes performed for transferring the toner for each color onto the paper, thereafter fixing the toner with the fuser, and then discharging the copy from the main unit of the copying machine. The control over the processes up to this point is performed by the copier executive module 87 in the MCB system.

Figure 4:
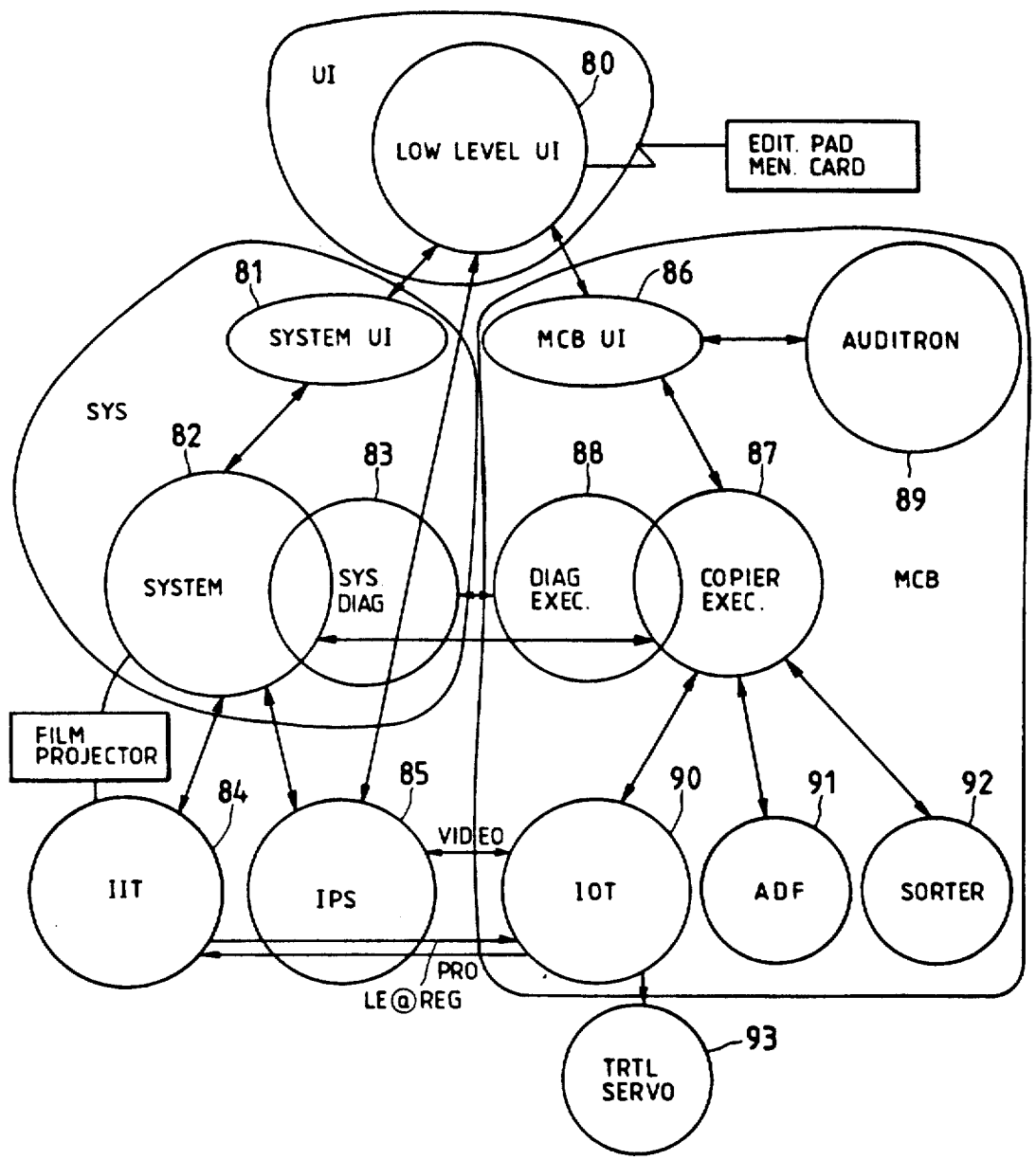
FIG. 4 illustrates the software architecture.
Figure 5A:
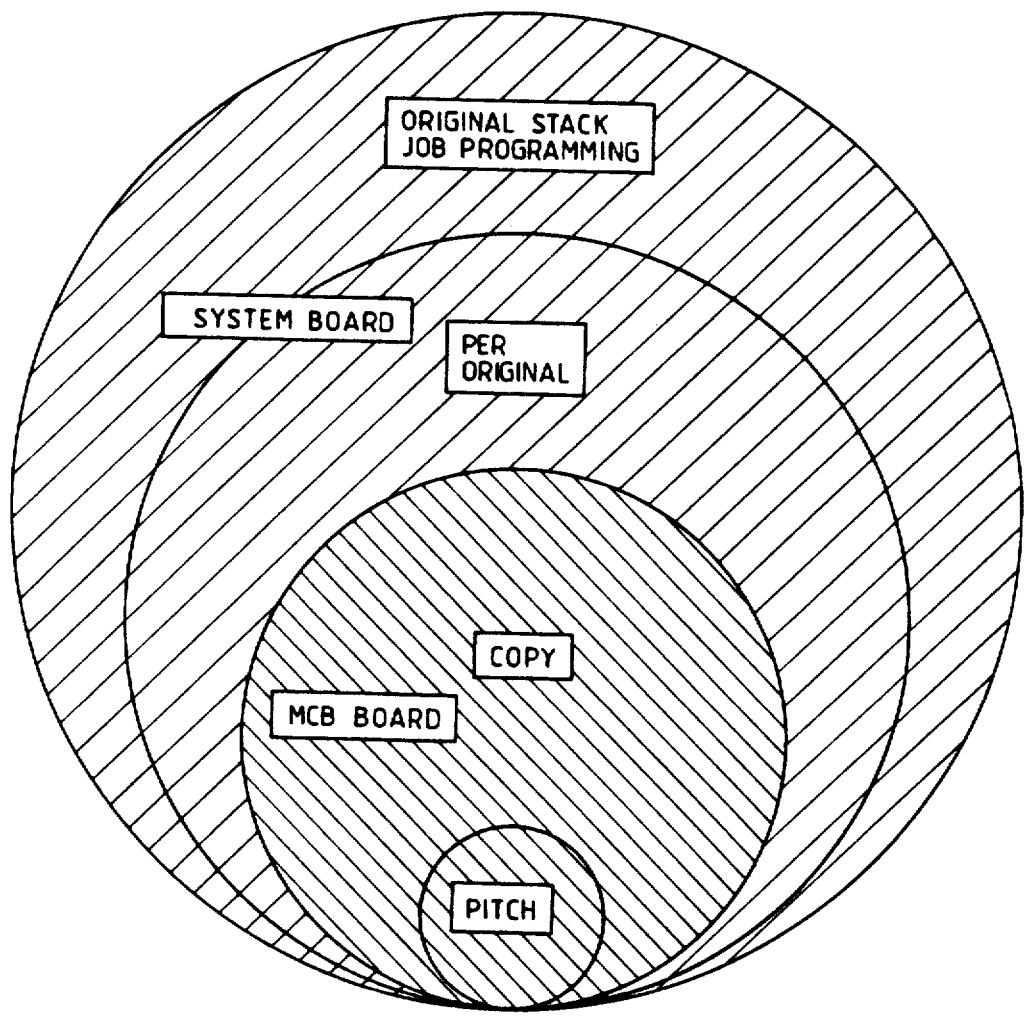
Figure 5B:
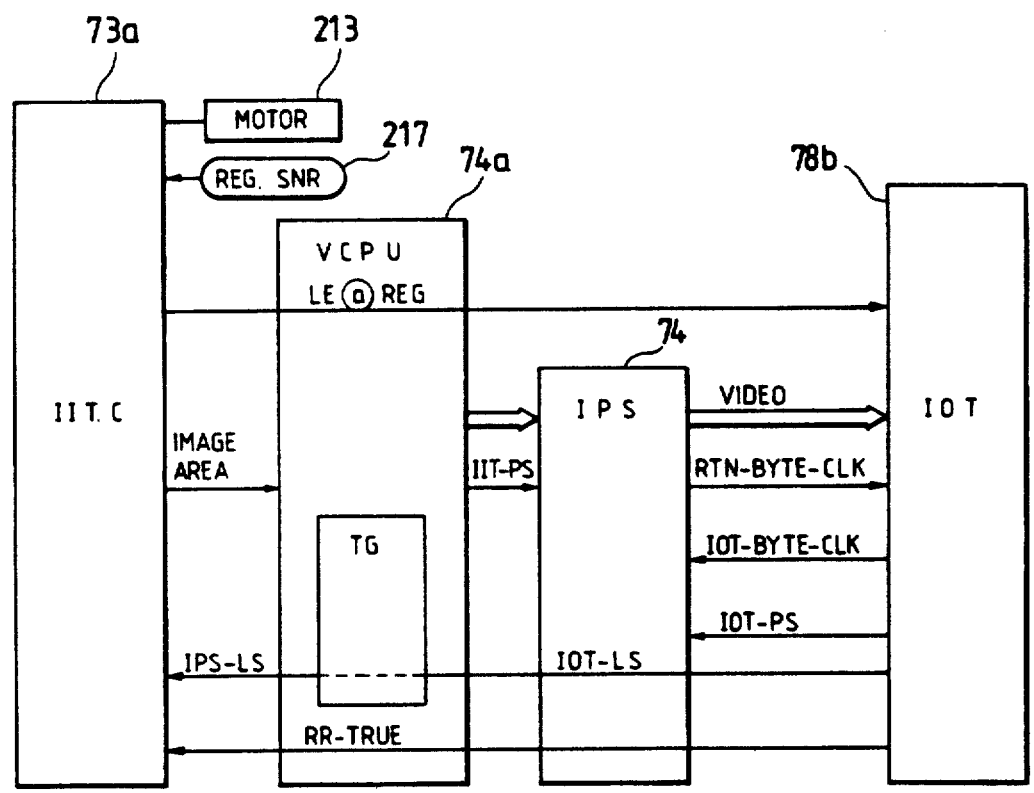
Figure 5D:
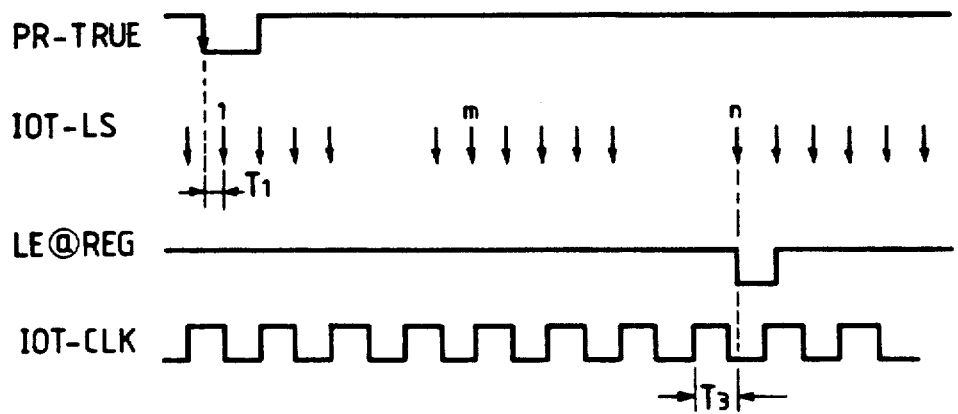
Figure 5E:
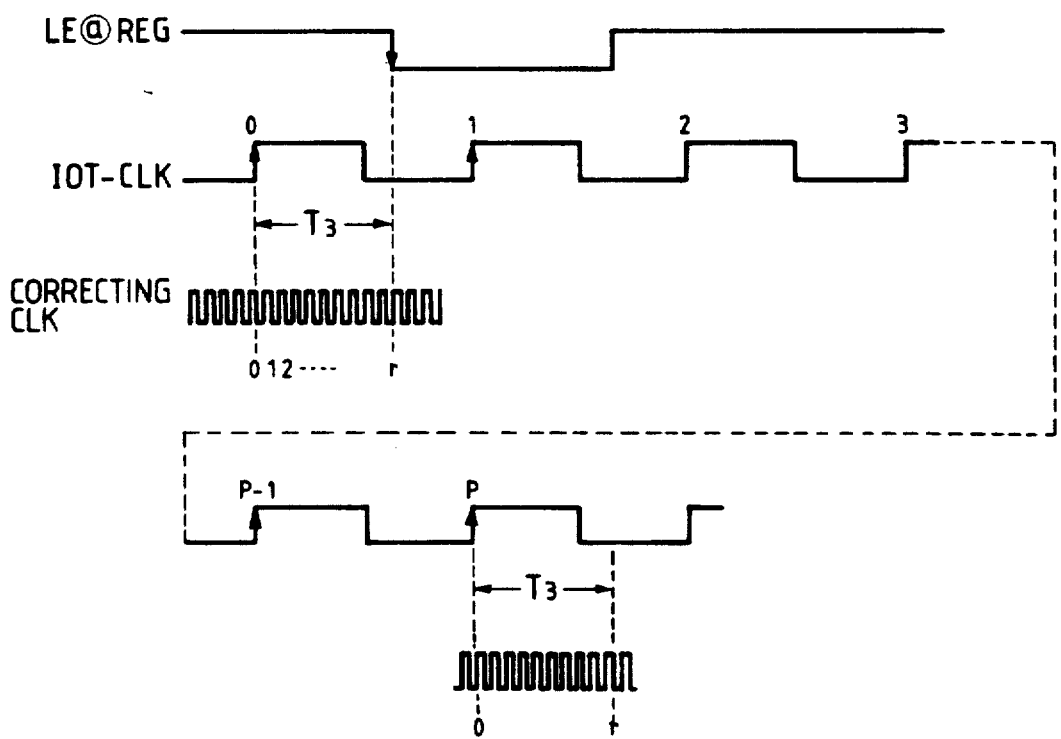

Of course, the IIT module 84 and the IPS module 85, which are included in the SYS system, are also put into action in the process of a pitch processing operation, and, for the purpose of such operations, the exchanges of the two signals called PR-TRUE and LE@REG respectively are performed between the IOT module 90 and the IIT module 84, as shown in FIG. 3 and FIG. 4. Specifically, the PR (PITCH RESET) signal, which sets the standard timing for the control of the IOT, is generated consecutively from the MCB for two or three divided parts of one turn of the photosensitive material belt. That is to say, since the photosensitive material belt is so designed as to be divided for the pitch, depending on the size of the copying paper used, in such a manner as two pitches for the A3-size copying paper and three pitches for the A4-size paper, for example, in order to achieve the highly efficient utilization of the photosensitive material belt and to achieve an improvement on the copying speed, the cycle of the PR signal generated for each pitch will get longer, i.e. three seconds for the copying operations in two pitches, while the cycle of the said signal becomes shorter, i.e. two seconds for the copying operations in three pitches.

Now, the PR signal which is thus generated by the MCB will be distributed by way of the hot line to those necessary locations in the IOT, such as the VCB remote unit, which performs the processing operations related to the VIDEO signals.

The VCB has a gate circuit in it, and it selectively outputs to the IPS remote unit only those pitches which can be used for the imaging process in the IOT, i.e. only those pitches in which the images can actually be given exposure to light for their registration on the photosensitive material belt. This signal is the PR-TRUE signal. In this regard, the information by which this PR-TRUE signal is generated on the basis of the PR signal received from the MCB via the hot line is transmitted from the MCB by the LNET system.

In contrast to this, a vacant pitch for one pitch is produced on the photosensitive material belt in the duration of time when the image cannot be given any exposure for their registration on the photosensitive material belt, and the PR-TRUE signal will not be generated for any such vacant pitch. As the pitches in which the PR-TRUE signal is not generated, it is possible to cite for example, the duration of time from the time of the discharge of the paper from the machine upon the completion of the transfer of images at the transfer device to the time for feeding the next sheet of paper into the transfer device. That is to say, when a lengthy sheet of paper, such as an A3-size sheet, for example, is discharged upon the completion of the final transfer, the paper gives a shock, as its fore edge enters the inlet into the transfer device, to cause some deterioration in the quality of the copied images. Thus, for the paper in excess of a certain length, the system is designed not to discharge the paper as it is even when the final transfer is completed, but to discharge it only after it is transported one more round at a certain speed while it is held in the gripper to be described later. Therefore, it becomes necessary to provide the photosensitive material belt with a skip for one pitch.

Moreover, the PR-TRUE signal is not output in the duration from the start of the copying operation with the start key to the finish of the cycle-up sequence, since the reading of the original sheet is not yet completed in the said duration and since it is consequently not possible to give exposure to the image for registration thereof on the photosensitive material belt.

The PR-TRUE signal output from the VCB remote unit is received by the IPS remote unit and, at the same time, it is also transmitted as it is to the IIT remote unit and used as the trigger signal for the start of the scanning operation in the IIT.

This makes it possible to set the IIT remote unit 73 and the IPS remote unit 74 into its performance of the pitch process in synchronization with the IOT. Also, at this stage, the IPS remote unit 74 and the VCB remote unit 76 perform the transmission and reception of the video signals for performing the modulation of the laser beam to be used for the formation of latent images on the photosensitive material belt, and such signals received by the VCB remote unit 76 are furnished to the laser output section 40a, after they are converted from the parallel signals into serial signals, for use as the VIDEO modulation signals to be fed directly to the ROS.

When the operations described above have been repeated four times, one sheet of full-color copy in four colors is finished, and one copying cycle is thereupon completed.

Next, with reference to the FIG. 5 (b) through (e), a description is made of the exchanges of signals and the timing thereof with respect to the processes leading to the output of the image signals read by the IIT to the IOT and then to the transfer of images onto the paper finally at the transfer point.

As shown in FIGS. 5 (b) and (c), when the start job command is received from the SYS remote unit 71, the IOT 78b enter into the cycle start sequence, with such operating processes as the driving of the main motor and the startup of the high-voltage power source. The IOT 78b outputs the PR (Pitch Reset) signal in order to cause a latent image corresponding to the length of the paper to be formed on the photosensitive material belt. For example, each time the photosensitive material belt turns one round, the IOT 78b outputs a PR signal for three pitches for the A4-size paper and such a signal for two pitches for the A3-size paper. When the cycle start sequence of the IOT 78b is brought to a finish, then a PR-TRUE signal is output, in synchronization with the PR signal as from that point in time, to the IIT controller 73a only in correspondence with the pitches which require imaging.

Moreover, the IOT 78b transmits the IOT-LS (line sink) signal, which is output for each revolution for one line of the ROS (Raster Output Scan) to the TG (Timing Generator) in the VCPU 74a and here transmits to the IIT controller 73a the IPS-LS with an apparent advance of the phase by the amount of lag in the total pipeline in the IPS as compared to the IOT-LS.

Upon the reception of the PR-TRUE signal, the IIT controller 73a enables the counter to count the IOT-LS signal and starts the revolutions of the stepping motor 213, which drives the imaging unit 37, when the signal attains the prescribed number of counts, so that the imaging unit may begin its scanning of the original sheet. Then, the said controller continues to perform the counting process and, after the elapse of T2 seconds, it generates the LE@REG in the position where the reading of the original sheet is started and transmits the same to the IOT 78b.

This position for starting the reading of the original sheet can be determined by driving the imaging unit for one time in advance, for example, after the power is turned on, thereby detecting the position of the register 217 (in the proximity of the register, which specifically is to be found at a point located approximately 10 mm closer towards the scanning side from the position of the register) and thereafter finding the real position of the register by arithmetic operations based on the detected position, and also it is possible to determine the ordinary stopping position (i.e. the home position) by arithmetic operations. Moreover, since the position of the register is different from one machine to another because of the individual differences or deviations among the units, it is possible to set the correct and accurate position for the start of the reading of the original sheet through correction at the time of the calculation of the real position of the register and the home position with the correcting value stored in the NVM. This corrected value can be modified by each factory and each serviceman, and such a correction can be put into practice merely by rewriting this correcting value electrically, and thus it is not necessary to make any mechanical adjustment of the value. In this regard, the reason why the position of the register 217 is set up with a deviation by approximately 10 mm towards the scanning side from the real position of the register is that such an arrangement renders the correction always in a negative value, offering greater simplicity in the adjustment and the software.

Moreover, the IIT controller 73a outputs the IMAGE-AREA signal in synchronization with the LE@REG. The length of this IMAGE-AREA signal is equal to the scanning length, which is defined by the start command transmitted from the SYSTEM module 82 to the IIT module 84. In specific terms, the scanning length corresponds to the length of the original sheet when the copying work is performed through detection of the original sheet size and the said length is set by the divisor for the copying paper length and the magnification (with 100% in magnification taken as 1) in case the copying work is to be performed with a magnification being specified therefor. The IMAGE-AREA signal is channeled via the VCPU 74a, where the said signal has its name changed to the IIT-PS (Page Sink) and is transmitted to the IPS 74. The IIT-PS is a signal indicating the time for the execution of the processing of the image.

When the LE@REG is output, the data for one line of the line sensor is read in synchronization with the IOT-LS signal, and various types of correcting processes and the A/D conversion are performed in the VIDEO circuit (FIG. 3), and the signal so processed is transmitted to the IPS 74, which transmits to the IOT 78b the video data for one line in synchronization with the IOT-LS. At this time, the RTN-BYTE-CLK, which is a reversal signal of the IOT-BYTE-CLK, is transmitted back to the IOT, in parallel with the video data, thereby effecting a delay in the data in the same way as in the clock, so that synchronization can be achieved with certainty.

When the LE@REG is input into the IOT 78b, the video data are transmitted to the ROS in synchronization with the IOT-LS signal in the same manner, and a latent image is formed on the photosensitive material belt. Upon reception of the LE@REG input into it, the IOT 78b starts the counting process with the IOT-CLK, taking the LE@REG as the basis, and on the other hand the servo-motor for the image transfer device is controlled in such a way that the fore edge of the paper is positioned at the image transfer position at the prescribed number of counts. In this regard, the PR-TRUE signal output by the rotation of the photosensitive material belt and the IOT-LS signal output by the rotation of the ROS are originally not in any synchronization with each other. Therefore, the LE@REG will have a lag by the time T1 in relation to the PR-TRUE signal when the LE@REG is output at the count n when the counting process is started from the subsequent IOT-LS with the input of the PR-TRUE signal, putting the imaging unit into operation at the count m. This lag corresponds to an amount for one line sink in the maximum, and, in the case of full-color copying in the four colors, such lags accumulate with the result that such lags express themselves in the form of color deviations in the output image.

In counteraction with this, the counter 1 starts the counting process when the initial LE@REG is input, and the counter 2 and the counter 3 start the counting process when the second LE@REG and the third LE@REG are input, as shown in FIG. 5 (c), and, when the respective counters attain the number of counts p, which marks the position for image transfer, they clear these, so that the counters are employed in the stated order in response to the input of the LE@REG at the fourth time and the subsequent times. And, as shown in FIG. 5 (e), the time T3 from the pulse immediately preceding the IOT-CLK is counted with the correcting clock. When the latent image formed on the photosensitive material belt approaches the image transfer position and when the IOT-CLK has counted the number of counts p, which marks the counts up to the position for image transfer, then the correcting clock thereupon starts the counting process, and the point equivalent to the counts obtained by the addition of the number of counts r, which corresponds to the time T3 mentioned above, will be the exact position for the image transfer. This is placed on the control for the counter for controlling the image transfer position (timing) for the image transfer device, so that the servo-motor for the image transfer device may be accurately controlled so as to achieve the exact synchronization of the fore edge of the paper in relation to the input of the LE@REG.

The operations mentioned so far correspond to the processes leading to the completion of the copying layer, in addition to which there is a process for setting the number of sheets to be copied for each original sheet, i.e. the setting of the number of times of the job to be performed by the copy as the unit for each original sheet, and this is the process to be performed in the Per Original layer. Further, on top of this is the job programming layer, in which the process for making a change in the parameters for the job. Specifically, this process relates to the point whether or not the ADF is to be used, whether or not the color of a part of the original sheet is to be changed, and whether or not the differential magnification function is to be used. These processes, i.e. the per original process and the job programming process, are controlled by the SYS module 82 of the SYS system. For this purpose, the SYSTEM module 82 checks and finally establishes the contents of a job as transmitted from the LL UI module 80, and, preparing the necessary data, gives a notice of the data to the IIT module 84 and the IPS module 85 by the serial communication network at 9,600 bps and also notifies the contents of the job to the MCB system via the LNET.

As mentioned above, those sets of functions which perform independent processes and those which perform the processes that can be planned for common use with other models or other equipments are set up and grouped together to form separate sets of functions assigned to different remote units, and then those separate sets of functions are divided among the major categories of the UI system, the SYS system, and the MCB system, and then the modules which perform control over the copying operations are set up in accordance with the layers of the processes. This approach has made it possible to achieve such meritorious effects as establishing a clearly defined framework for the work of the designing staff, attaining uniformity in the techniques for the development of software and so forth, setting the delivery date and the cost clearly and definitely, and dealing properly with changes or the like in the specifications, if any, by making modifications of the related modules only, thereby making it possible to improve the efficiency in the development work.

(B) Division of States

In the foregoing part, the assignment of the processes to the UI system, the SYS system, and the MCB system have been described, and, in this section, the processes which are performed by the UI system, the SYS system, and the MCB system, respectively, from time to time at each of the copying operations are described with reference to the sequence in which the copying operations are performed.

Figure 6:
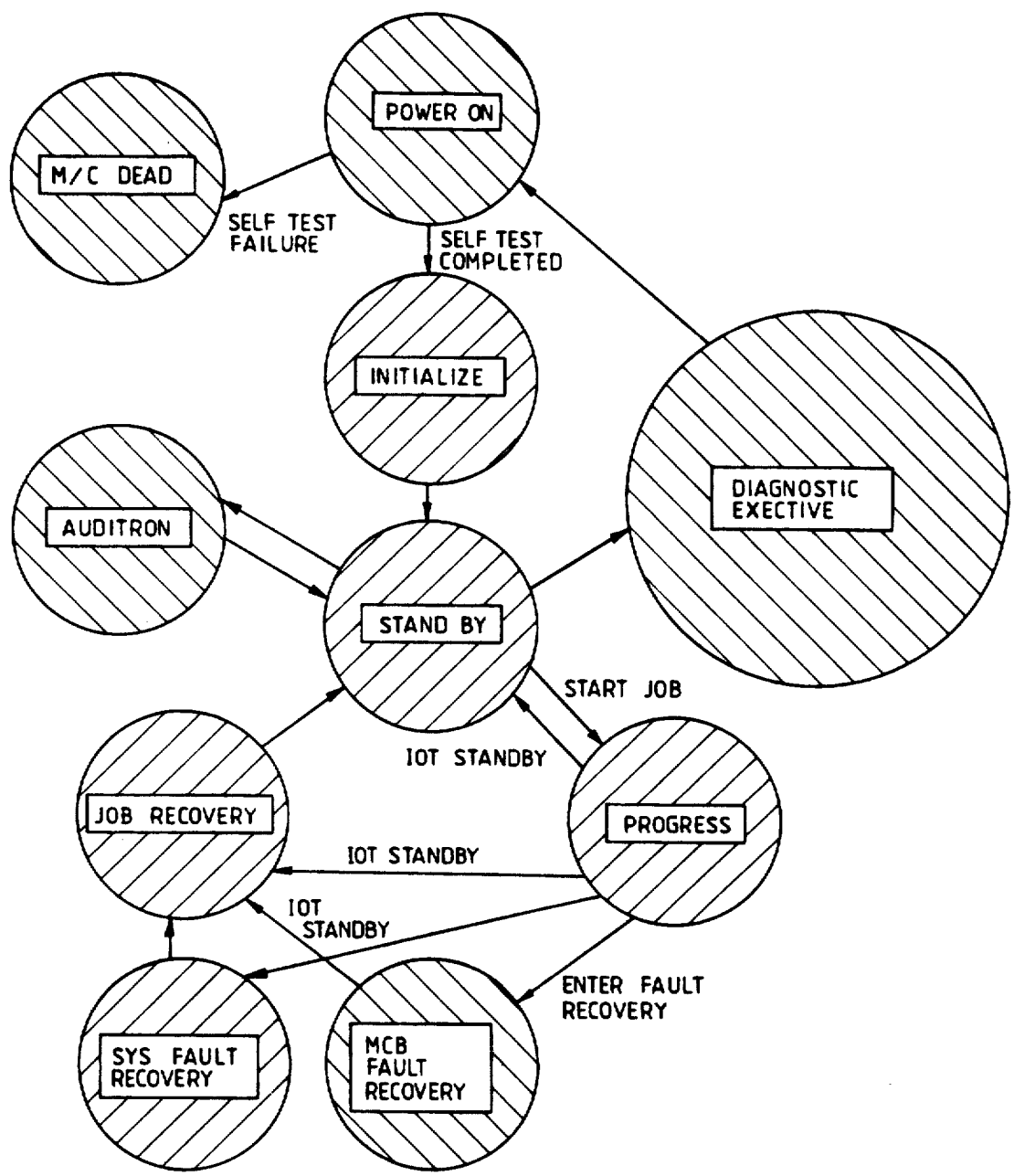
FIG. 6 illustrates the division of states.

For the copying machine, the power-on operation and the subsequent copying operations, as well as the conditions after the completion of the copying operations, are divided respectively into several states, and the jobs performed in each of the states are determined in advance. Then, the system is designed not to move on to the next state unless it has completed all the jobs to be performed in each state, and this feature reflects the endeavor to warrant the expected attainment of efficiency and accuracy in the controlling operations. This is called the state division, and, for this copying machine, the state division has been made as shown in FIG. 6.

What is characteristic of the state division for this copying machine is that, in each state, the controlling authority for performing control over the entirety of a given state and the UI mastering authority for using the UI in the particular state rest with the SYS remote unit 71 at some time but rest with the MCB remote unit 75 at other times. In other words, the division of the operating functions between the separate CPU's as mentioned above produces the effect that the LL UI module 80 in the UI remote unit 70 can be controlled not only by the SYS UI module 81 but also by the MCB UI module 86, and, since the processes are thus assigned to the separate modules, so that the per original process and the job programming process are controlled by the SYS module 82 while the pitch process and the copying process are controlled by the copier executive module 87 in the MCB system, this setup results in the corresponding difference in the point which of the SYSTEM module 82 and the copier executive module 87 holds the overall controlling authority for the controlling operations or holds the UI mastering authority in each state. In FIG. 6, it is shown that the copier executive module 87 in the MCB system has the UI mastering authority over the state represented by the vertical lines while the SYSTEM module 82 has the UI mastering authority over the state represented in solid black.

Figure 7:
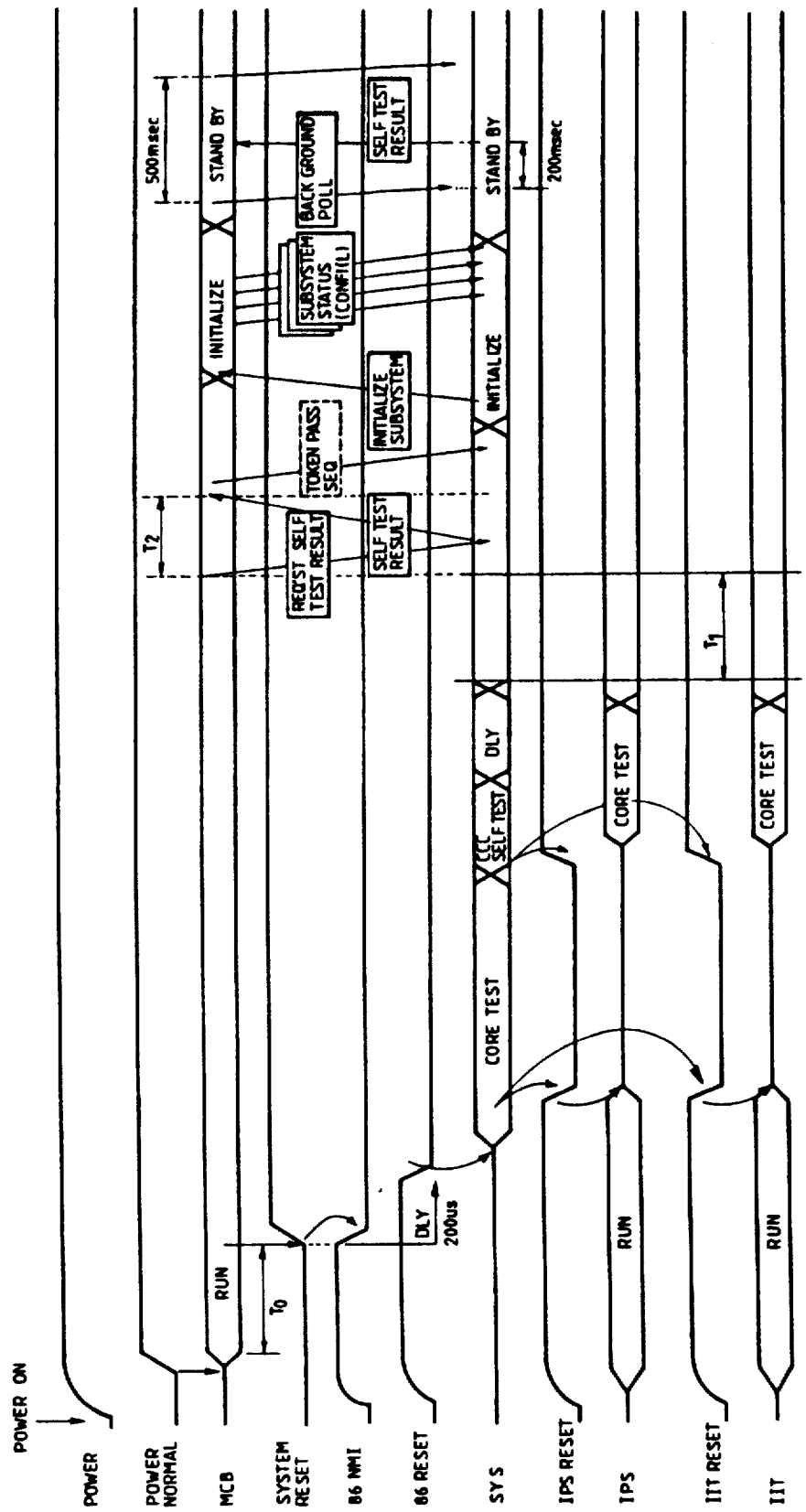
FIG. 7 illustrates the sequence from the power-on state to the standby state.

Of the state divisions shown in FIG. 6, those from the power-on operation to the standby state are explained below with reference to FIG. 7.

When the power source is turned on to set the system in the power-on state, the IPS reset signal and the IIT reset signal to be fed from the SYS remote unit 71 to the IIT remote unit 73 and the IPS remote unit 74, as shown in FIG. 3, become H (HIGH), and thereupon the IPS remote unit 74 and the IIT remote unit 73 are released from resetting and start their respective operations. Moreover, when the system detects that the voltage in the power source has attained its normal level, then the power-normal signal builds up, and the MCB remote unit 5 starts its operation, thereby establishing the controlling authority and the UI mastering authority and also conducting a test on the high-speed communication network LNET. Also, the power-normal signal is transmitted from the MCB remote unit 75 to the SYS remote 71 by way of the hot line.

After the passage of the prescribed length of time TO after the MCB remote unit 75 starts its operation, the system reset signal which is fed from the MCB remote unit 75 to the SYS remote unit 71 via the hot line becomes H, with which the resetting of the SYS remote unit 71 is released and the unit starts its operation, at which time the start of the operation by the SYS remote unit 71 is delayed further by 200 $\mu$sec after the elapse of the above-mentioned time TO by the effect of the two signals, 86NMI and 86 reset, which are signals in the inside of the SYS remote unit 71. This duration of time, 200 $\mu$sec, is provided in order to store in the non-volatile memory the data on the state in which the system is operating at the moment when the machine is brought to a halt or runs out of control because of a transient trouble, such as a crash, a momentary failure of the power source, the running of the software out of control, or a bug in the software.

When the SYS remote unit 71 starts its operation, it conducts a core test for a duration of approximately 3.8 seconds, i.e. checks on the ROM and the RAM, and checks on the hardware and so forth. As any entry of undesired data or the like at this time may cause the system to run out of control, the SYS remote unit 71 sets the IPS reset signal and the IIT reset signal at L (Low) under its own supervisory control at the same time as the start of the core test, thereby resetting the IPS remote unit 74 and the IIT remote unit 73 to suspend them from their operation.

When the core test is completed, the SYS remote unit 71 conducts a CCC self-test for a duration ranging from 10 to 3,100 m seconds, also setting the IPS reset signal and the IIT reset signal at H and making the IPS remote unit 74 and the IIT remote unit 73 resume their operation and perform their respective core tests. The remote unit conducts the CCC self-test by transmitting the prescribed data to the LNET and then receiving the data back to itself, and checking whether the data so received are identical to the data transmitted. Moreover, for the performance of the CCC self-test, a time is allocated to each CCC in such a way that there will not be any overlapping of the periods for the self-tests.

That is to say, the LNET is available by the contention system, by which the individual nodes in the SYS remote unit 71, the MCB remote unit 75, and so forth transmit signals when they desire to and, should there occur any collision of data, transmit the data again after the passage of the prescribed duration of time. Thus, if any other node is using the LNET while the SYS remote unit 71 is conducting any CCC self-test, there occurs a collision of data, so that the self-test cannot be conducted. Therefore, when the SYS remote unit 71 begins any CCC self-test, the LNET test by the MCB remote unit 75 is already completed.

When the CCC self-test is completed, the SYS remote unit 71 waits until the IPS remote unit 74 and the IIT remote unit 73 complete their core tests, and then performs a communication test for the SYSTEM node in the duration T1. This communication test is a test on the serial communication network at 9,600 bps, and the transmission and reception of the prescribed data are performed in the prescribed sequence. When the said communication test is completed, a communication test is conducted between the SYS remote unit 71 and the MCB remote unit 75 in the duration T2. That is to say, the MCB remote unit 75 demands the SYS remote unit 71 to give it the results of the self test, and the SYS remote unit 71, responding to the said demand, issues the results of the tests which it has conducted up to that point in time, as the Self-Test Results, to the MCB remote unit 75.

Upon its reception of the self-test results, the MCB remote unit 75 issues a token pass to the SYS remote unit 71. The token pass is a tablet for transferring the UI mastering authority, and the delivery of the token pass to the SYS remote unit 71 effects the transfer of the UI mastering authority from the MCB remote unit 75 to the SYS remote unit 71. The steps up to this point constitute the power-on sequence. In the duration of the said power-on sequence, the UI remote unit 70 indicates a message, such as "Please, wait a moment!" and conducts its own various types of tests, such as the core test and a communication test.

During the power-on sequence mentioned above, there may be a failure in responding to the demand for the self-test results or there may occur an abnormal condition in the self-test results, in which case the MCB remote unit 75 renders the machine dead and, putting the UI controlling authority into action, the said remote unit controls the UI remote unit 70 and puts on display a message to the effect that an abnormal condition has taken place. This is the machine dead state.

When the power-on state is completed, the system enters next into the initializing state in order to set up the individual remote units. In the initializing state, the SYS remote unit 71 holds the overall controlling authority and the UI mastering authority. Therefore, the SYS remote unit 71 initializes the SYS system and also issues the "INITIALIZE SUBSYSTEM" command to the MCB remote unit 75 to make also the MCB system initialized. The results are transmitted as the Subsystem Status Information from the MCB remote unit 75. Thereupon, the IOT, for example, make preparations for the performance of the copying operations by heating the fuser and by placing the elevator for the tray in its prescribed position. The steps up to this point constitute the initializing state.

When the initializing state is completed, the individual remote units enter into their standby state, in which they are ready for their operation. Even in this state, the SYS remote unit 71 still holds the UI mastering authority, and therefore the SYS remote unit 71 puts the F/F on display on the UI screen on the basis of the UI mastering authority, thereby entering into the state in which it is ready to accept the copy executing conditions. At this time, the MCB remote unit 75 is monitoring the IOT. Moreover, the MCB remote unit 75 issues the background pole once in every 500 m seconds to the SYS remote unit 71, in response to which the SYS remote unit 71 performs the process of returning the self-test results within 200 m seconds to the MCB remote unit 75. In case the self-test results are not returned or in case there is any abnormal condition in the contents of the self-test results at this stage, the MCB remote unit 75 gives the UI remote unit 70 a notice to the effect that an abnormal condition has taken place and causes the UI remote unit 70 to display a message to that effect.

When the Auditron is put into operation in the standby state, the system enters into the Auditron state, in which the MCB remote unit 75 performs the Auditron control operation and also controls the UI remote unit 70 to make the said unit display a message for the Auditron. When the start key is pushed, with the F/F set, in the standby state, the system enters into the progress state, which is divided further into six states, namely, setup, cycle up, run, skip pitch, normal cycle down, and cycle down shutdown. These states are explained below with reference to FIG. 8.

Figure 8:
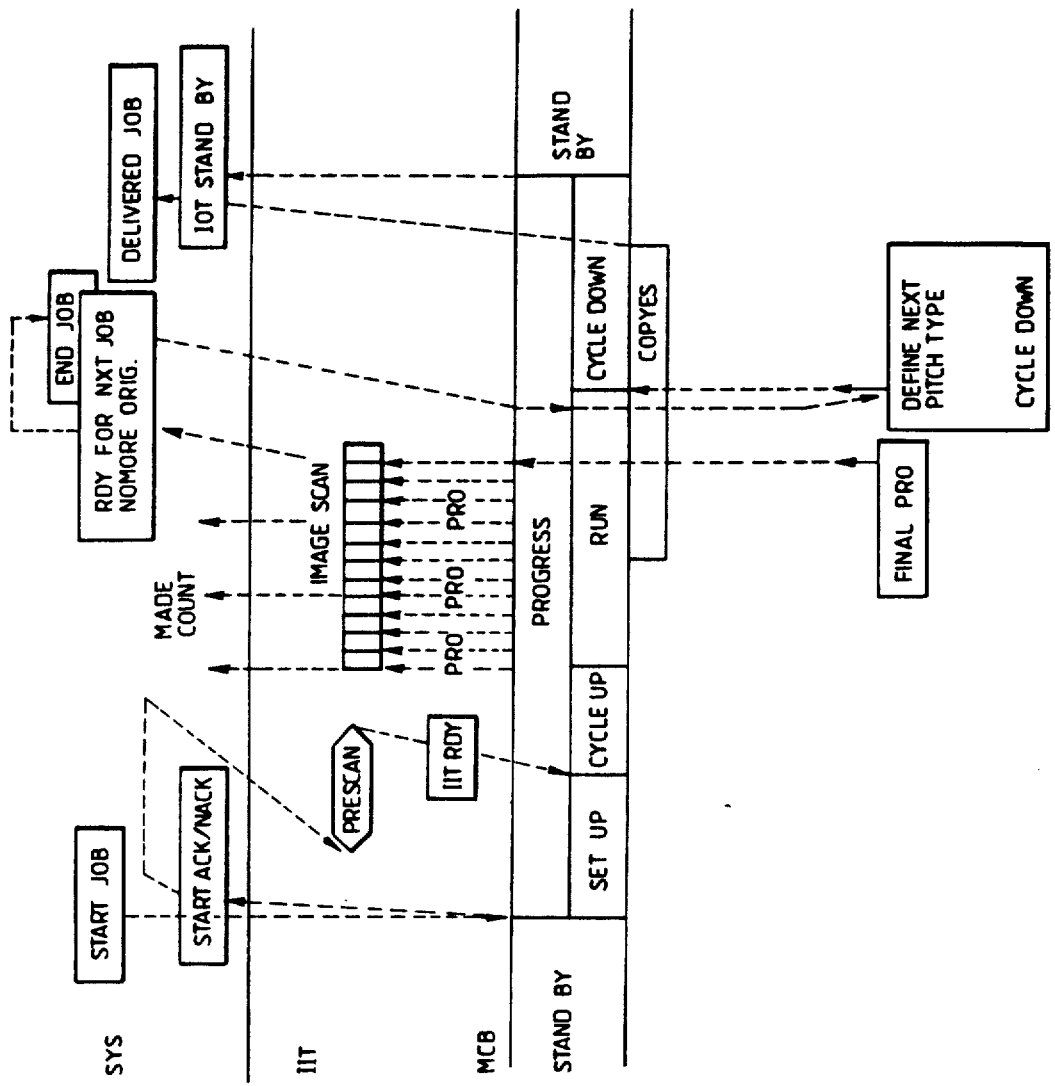
FIG. 8 illustrates the sequence of the progress state.

FIG. 8 presents the timing chart with the number of sheets of copies set at three for full-color copying with four colors in the platen mode.

When the SYS remote unit 71 detects that the start key has been pushed, the said remote unit 71 transmits the particulars of the job to the IIT remote unit 73 and the IPS remote unit 74 and also issues the particulars of the job, together with a command called "the Start Job Command", to the copier executive module 87 located in the MCB remote unit 75. This puts the machine into the setup state, and the individual remote units make preliminary preparations for their performance of the jobs assigned to them respectively. For example, the IOT module 90 performs such jobs as the driving of the main motor and a proper adjustment of the parameters for the photosensitive material belt. When the SYS remote unit 71 ascertains that the ACK (Acknowledge), which is a response to the Start Job Command, has been sent back from the MCB remote unit 75, the SYS remote unit 71 makes the IIT remote unit 73 perform the prescanning operations. There are four types of prescanning operations, namely, the prescanning operation for detecting the size of the original sheet, the prescanning operation for detecting the color in the specified position on the original sheet, the prescanning operation for detecting the closed loop in case an outline drawing is to be processed for coloring, and the prescanning operation for the reading of the marker in the marker editing process, and, depending on the selected F/F, the IIT remote unit 73 performs the prescanning operations up to three times in the maximum. While the prescanning operation is being performed, the UI puts on display such a message as "Please wait a moment!".

When the prescanning operation is completed, the system issues the command, "IIT Ready," to the copier executive module 87, and, at this point, the system enters into the "cycle up" state. This "cycle up" state is the one in which the system waits for the elapse of the rise time for the individual remote units, and the MCB remote unit 75 begins the operations of the IOT and the image transfer device, and the SYS remote unit 71 initializes the IPS remote unit 74. At this moment, the UI displays the message that the system is in the progress state, as well as the particulars of the selected job.

When the cycle up state is completed, the system enters into the run, commencing the copying operations, and, at this point, when the first piece of the PR0 is issued from the IOT module 90 in the MCB remote unit 75, the IIT remote unit 73 performs the first scanning operation, and the IOT performs the development of the first color, and the processing of one pitch is completed thereupon. When the PR0 is issued again at the next step, the system performs the development of the second color and completes the second pitch therewith. This operating process is repeated four times, and, when the processing operations for four pitches are completed, the IOT fixes the toner by means of the fuser, thereafter discharging the paper. With this, the system completes the copying operations for the first copy. With the repetition of the above-mentioned process three times, the machine produces three sheets of copies.

The processing of the pitch layer and the processing of the copying layer are controlled by the MCB remote unit 75, but the processing of the set number of sheets of copies, which is to be performed in the per original layer that represents a layer above those just mentioned, is performed by the SYS remote unit 71. Therefore, the system is so designed that, when the first PR0 for each copy is issued, the MCB remote unit 75 issues a made count signal to the SYS remote unit 71 in order to enable the SYS remote unit 71 to recognize what page number of copy is being produced at the particular moment. Moreover, when the last PR0 is issued, the MCB remote unit 75 issues the command, "RDY FOR NXT JOB" to the SYS remote unit 71 and demands the next job. At this point in time, the job can be continued if the Start Job command is issued, but, if the user does not set up the next job, the system will put an end to the job, when the SYS remote unit 71 issues the command, "END JOB," TO the MCB remote unit 75. When the MCB remote unit 75 ascertains the completion of the job with the reception of the "END JOB" command, the machine enters into the normal cycle down state, in which the MCB remote unit 75 stops the operation of the IOT.

In the course of the cycle down state, the MCB remote unit 75 issues the "DELIVERED JOB" Command, when it is ascertained that all the copied sheets of paper have been discharged, to give a notice to that effect to the SYS remote unit 71, and also, when the machine comes to a stop upon the completion of the normal cycle down state, the MCB remote unit 75 gives a notice to that effect to the SYS remote unit 71 by issuing the "IOT STANDBY" Command. With this, the progress state is finished, and the standby state is resumed.

Furthermore, the example given above has not been described in relation to the skip pitch state or the cycle down shutdown state, and yet, in the skip pitch state, the SYS remote unit 71 initializes the SYS system in preparation for the next job and the MCB remote unit 75 is in the standby state for the next copying operation. Moreover, since the cycle down shutdown state is the state provided for the occurrence of faults, both the SYS remote unit 71 and the MCB remote unit 75 perform the processing of faults in this state.

In the progress state, as mentioned so far, the MCB remote unit 75 performs control over the pitch process and the copy process, and the SYS remote unit 71 controls the per original process and the job programming process. Therefore, the controlling authority for these processes is held by these remote units in accordance with the shares of the processes as assigned to them respectively. In contrast to this setup, the UI mastering authority rests with the SYS remote unit 71. The reason is that it is necessary for the UI to indicate such items as the number of sheets set for copying and the selected editing processes, which belong to the per original process or the job programming process, and, as such, are placed under the control by the SYS remote unit 71.

In the event that any fault occurs in the progress state, the system moves on to the fault recovery state. The term, "fault," is a general designation of such abnormal conditions in the machine as the absence of paper, jamming, and any failure or breakage of any component part, and there are two types of faults, one type consisting of those faults from which recovery can be made by the users by taking such steps as the resetting of the F/F but the other type consisting of those faults from which recovery can be attained only by the serviceman by such measures as the replacement of some component parts. As mentioned above, the displaying of faults is performed basically by the MCB UI module 86, but, since the F/F is controlled by the SYS module 82, the recovery from any of those faults which are correctable by the resetting of the F/F is to be performed by the SYS mode 82 while the recovery from all the other faults is to be made by the Copier Executive Module 87.

Moreover, the detection of faults is performed separately for the SYS system and the MCB system. In other words, the faults in the IIT, the IPS, and the F/P, which are controlled by the SYS remote unit 71, should be detected by the SYS remote unit 71 while the faults in the IOT, the ADF, and the sorter, which are controlled by the MCB remote unit 75, should be detected by the MCB remote unit 75. Accordingly, it can be understood that the following four types of faults occur in this copying machine.

(1) Faults Detected by the SYS Node and Corrected for Recovery Therefrom by the SYS Node For example, a fault occurs when the start key is pushed without the preparation of the F/P therefor, but the user can make recovery therefrom by setting the F/F again.

(2) Faults Detected by the SYS Node and Corrected for Recovery Therefrom by the MCB Node The faults of this type include, for example, a trouble in the registering sensor, an abnormal condition in the speed of the imaging unit, an overrun of the imaging unit, an abnormal condition in the PR0 signal, an abnormal condition in the CCC, an abnormal condition in the serial communication network, and an error in checks on the ROM or the RAM, and, in case any of these faults has occurred, the UI will display such a message as "Please call the Serviceman!" as well as the particulars of the fault.

(3) Faults Detected by the MCB Node and Corrected for Recovery Therefrom by the SYS Node In case the sorter is specified on the F/F in spite of the fact that the sorter is not installed on the machine, a fault is detected by the MCB node, but a recovery from it can be made by the user by setting the F/F once again to effect a change to the mode in which the sorter is not to be used. The same applies also to the ADF. Moreover, a fault will occur when the toner has become short, when the tray is not set, or when the paper is not available. These faults are to be corrected essentially by the user by replenishing the toner, or by setting the tray, or by replenishing the paper, as appropriate, but, when the fault is due to the tray running out of paper, another tray may be used to make recovery from the fault, and, in case the toner in a given color has run short, it is possible to make recovery from the fault by specifying another color. That is to say, such faults can be corrected for recovery from them also by selections made on the F/F. Thus, the system is so designed as to perform the recovering operation with the SYS node.

(4) Faults Detected by the MCB Node and Correctable for Recovery Therefrom by the MCB Node For example, in case the developing device has a fault in operation, or the toner distribution is in an abnormal condition, or in case the motor clutch has a failure, or in case the fuser has a trouble, the MCB node detects any of these faults, and a message like "Please call the Serviceman!," as well as the location where the fault is present, is indicated on the U/I. Also, in case any jamming has occurred, the system indicates the location of the jamming, as well as the method of clearing the jamming, entrusting the user with the recovering job.

As described above, the controlling authority and the UI mastering authority is vested either in the SYS node or in the MCB node in the fault recovery state, depending on the location where a fault has occurred and the method of recovery from it.

When the fault is corrected for recovery therefrom and the IOT standby command is issued from the MCB node, then the system moves on to the job recovery state and finishes the remaining job. For example, if it is assumed here that jamming has taken place while the machine is processing the second copy, with the number of copies set at three, the SYS node and the MCB node attain the recovery of the job by performing the processes which they respectively control since it is necessary for the machine to produce the remaining two copies after the jamming is cleared. Therefore, also in the recovery of the job, the controlling authority is held by both of the SYS node and the MCB node in accordance with their respective shares of the processes. However, the UI mastering authority is held by the SYS node. The reason is that it is necessary for making the job recovery to indicate such messages for the job recovery, for example, as "Please push the start key!" and "Set the remaining original sheet!" and that this function is an item regarding the per original process or the job programming process, which the SYS node controls.

Moreover, also in case an IOT standby command is issued in the progress state, the system moves on to the job recovery state, and, when it is ascertained that the job has been completed, the system then shifts to the standby state, waiting ready for the next job. In the standby state, it is possible to enter the diagnostic state (which is hereinafter referred to simply as the DIAG. state) by performing the prescribed key operation.

Figure 9:
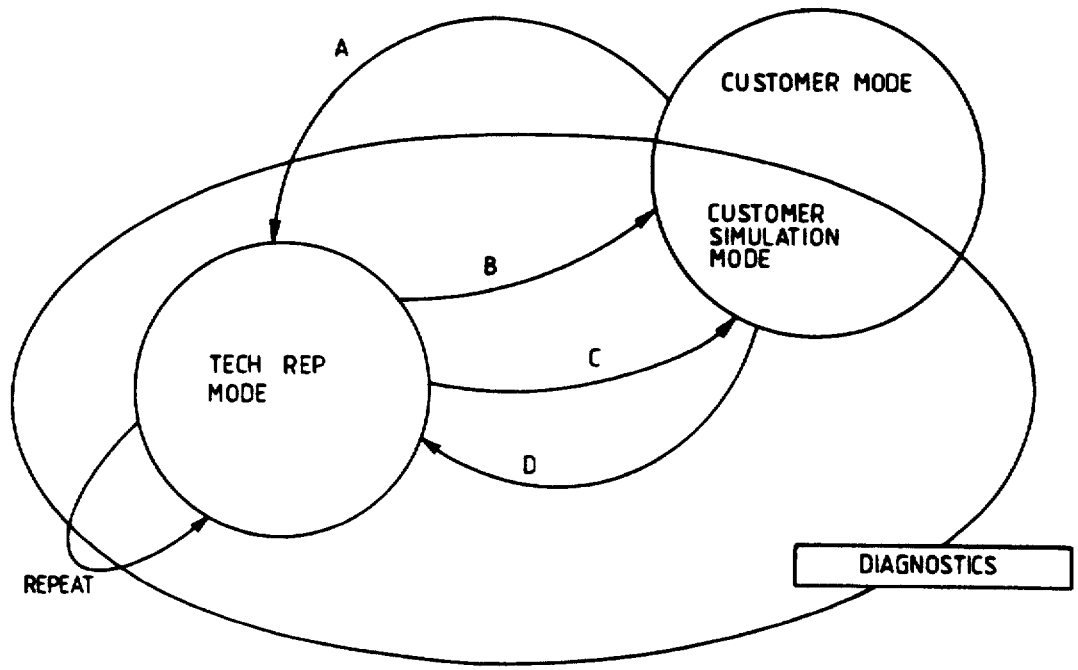
FIG. 9 explains the concept of the diagnostics.

The DIAG. state is the state for performing self-diagnosis, which is applied to such jobs as the checks on the input into the component parts, the checks on the output, the setting of the various kinds of parameters, the setting of the various kinds of modes, and the initialization of the NVM (non-volatile memory), and the concept of this state is illustrated in FIG. 9. As it is clearly seen in the Figure, the DIAG. state is available in two modes, i.e. the TECH REP mode and the Customer Simulation mode.

The TECH REP mode is the mode which the Serviceman uses in performing diagnosis on the machine with respect to the checks on the input and those on the output, and the Customer Simulation mode is the mode in which the customer mode, which the user uses ordinarily in performing the copying job, is used for diagnosis.

Now, assume that entry has been made by the prescribed operating procedure into the TECH REP mode by the route A shown in the Figure from the standby state in the customer mode. The TECH REP mode can be finished after simply having done the various kinds of checks, the setting of the parameters, and the setting of the mode, and, in order to return to the customer mode (by the route B in the Figure), it is possible to move into the power-on state as shown in FIG. 6, by performing the prescribed key operations, and then return to the standby state by following the sequence indicated in FIG. 7. However, now that this copying machine performs color copying and that it is also provided with a variety of editing functions, it is necessary to ascertain through the actual copying performance, after the setting of the various parameters is completed in the TECH REP mode, whether or not the copying machine can really reproduce the colors as required by the users and whether or not the machine can perform editing functions as specified. It is the Customer Simulation mode that performs this task, and this mode is different from the customer mode in the point that this simulation mode does not execute any billing job and that this mode displays a message on the UI to the effect that the machine is being operated in the DIAG. state. This is the meaning of the Customer Simulation mode, in which the customer mode is used in the DIAG. state. In this regard, the shift from the TECH REP mode to the Customer Simulation mode (by the route C in the Figure) and the shift in the opposite direction from the Customer Simulation mode to the TECH REP mode (by the route D shown in the Figure) can be made respectively by the prescribed operating procedure. Moreover, as the TECH REP mode is performed by the DIAG. executive module 88 (FIG. 4), the MCB node holds both of the overall controlling authority and the UI mastering authority, but, with regard to the Customer Simulation mode, the SYS node has both of the overall controlling authority and the UI mastering authority because the machine performs its ordinary copying operations in this mode under the control of the SYS DIAG. module 83 (FIG. 4).

(II) System Details (II-1) Positioning of the Systems

Figure 10:
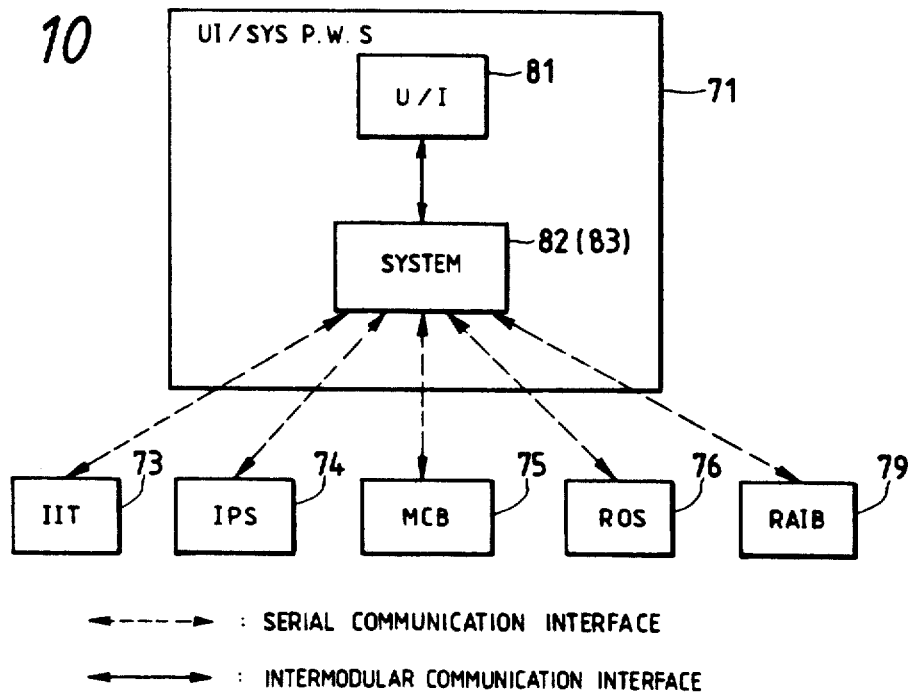
FIG. 10 illustrates the relationship between the system and the other remote units.

FIG. 10 is a chart illustrating the relationship between this system and the other remote units.

As mentioned earlier, the remote unit 71 is mounted with the SYS UI module 81 and the SYSTEM module 82, and, between the SYS UI module 81 and the SYSTEM module 82, data are exchanged via the intermodular interface, and a serial communication interface is provided to connect the SYSTEM module 82 and the IIT 73 and IPS 74 while the LNET high transmission rate communication network is provided to connect the MCB 75, the ROS 76, and the RAIB 76.

Next, a description is given with respect to the configuration of the modules in the system.

(II-2) Configuration of Modules in This System

Figure 11:
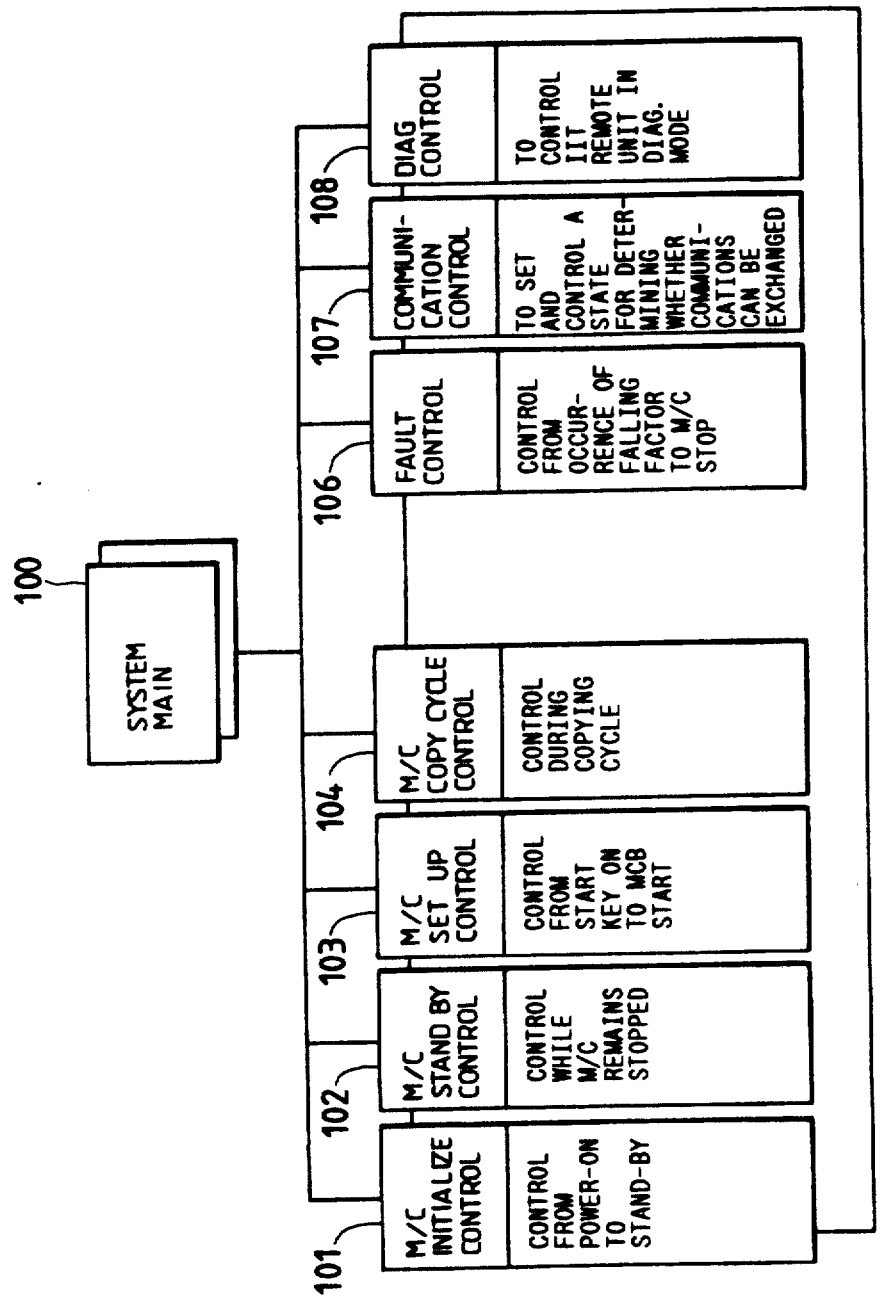
FIG. 11 illustrates the construction of the modules in the system.

FIG. 11 is a chart illustrating the configuration of the modules for the system.

For this copying machine, the individual modules for the IIT, the IPS, the IOT, and so forth are conceived as though they were component parts, and the individual modules for the systems which perform control over these are conceived as though they had brains. And, with the adoption of the distributed control system with separate CPU's, the system takes charge of the per original processing operation and the job programming process, and, since the system has the control rights to the control over the initializing state, the standby state, the setup state, and the cycle state and also the UI master rights to the use of the UI in these states in correspondence to this setup, the system has been constructed with such modules as are proper for its performance of these operations.

The System Main 100 takes into the internal buffer the data obtained through its reception from the SYS UI, the MCB, etc., and clears the data stored in the internal buffer, calls each of the modules in the subordinate ranking to the System Main 100 and delivers the processes to it, and performs the process for the renewal of the system state.

The M/C initialization control module 101 performs control over the initializing sequence to continue from the time the power is turned on to the time when the system attains the standby state, and this module is started upon the completion of the power-on process for performing various types of tests subsequent to the power-on operation by the MCB.

The M/C setup control module 103 performs control over the setup sequence which continues from the time when the start key is pushed to the time when the MCB for performing the processing of the copy layer is started, the specific operation of this module consisting in the formation of a job mode on the basis of the FEATURE (i.e. the item of instructions to the M/C for fulfilling the user's requirements) as instructed from the SYS UI and then determining the setup sequence in accordance with the job mode so formed.

Figure 12A:
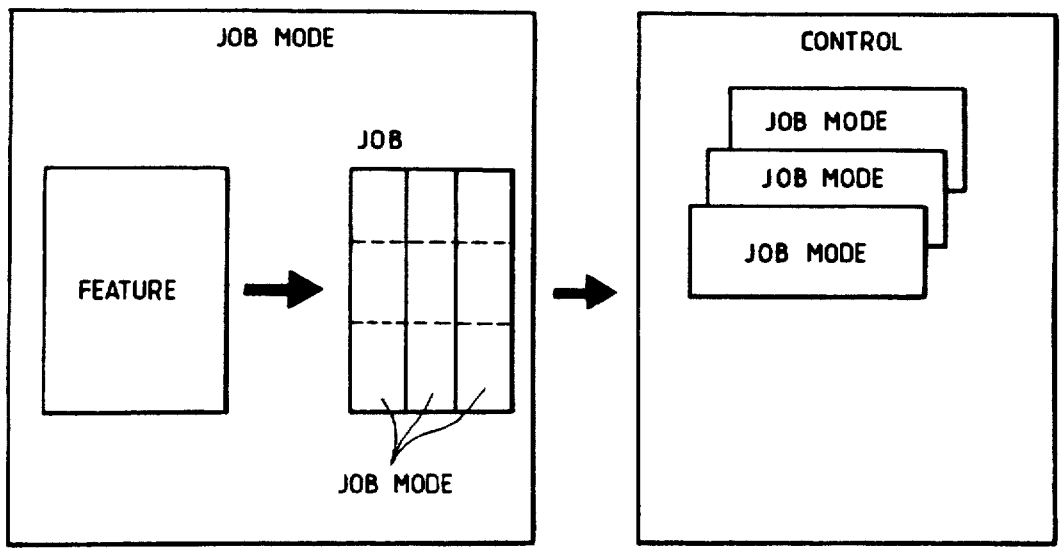
FIGS. 12(a) through 12(c) illustrate the creation of the job mode.
Figure 12B:
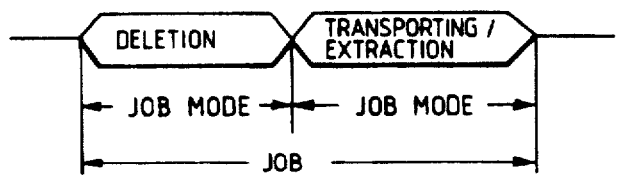
Figure 12C:
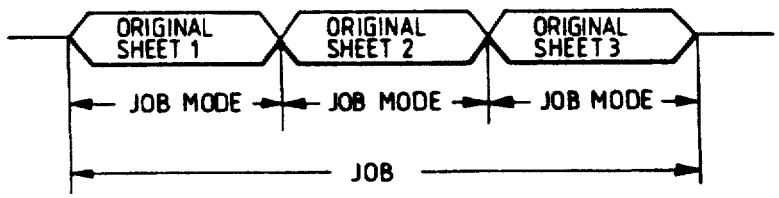

As shown in FIG. 12 (a), the formation of the job mode is accomplished by analyzing the mode instructed by the F/F and dividing the job into its sections. In this case, the job represents the actions of the M/C from the time when the M/C is started by the user's demand to the time when all the copies as required are discharged and the operation of the machine is brought to a halt, and thus a job is a collective body of the job modes, which represents the minimal units into which the job can be divided in relationship to the user's demand. For example, this can be explained with reference to the case of a synthesis with an image set into the base picture or text. As shown in FIG. 12 (b), the job modes consist of a cut, a transfer, and an extraction, and the job is a collective body composed of these. Moreover, in the instance of the three ADF original sheets as shown in FIG. 12 (c), the job modes are the feeding processes for the original sheet 1, the original sheet 2, and the original sheet 3, and the job is a collective body of all these.

And, the module performs document scanning in the case of the automatic mode, prescanning in the case of the mode for outline drawing for coloring, sample scanning in the case of the color detecting mode (the prescanning operation being performed three times in the maximum) and also distributes the copy mode necessary for the copy cycle to the IIT, the IPS, and the MCB, and then starts up the MCB at the time when the setup sequence is brought to a finish.

The M/C standby control module 102 controls the sequence in the course of the M/C standby, and, specifically, it performs the reception of the start key, the control of the color registration, the entry into the DIAG. mode, and so forth.

The M/C copying cycle control module 104 performs the control of the copying sequence from the start of the MCB to the halt thereof, and, in specific terms, the module performs the notification of the paper feed count, the demand for the startup of the IIT based on its identification of the completion of a job, and the demand of a shutdown operation of the IPS on the basis of its identification of the stopping of the MCB.

Moreover, this M/C copying cycle control module performs the function of notifying the correspondent remote unit about the through command which is generated while the M/C is being stopped or in the course of its operation.

The fault control module 106 performs the monitoring of the shutdown factors from the IIT and the IPS, and, when any such factor occurs, the module demand the MCB to perform the shutdown operation, and, in specific terms, this module performs the shutdown operations in response to a fail command from the IIT and the IPS, and also performs the recovering operation, for example, under a jam command from the MCB, judging and determining the recovery to be made at the time of a halt of the M/C after the occurrence of a demand for a shutdown from the MCB.

The communication control module 107 performs the setting of the IIT ready signal to be generated from the IIT and the setting of the ENABLE/DISABLE for the communication in the image area.

The DIAG control module 108 performs control in the input check mode and output check mode in the course of the DIAG mode.

(II-3) Transmission and Reception of Data in This System

Next, a description is made of the exchanges of data among these individual modules in the system or with another sub-system.

Figure 13:
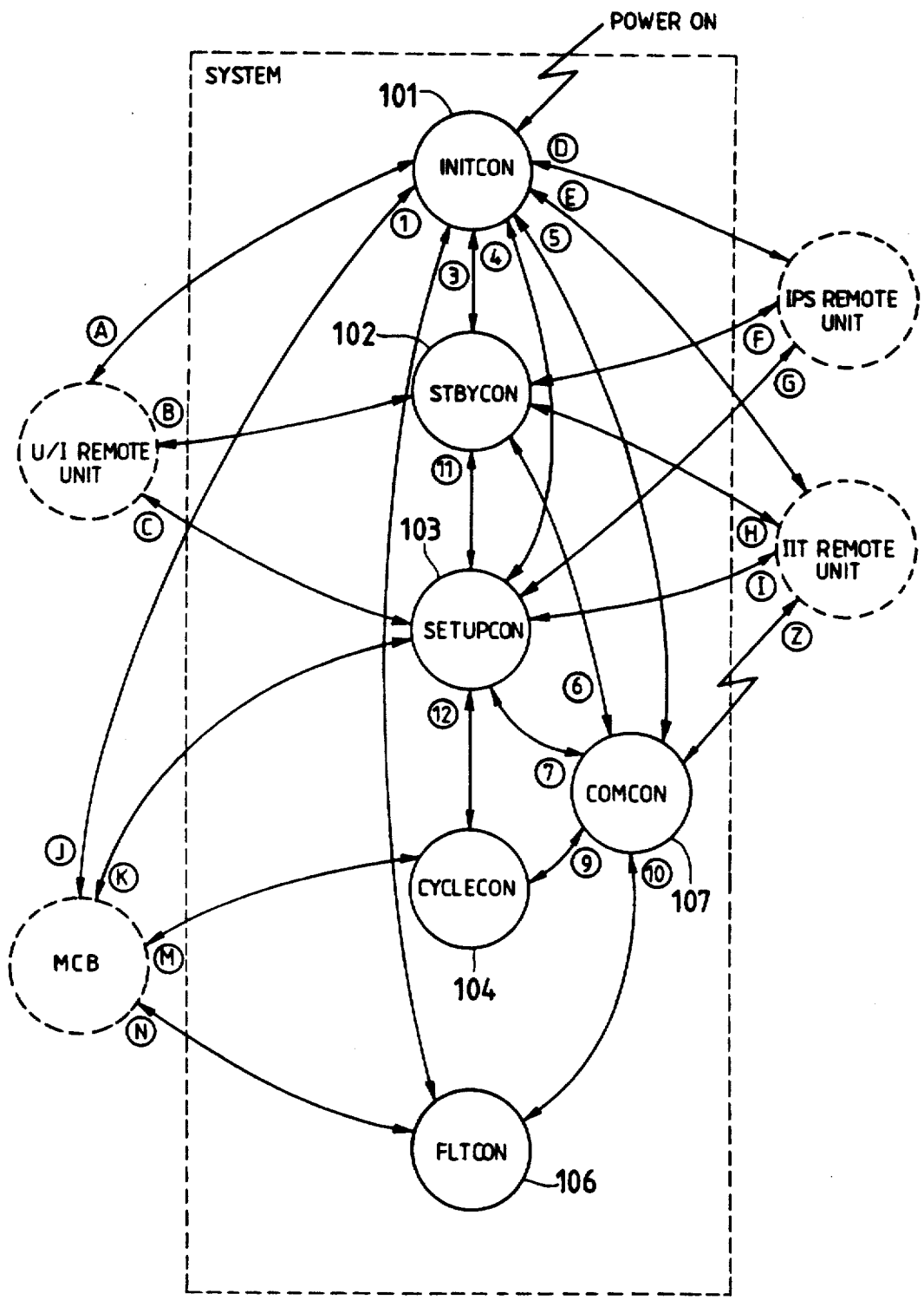
FIG. 13 illustrates the data flow between the system and each of the individual remote units as well as the data flow among the modules within the system.

FIG. 13 is a chart illustrating the flow of data among the individual remote units and the flow of data among the modules in the system. The marks from A to N represent the flows of serial communications, the mark Z represents the hot line, and the marks from (1) to (12) represent the data exchanged among the modules.

Between the SYS UI remote unit and the initialization control section 101, the SYS UI unit transmits the TOKEN command, which delivers the rights to the control of the CRT to the SYSTEM NODE, while the initialization control section 101 transmits the "config" command to the SYS UI unit.

Between the SYS UI remote unit and the standby control section 102, the SYS UI remote unit transmits the mode change command, the start copying command, the job cancel command, the color registration request command, and the tray command to the standby control section 102, which in its turn transmits the M/C status command, the tray status command, the toner status command, the recovery bottle status command, the color registration ANS command, and the TOKEN command to the SYS UI remote unit.

Between the SYS UI remote unit and the setup control section 103, the setup control section 103 transmits the M/C status command (progress) and the APMS status command to the former while the SYS UI remote unit in its turn transmits the stop request command and the interrupt command to the latter 103.

Between the IPS remote unit and the initialization control section 101, the IPS remote unit transmits the initialization end command to the latter 101 and the initialization control section 101 in its turn transmits the NVM parameter command to the former.

Between the IIT remote unit and the initialization control section 101, the IIT remote unit transmits the IIT ready command to the initialization control section 101, which in its turn transmits the NVM parameter command and the INITIALIZE command to the IIT remote unit.

Between the IPS remote unit and the standby control section 102, the IPS remote unit transmits the initialize free hand area command, the answer command, the remove area answer command, and the color information command to the standby control section 102, which in its turn transmits the color detection point command and the initialize free hand area command to the IPS remote unit.

Between the IPS remote unit and the setup control section 103, the IPS remote unit transmits the IPS ready command and the document information command to the setup control section 103, which in its turn transmits the scanning information command, the basic copying mode command, the editing mode command, and the M/C stop command to the IPS remote unit.

Between the IIT remote unit and the standby control section 102, the IIT remote unit transmits the IIT ready command, which conveys a notice of the completion of the prescanning process, to the standby control section 102, which in its turn transmits the sample scanning start command and the initialize command to the IIT remote unit.

Between the IIT remote unit and the setup control section 103, the IIT remote unit transmits the IIT ready command and the initialize end command to the setup control section 103, which in its turn transmits the document scanning start command, the sample scanning start command, and the copy scanning start command to the IIT remote unit.

Between the MCB remote unit and the standby control section 102, the MCB remote unit 102 transmits the initialize subsystem command and the standby selection command to the standby control section 102, which in its turn transmits the subsystem status command to the latter.

Between the MCB remote unit and the setup control section 103, the setup control section 103 transmits the start job command, the IIT ready command, the stop job command, and the declare system fault command to the MCB remote unit, which in its turn transmits the IOT standby command and the declare MCB fault command to the setup control section 103.

Between the MCB remote unit and the cycle control section 104, the cycle control section 104 transmits the stop job command to the MCB remote unit, which in its turn transmits the MADE command, the ready-for-next-job command, the job delivered command, and the IOT standby command to the MCB remote unit.

Between the MCB remote unit and the fault control section 106, the fault control section 106 transmits the declare system fault command and the system shutdown completion command to the MCB remote unit, which in its turn transmits the declare MCB fault command and the system shutdown command to the fault control section 106.

Between the IIT remote unit and the communication control section 107, the IIT remote unit transmits the scanning ready signal and the image area signal to the communication control section 107.

Next, a description is made of the interfaces among the individual modules.

The System Main 100 transmits the signal reception remote unit numbers and the data for reception to the individual modules (101 through 107), and these individual modules perform the transmission and reception of data with their respective remote units. On the other hand, nothing is transmitted from the individual modules (101 through 107) to the System Main 100.

The initialization control section 101 gives a notice of the system state (standby), upon the completion of the initializing process, to the fault control section 106 and the standby control section 102, respectively.

The communication control section 107 gives information on the possibility or impossibility of communications to the initialization control section 101, the standby control section 102, the setup control section 103, the copying cycle control section 104, and the fault control section 106, respectively.

The standby control section 102 gives a notice of the system state (progress) to the setup control section 103 when the start key is pushed.

The setup control section 103 gives a notice on the system state (cycle) to the copying cycle control section 104 when the setup is completed.

(III) State Control System

The state control system according to the present invention is constructed in such a manner that the system is provided with modules set up in correspondence to the individual states which are activated and execute the processing operations when they have received the control from the monitor, that the system judges whether or not all the responses from the individual subsystems have been received to the effect that the currently activated modules have completed the processing operations which they should perform respectively in the current state, and that the system effects the rewriting of the state when it is found that all the responses have been duly received, calling the module corresponding to the activated state by the next 10 msec interruption and activating the module.

(III-1) State Control and Module Configuration

Figure 14:
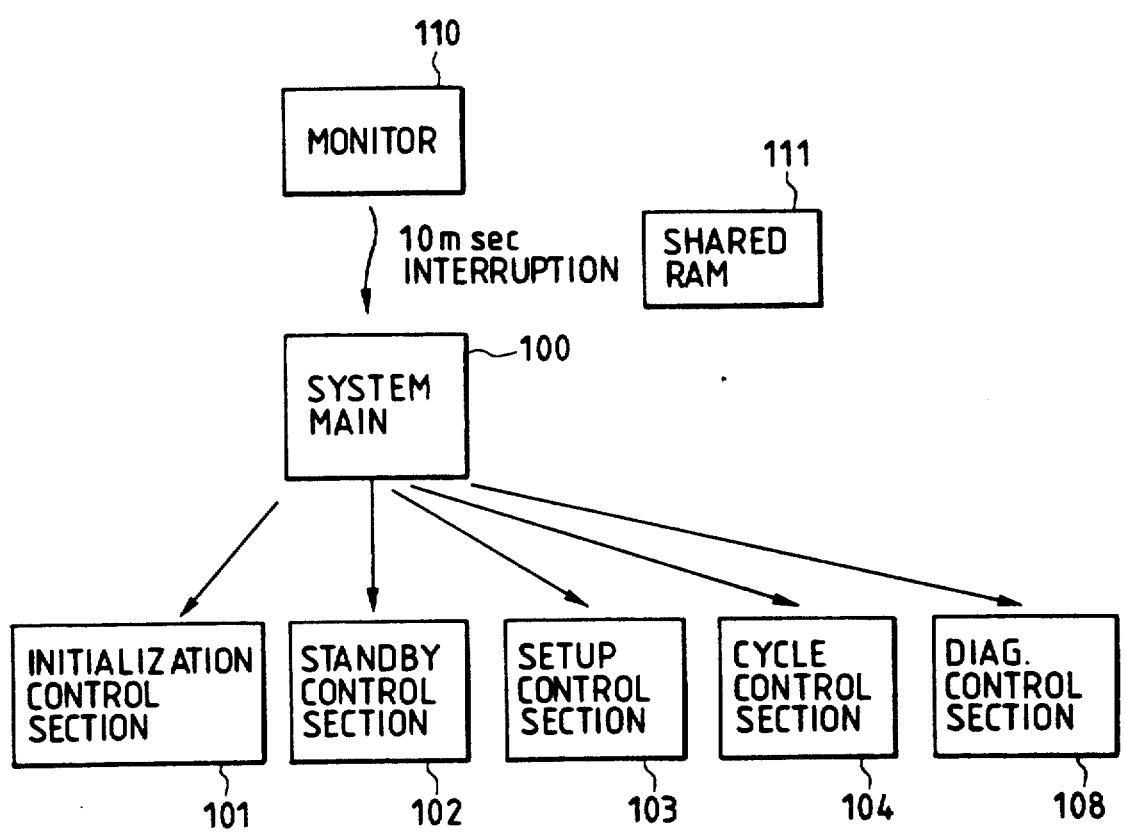
FIG. 14 is a chart for explaining the state control system according to the present invention.

FIG. 14 illustrates the state control system according to the present invention.

By the 10 msec interruption by the monitoring system 119, the system main 100 is called every 10 msec. With every such call, the system main calls the module corresponding to the state written in the shared RAM 111 and delivers the control to it.

Figure 15A:
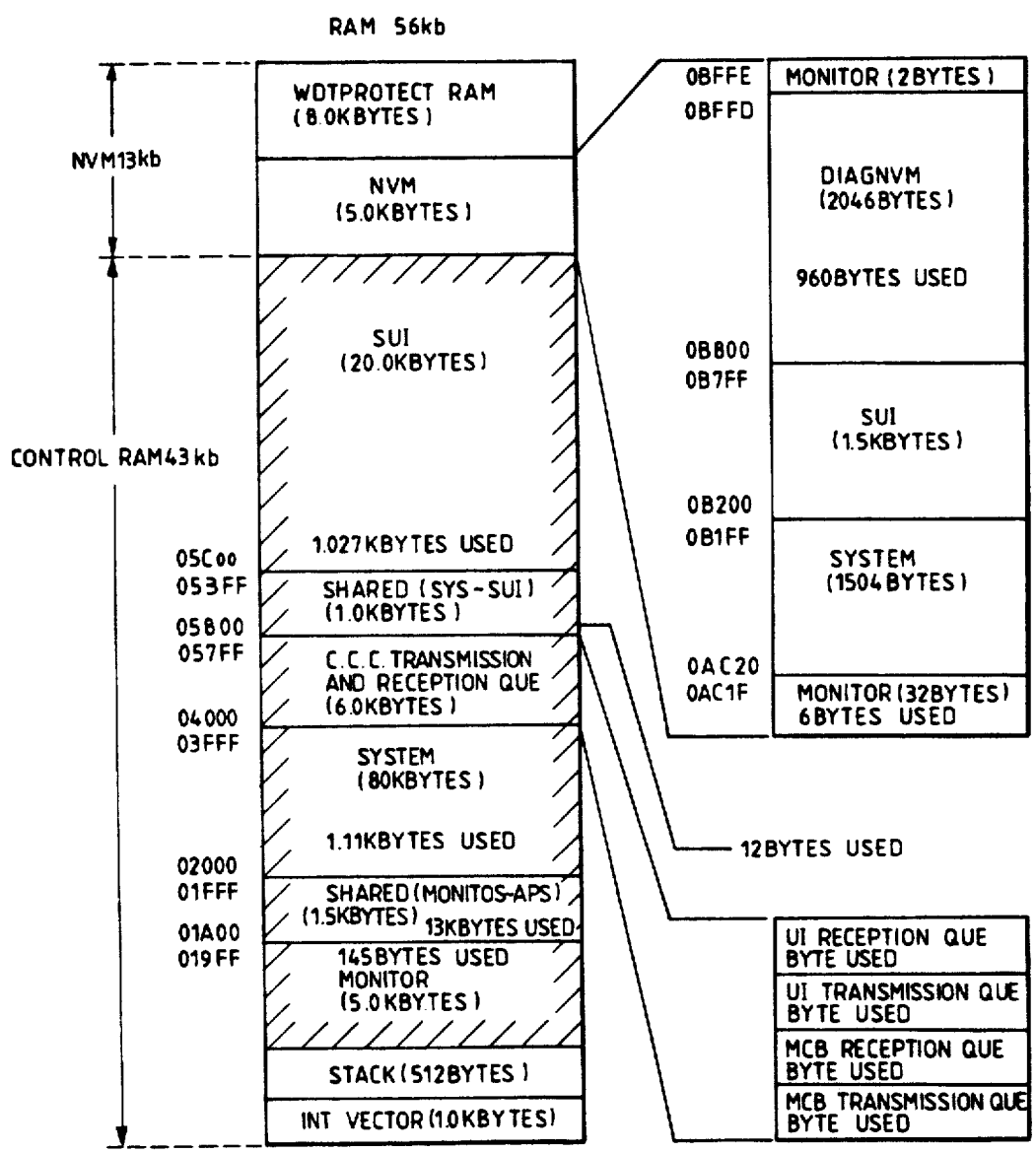
FIG. 15 (a) illustrates the memory map in the RAM area of the present system.

The memory map in the RAM area for the system is as shown in FIG. 15 (a), and this memory map is composed of 56k bytes. Of this, $0000_H$ through $005FF_H$ form the area used for interruption and stack. $0600_H$ through 019FF$_H$ form the area for use by the monitor, 01A00$_H$ through 01FFF$_H$ form the shared RAM area to be used in common by the monitor and the APPS (The APPS as viewed in relation to the system monitor means the individual modules in the system), 02000$_H$ through 03FFF$_H$ form the area to be used by the system, 04000$_H$ through 057FF$_H$ form the area used by the CCC, 05800$_H$ through 05BFF$_H$ form the shared RAM area for the system and the UI, 0AC00$_H$ through 0BFFF$_H$ form the area for the NVM, and 0C000$_H$ through 0DFFF$_H$ form the area for the watch dog timer.

Of this RAM area, 01A00$_H$ through 01FFF$_H$, which form the shared RAM area used in common by the monitor and the APPS, contain one of the numerical values from 0 to 4, which represent the initializing state, the standby state, the setup state, the cycle state, and the DIAG. state, respectively, as written therein in the form of one-byte data, as shown in FIG. 15 (b), so that reference can be made to any of the modules. Thus, the mutually adjacent RAM areas are employed as shared areas because the construction of the software for use in performing the processes for the transmission and reception of data is simplified with the writing and reading operations of the transmitted data and the received data performed in the mutually adjacent shared RAM areas, for example, in such cases as the exchanges of data between the monitor and the APPS, in which the monitor calls the APPS every 10 msec and, whenever there is a demand, transmits the data from the APPS to another remote unit or to deliver the data received from another remote unit to the APPS. Also, in the control of the states, the system is so designed that it writes to this shared RAM those data representing the states to which reference should be made freely by the monitor and the APPS.

Furthermore, it is a major characteristic feature of the present invention that the system provides a one to one correspondence of the individual modules, namely, the initialization control section 101, the standby control section 102, the setup control section 103, the cycle control section 104, and the DIAG. control section 108, to these individual states. Thus, since the modules are set up not by the functions as the unit but for the individual states, this system is not liable, unlike the existing system, to the corpulence of only those modules which exercise control over the jobs or give instructions. Accordingly, it is relatively easy for the present system to equalize the size of the individual modules and to realize a significant reduction in the concentration of the processing operations on some particular modules. In addition, this system can increase the independence of the individual modules through clear definition of their respective roles and can thus provide for greater ease in making such modifications as the additions, alterations, and eliminations of subsystems.

Moreover, the area composed of 0600$_H$ through 0ABFF$_H$ as indicated with slant lines in the memory map shown in FIG. 15 (a) is used as a testing area, where the RAM test is conducted at the time when the power is turned on. This RAM test is conducted by the system monitor. First, "55AA$_H$" is written in the entire area by wiring "55" and "AA" alternately, and thereafter it is checked whether or not the contents in the testing area are "55AA$_H$", and a similar test is conducted also with regard to "AA55$_H$". The RAM test is conducted with "55AA$_H$" and "AA55$_H$" thus written alternately. Moreover, the monitor clears to zero the entire testing area regardless of the presence or absence of a RAM failure. As the result of this clearing operation, also the data concerning the state of the system as shown in FIG. 15 (b) are cleared to zero, so that the initial state of the system will be automatically set in the initializing state when the power is turned on. Thus, by using the zero clearing of the data in the RAM area, which the monitor performs in the course of the ordinary startup operation when the power is turned on, for initializing the state in the system, it is made unnecessary for the system to take the trouble of performing any initialization of the state (on the APPS side as viewed from the monitor).

Figures 15B, 16:
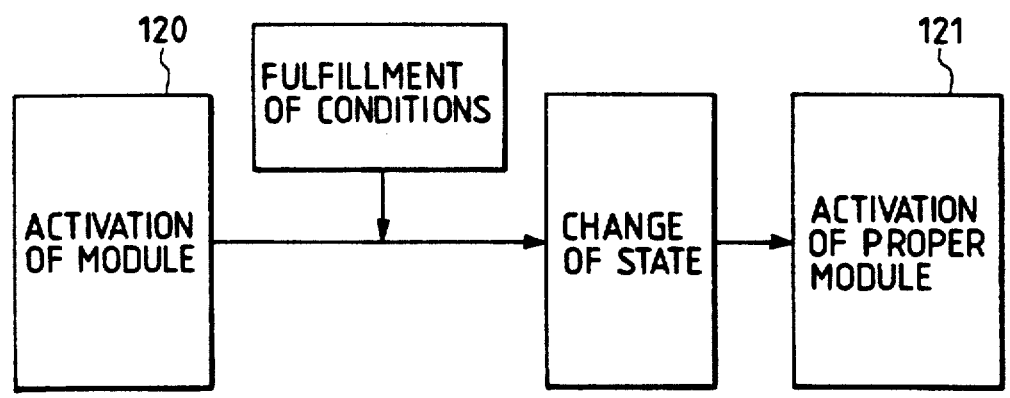
FIG. 16 is a chart for explaining the rewriting of the state.
Figure 17B:
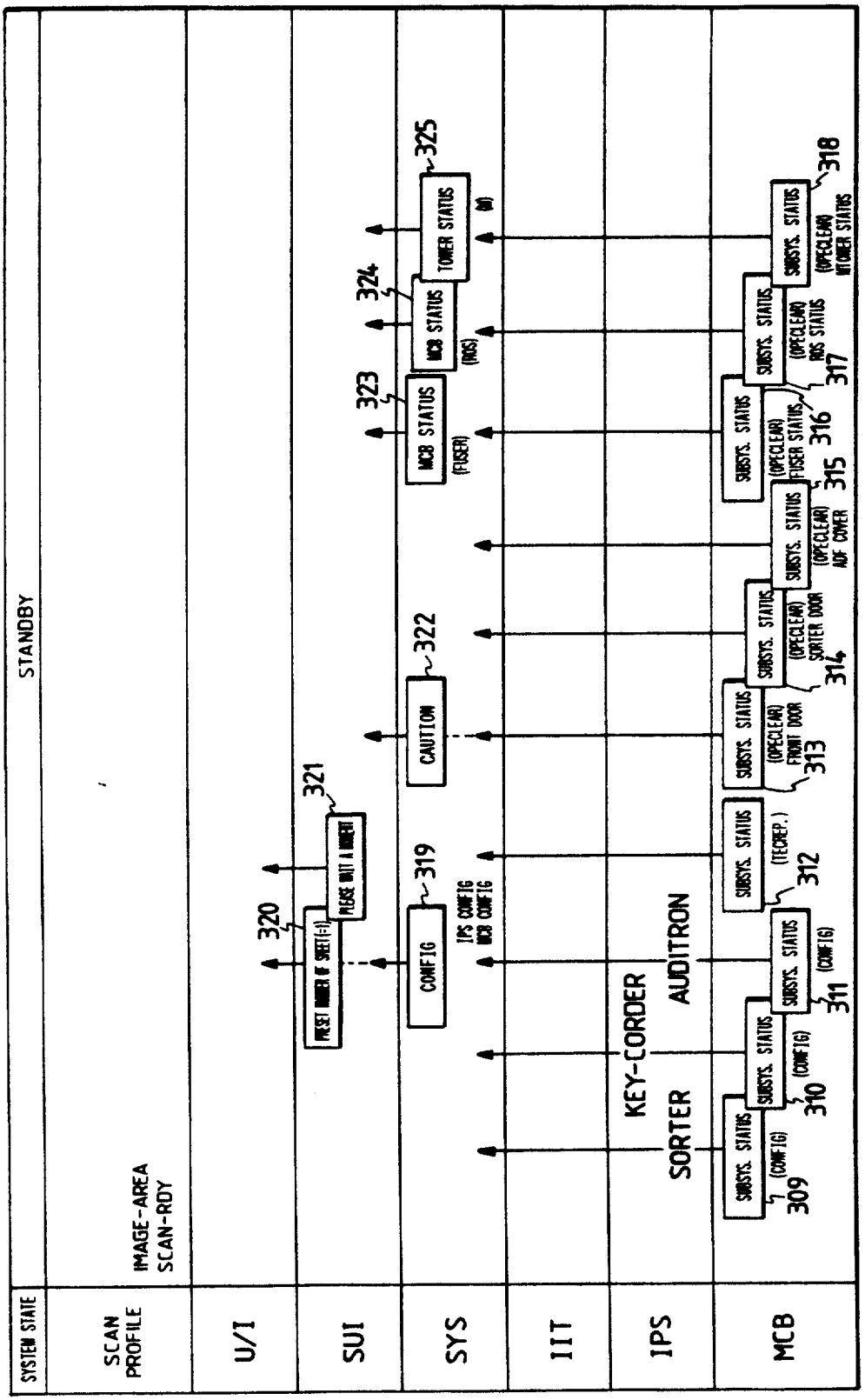
Figure 17C:
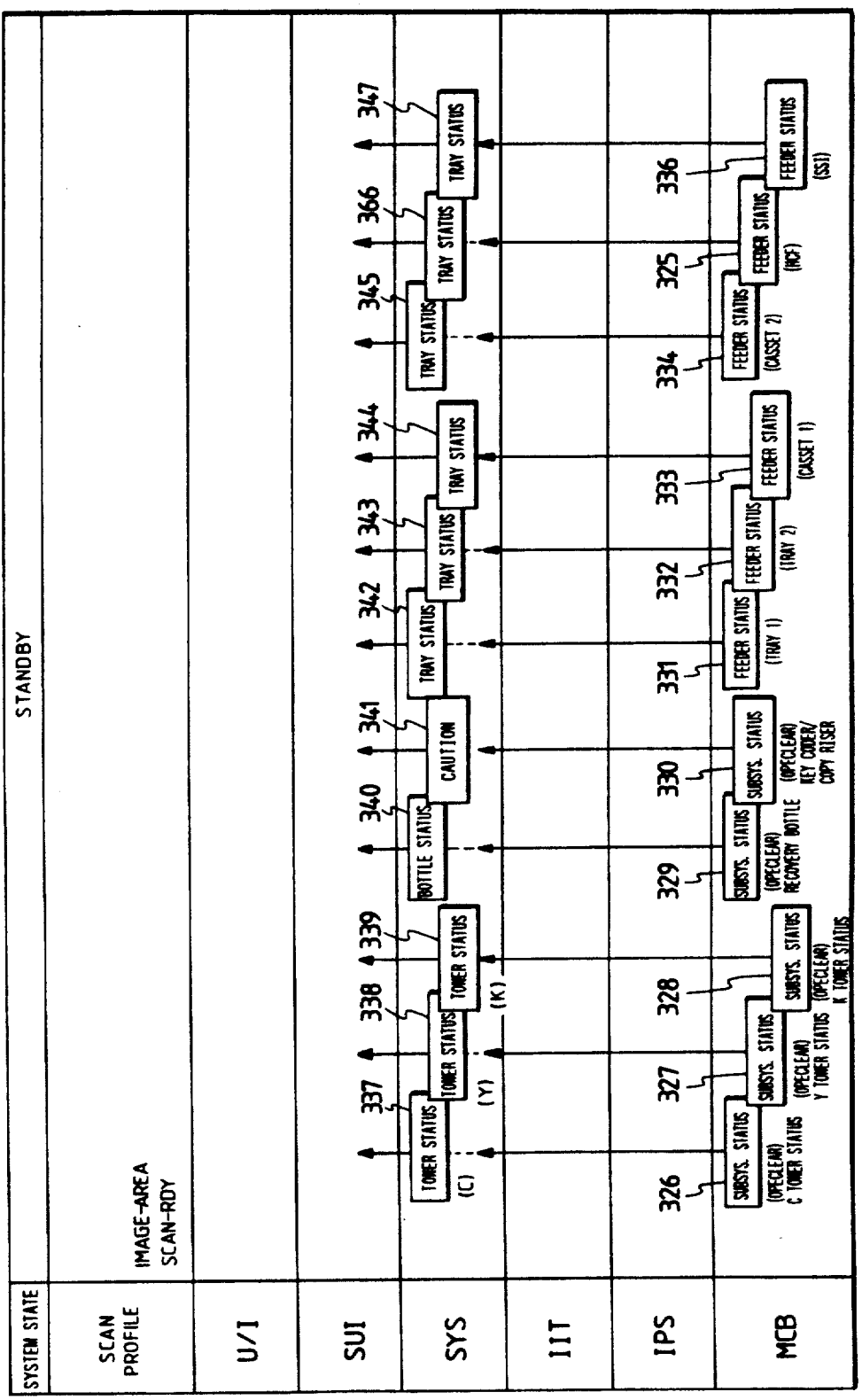

The rewriting of the state is illustrated in FIG. 16, in which the system rewrite the shared RAM 111 to the state to which the operation should shift next, handing over the control to the module 121, which corresponds to the said state, and activating the said module when the system finds that the currently activated module 120 in operation at the present moment has completed the job it should perform in the current state and has thereby fulfilled the prescribed condition.

Now that the module currently activated performs control over the state and rewrites the next state, the modules in this system will not become enormous, and modifications of one module will not affect any other module, so that it is very easy to make changes in the specifications for this system.

In the following part, it is described, with reference to the correlations of the interfaces, how the state control according to this invention is applied in each of the various modes.

(III-2) Correlations of Interfaces (A) Example 1 of Correlations of Interfaces

FIGS. 17(a) through 17(d) illustrate the correlations of the interfaces from the completion of the various types of tests at the time when the power is turned on to the display, "Ready for Copying".

As already described, the MCB starts its operation and establishes its state control authority and the user interface control authority when the power is turned on and the system starts up upon the generation of the power normal signal as the voltage in the power source attains the normal state. Then, the MCB conducts a test on the high transmission rate communication network LNET, a core test on the system, a self test of the CCC, a core test of the IPS, a core test of the IIT, and so forth, and then conducts a communication test on the system node for a prescribed duration of time. Thereafter, the MCB requires the system to present the test results, and the MCB issues a token pass to the system when it receives the test results. Thereupon, the state control authority and the user interface control authority are handed over from the MCB to the state control sections 101 through 108 by way of the system monitor. AT this stage, the UI displays the message, "Please wait a moment!" and the state in the system shifts from the power-on state to the initializing state. The setting of this initializing state is done automatically as the result of the RAM test conducted by the system monitor, as described above.

When the communication test on the system node is completed as it can be observed with reference to FIG. 17 (a), the system shifts to the initializing state, as described above, and the initialize command 301 is issued from the SYS UI to the UI, and a token pass 302 is issued from the UI to the system via the SYS UI. In this condition, the state control authority and the user interface control authority are held by the individual control sections 101 through 108 of the system.

The system transmits the NVM parameters stored in the non-volatile memory (NVM) once to the IIT and three times to the IPS by serial communication in 90 msec, thereby distributing each time the NVM parameters 303a through 303d for such items as the correcting values for a reduction/enlargement by 100%, the correcting values for registration in the subsidiary scanning direction, the data on the components of the registered colors, and the correcting values for the orange mask. When the said distribution of the NVM parameters is finished, the initialization end command 304 is transmitted from the IPS. This command contains such additional data as those on the presence or absence of any logogram and the presence or absence of any optional board. The initialization of the IIT and the IPS is thus completed.

When the initialization of the IIT and the IPS is finished, the system transmits an initialize command to the IIT, and, upon receipt of this command, the IIT sets the carriage in its home position. This is an operation for testing whether or not the carriage moves properly, and the carriage is set with its home position ascertained, and a scanning ready signal is generated through the duration between the time when the carriage starts moving and the time when the carriage comes to a stop. When this operation is finished, the IIT transmits the IIT ready command 306 to the system, and, when the system receives this command, it rewrites the state from the initializing state to the standby state, and the control of the CPU is thereupon handed over from the initialization control module 101 to the standby control module 102.

The controlling operations and the rewriting of the state mentioned above are performed by the initialization control module 101 illustrated in FIG. 14, and the rewriting from the initializing state to the standby state is put into effect when the system finds the fulfillment of the three conditions, namely, that the token pass 302 has been delivered to the system, so that it holds the state control authority and the user interface control authority, that the IPS has completed preparations, having already received the initialization end command 304 transmitted from the IPS, and that the system has received the IIT ready command 306, which means that the IIT has been made ready.

At the same time as the state shifts to the standby state, the system transmits to the MCB the initialize subsystem command 307, which indicates the completion of the preparations of the system node. In response to this, the MCB checks the composition of the equipment, such as optional devices, and also whether or not the front door, the sorter door, the ADF cover, and the like are kept closed, whether or not the toners for the individual colors are in place ready for use, the condition of the tray, and so forth and transmits the detected results as information to enable the system to judge whether or not the condition of the equipment is adequate for accepting the start key and whether or not it is possible to accept the copying mode when an input operation is made in demand thereof, as described further in the following part.

First, the MCB transmits to the system the subsystem commands 308 to 311, which are concerned with the configuration and indicate whether any ADF and additionally the functions of a sorter, a key coder, an auditron, as shown in FIG. 17 (b), are added to the equipment. Among these items, the key coder offers the function of allowing the production of copies in a number of sheets preset on a card and the auditron provides the function of allowing the production of copies only when the user satisfies the requirement that the cipher code assigned to a particular person is entered into the system. With such configuration commands, the system recognizes the basic functions added as options to the equipment and transmits to the SYS UI the configuration command 319, together with the parameters which it has received in the initialization end command 304 from the IPS (FIG. 17 (a)). With the reception of this configuration command working as the trigger, the SYS UI transmits to the UI the command 320, which specifies "1" for the number of copies, and the command 321, which demands the display of the message, thereby causing the display of the message, "Please wait a moment!".

Moreover, the MCB transmits "TECREP" as the subsystem status command 312. This TECREP means that the equipment is in need of repair work to be performed by the serviceman, including a check to determine whether or not there is any trouble in the sorter or the tray. The MCB also transmits "OPERATION CLEAR FAULT", which indicates that the equipment can be set into its copying operations as the front door, the sorter door, the ADF cover, etc. remain closed, as the subsystem status commands 313 through 315. Having received these subsystem status commands, the system judges what conditions are affecting the equipment and transmits its judgment as the caution command 322 to the SYS UI. The judgment is sent as a caution command, as a caution is intended for informing the operator of the inability of the equipment to enter into its copying operations in case the said inability in operation, in the case of the M/C, is due to any condition of the equipment prior to the pushing of the start key. On the basis of this caution command, the SYS UI informs the operator of the particular trouble, putting a message on display, for example, to the effect that the front door is left open if it happens to be the case.

In addition, the MCB transmits to the system the subsystem status commands, such as the fuser status command 316, which indicates whether or not the fuser has fell out of its position, or whether or not the temperature of the fuser has attained the prescribed temperature, the ROS status command 317, the toner status commands 318 and 326 through 328, which indicate whether or not the toners in the individual colors, M, C, Y, and K, are held in the equipment for ready use, the recovery bottle status command 329, which indicates whether or not the recovery bottle is full, and the key coder and copy riser status 330, which indicates whether or not the key has been pulled out, as well as the feeder status commands 331 through 336, which indicate the status of the tray, the cassette, the HCF, the SSI, etc., respectively (FIGS. 17 (b) and (c)), and, the system, having received these commands, transmits them, as they are, as the commands 323 through 325 and 337 through 347 to the SYS UI. In this regard, the MCB transmits the OPERATION CLEAR FAULT with respect to the key coder and copy riser command, which indicates whether or not the key has been pulled out, as caution commands as in the form of caution commands to the SYS UI, as in the case described above. Then, as illustrated in FIG. 17 (d), the system transmits to the SYS UI the M/C status command (standby) 348, which means that the equipment has come into a condition in which it can accept a copying job, when all these items of status information have been obtained, and, when the SYS UI receives the standby command in the status command 348, the SYS UI finds that the conditions for the readiness of the individual statuses are fulfilled and transmits "Ready for Copying" to the U/I by the message command 349, and a message to the said effect is put on display. In the way just described, the system judges whether or not all the conditions are fulfilled and thereupon transmits the M/C status command 348 to the SYS UI. Yet, before doing so, the SYS UI transmits the individual status commands. This step is taken in order to enable the SYS UI to display such a message as "Please close the front door!", for example, to the UI, depending on the cause of the failure of the equipment to meet all the required conditions, on the basis of the individual status commands transmitted to the SYS UI, lest the operator should grow irritated, being unable to find out the cause by which the equipment is being considerably delayed in giving the display of the message, "Ready for Copying", since merely the message, "Please wait a moment", would continue to be kept on display, if it were designed to transmit only the M/C status command, in case the M/C status command cannot be transmitted because of a failure of the equipment to satisfy all the conditions for one cause or another. Thus, after the power is turned on, the system makes the shifts to the initializing state and then to the standby state, and, when all the items of the status information on such items as the configuration, the operation clear fault, the tray, the cassette, the HCF, the SSI, and so forth have become available, the MCB transmits a notice to that effect to the SYS UI, thereby causing the SYS UI to display the message, "Ready for Copying", and the equipment is turned into the status of its standby for accepting the input on the key. The information on the operation on the key, if any, will be transmitted to the SYS UI, and the copying mode so input will be transmitted to the system since the system holds the user interface control authority in such a case.

(B) Example 2 of Correlations of Interfaces

Next, a description is given about the correlations of interfaces in a case in which natural color copying is performed in the basic full-color copying mode in four colors in the manual mode, that is, in the platen mode, with the paper size, the magnification, and the density being specified for the job.

Figure 18A:
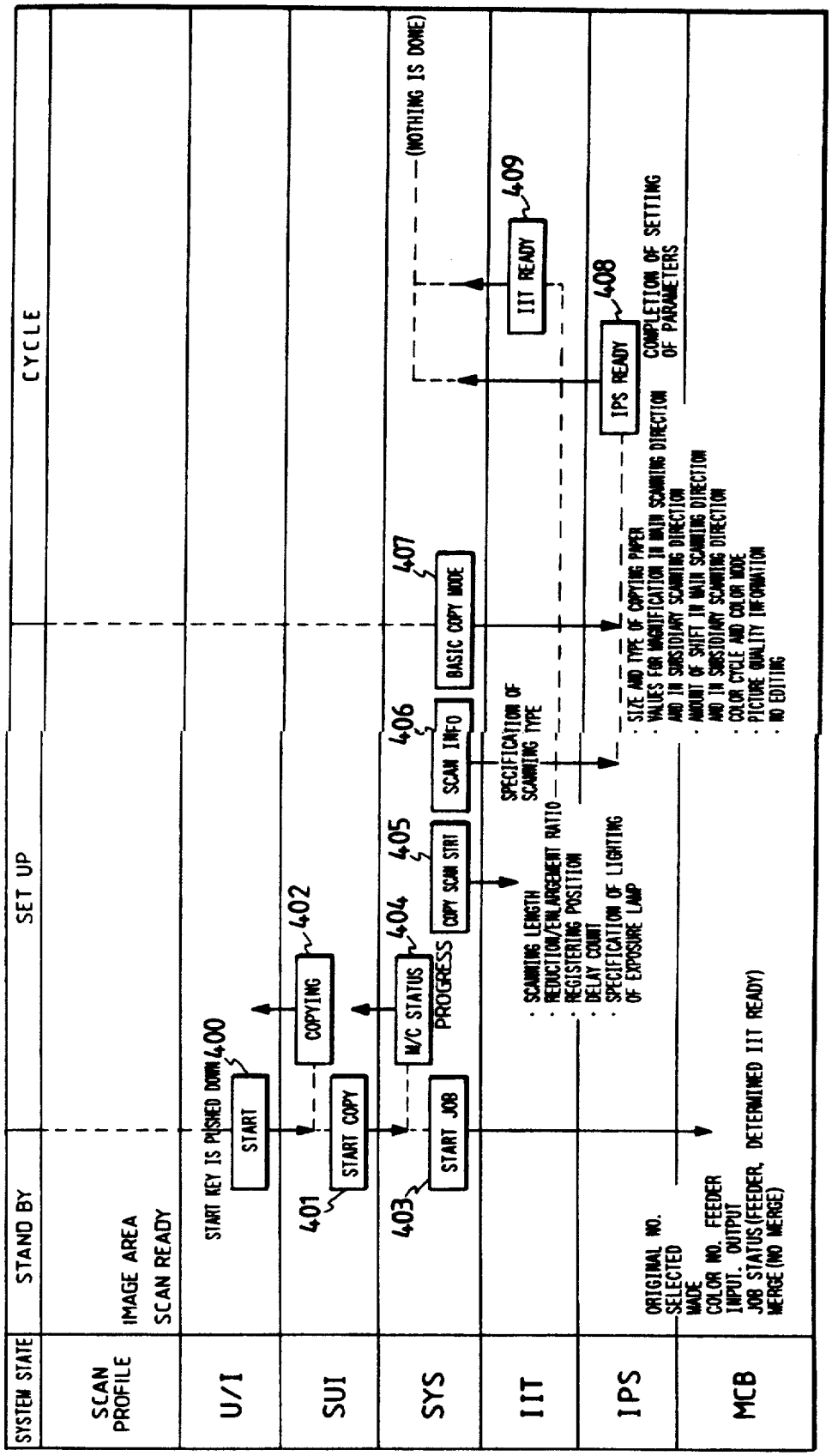
FIGS. 18(a) through 18(c) illustrate the correlations among the interfaces in the full-color manual copying mode in four colors.
Figure 18B:
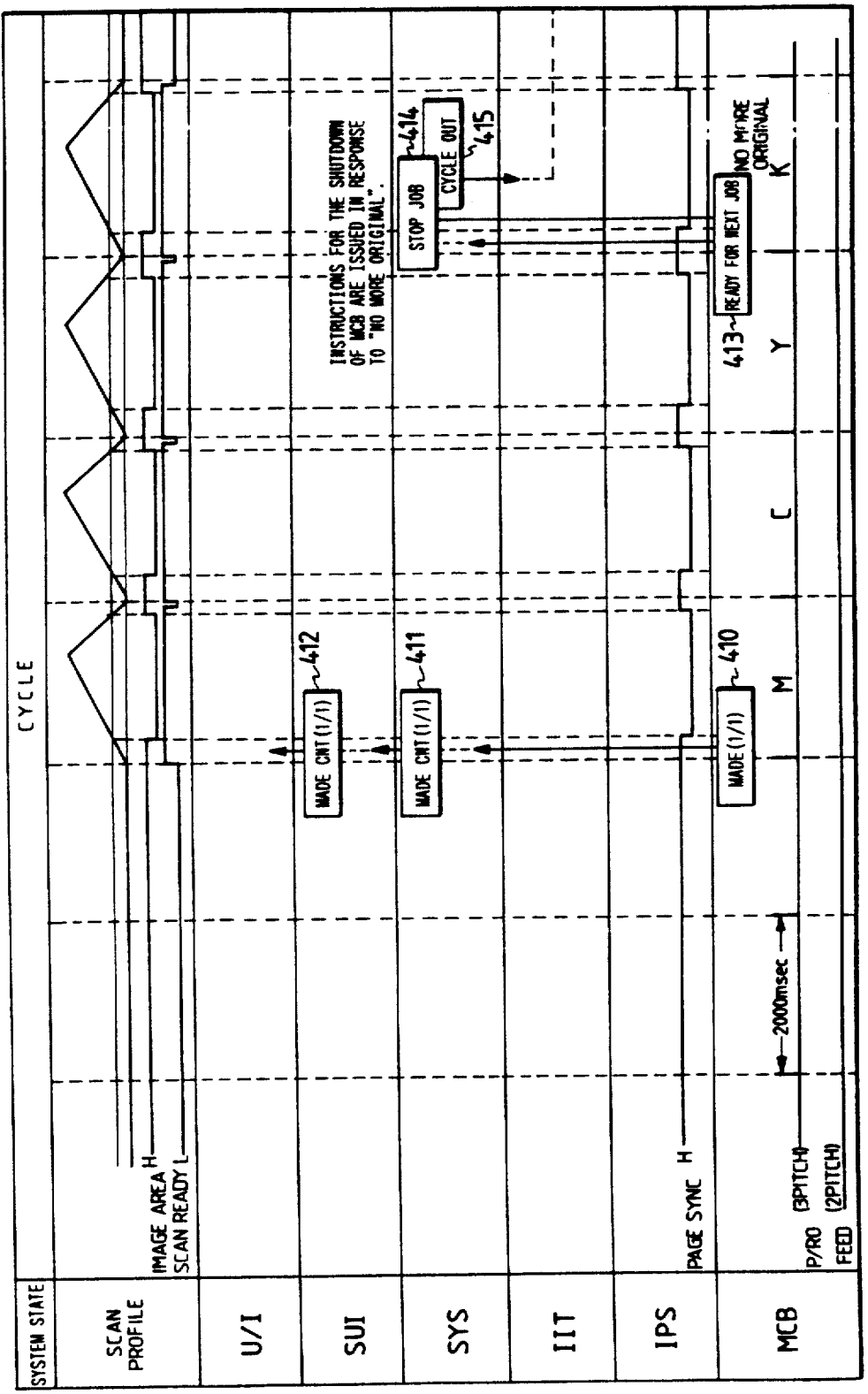
Figure 18C:
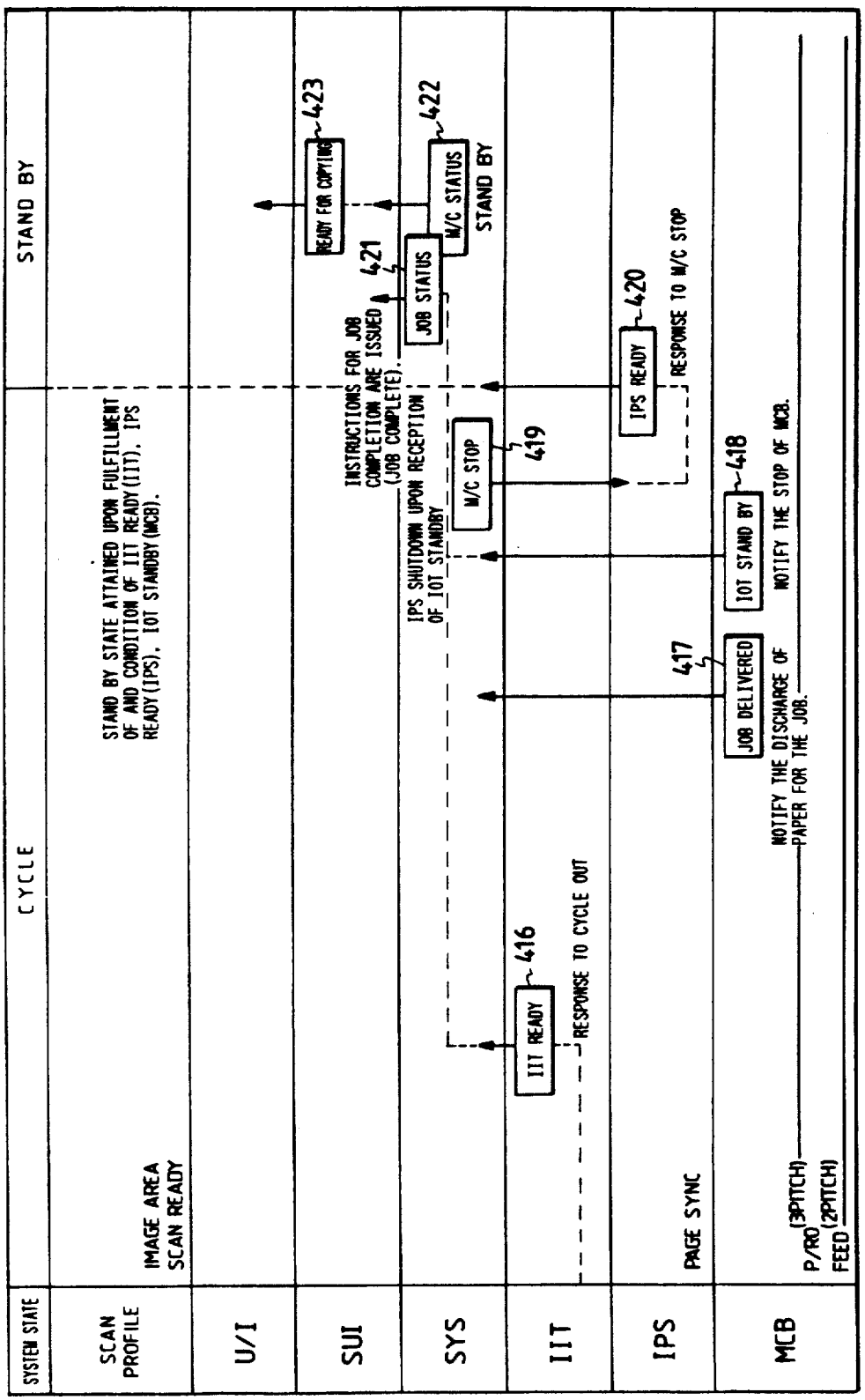
Figure 19A:
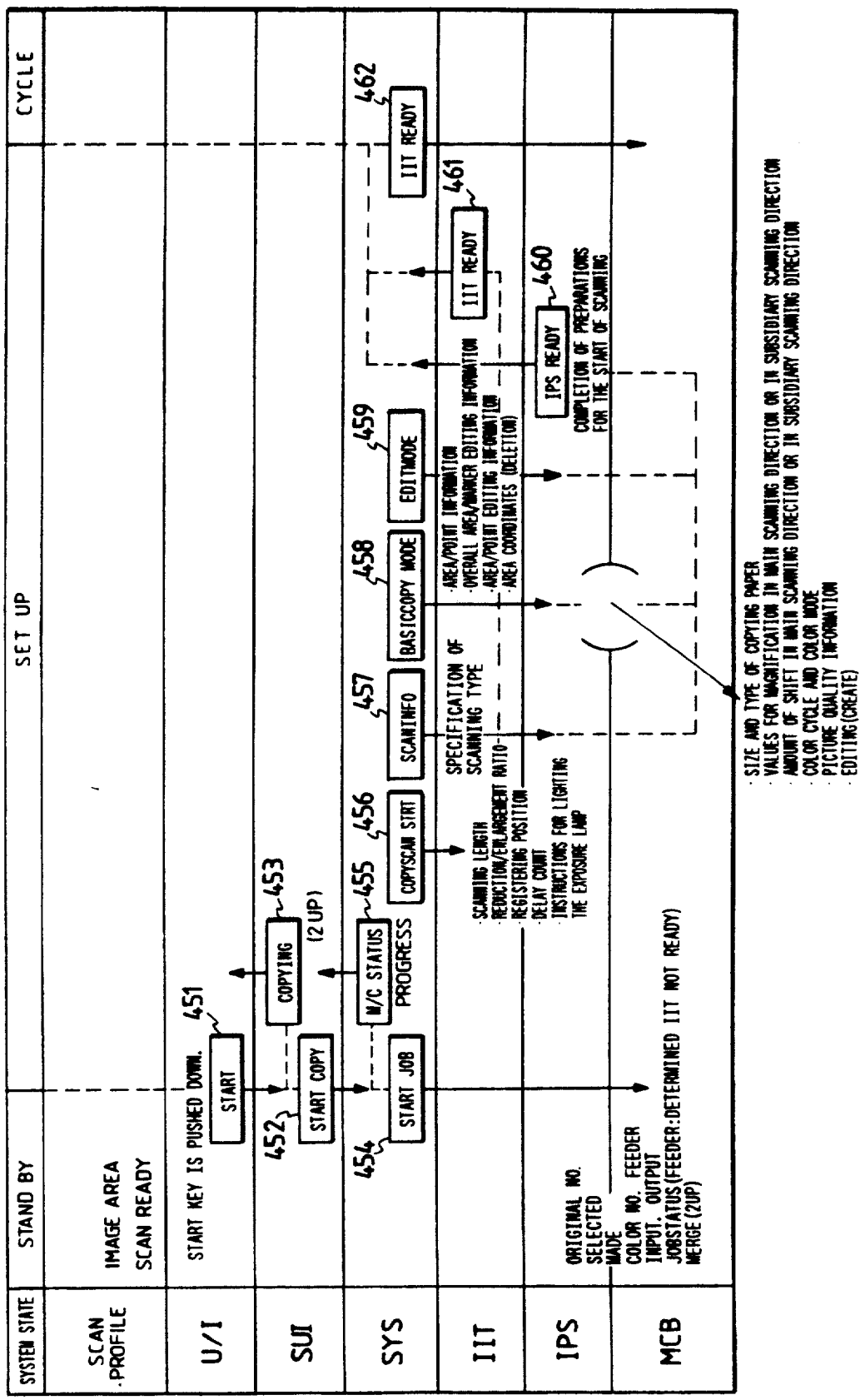
Figure 19B:
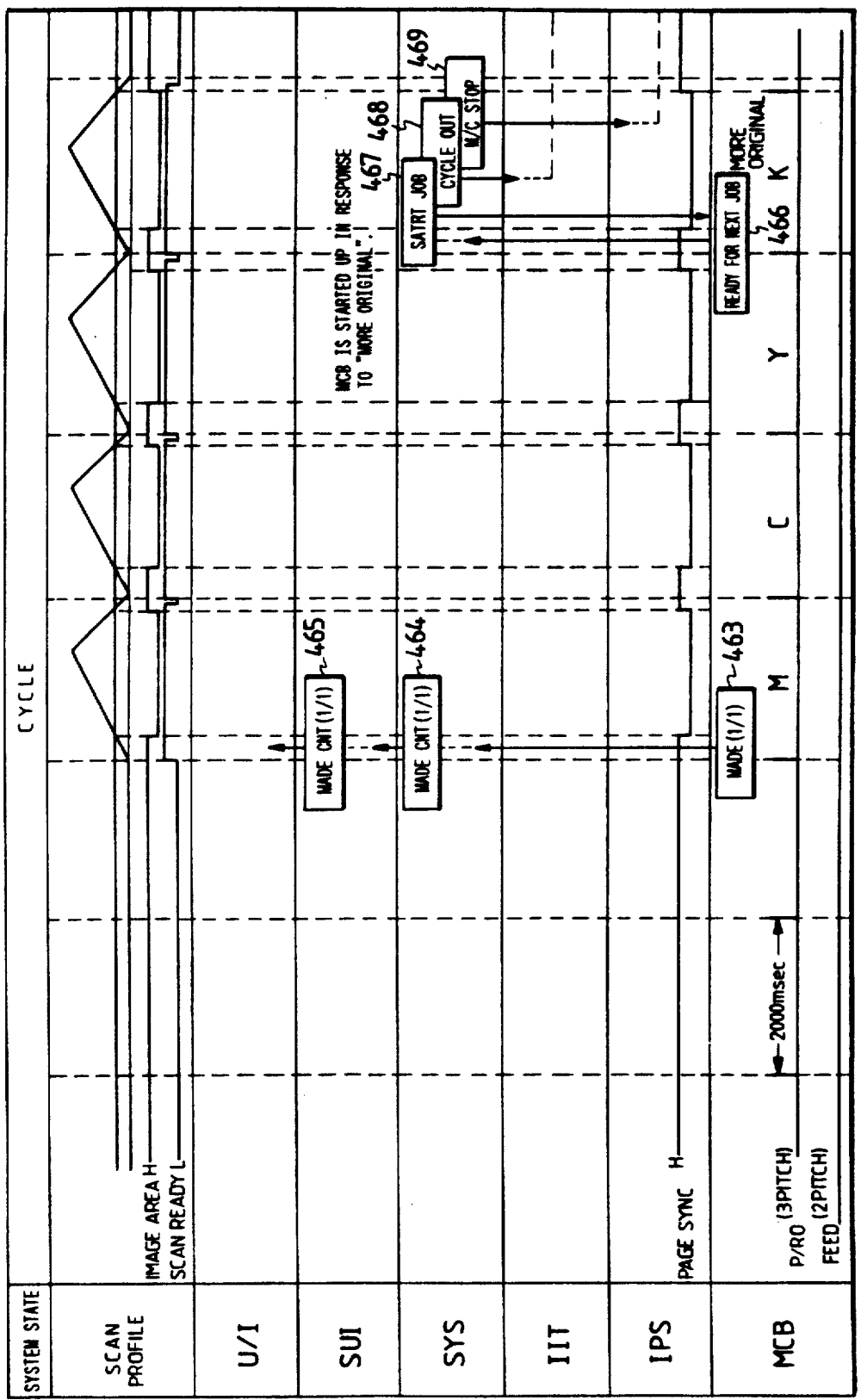
Figure 19D:
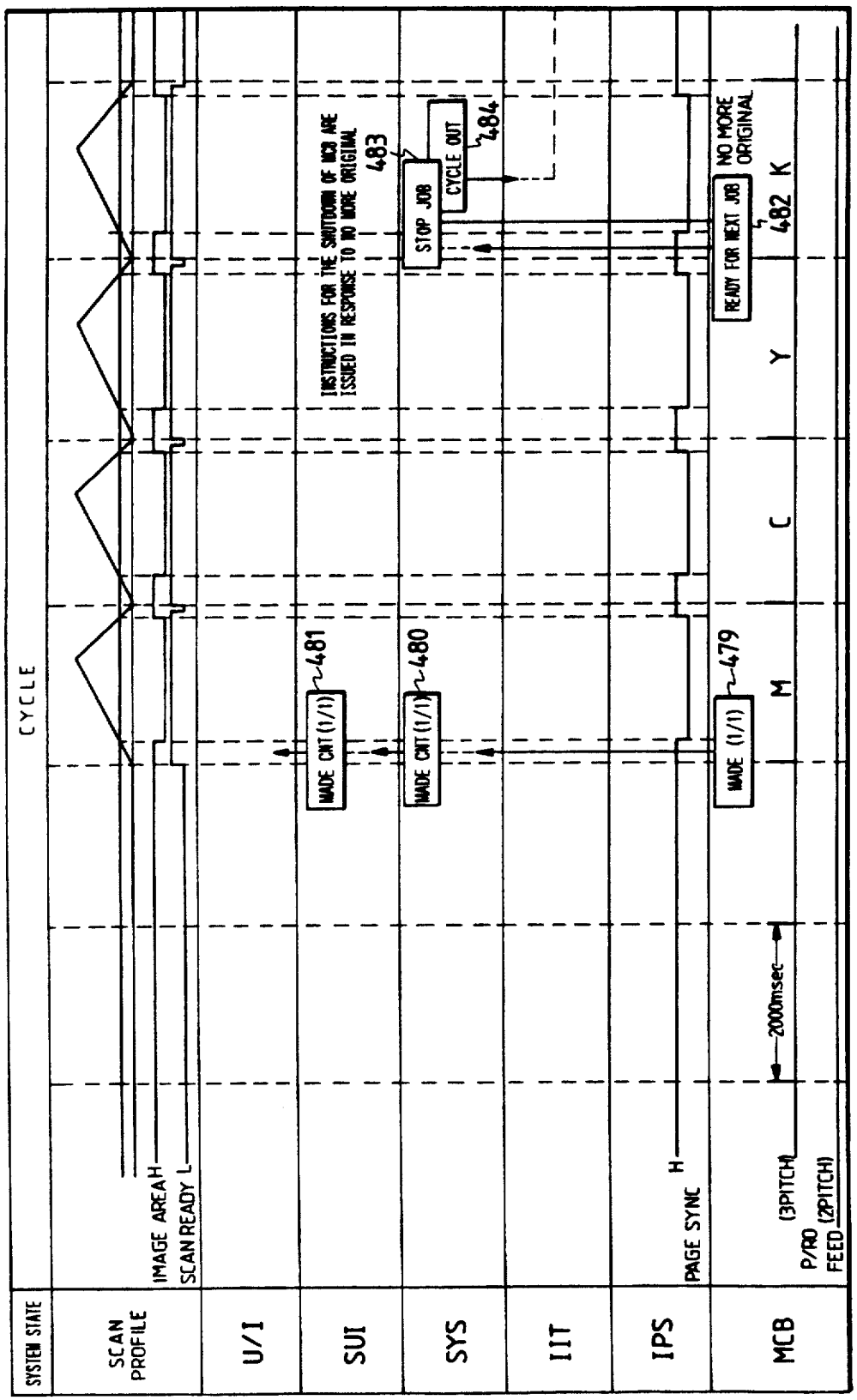
Figure 19E:
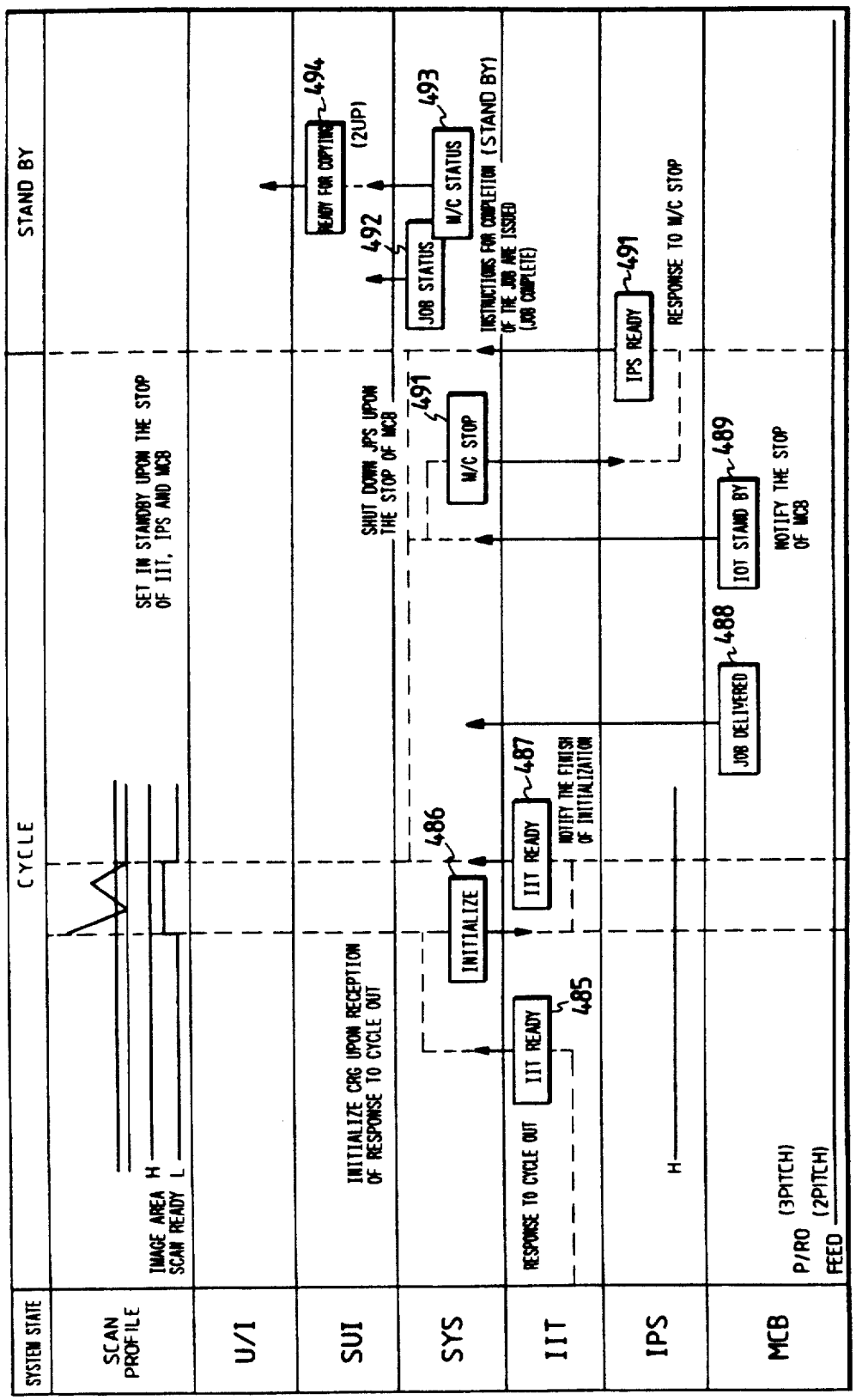
Figure 20A:
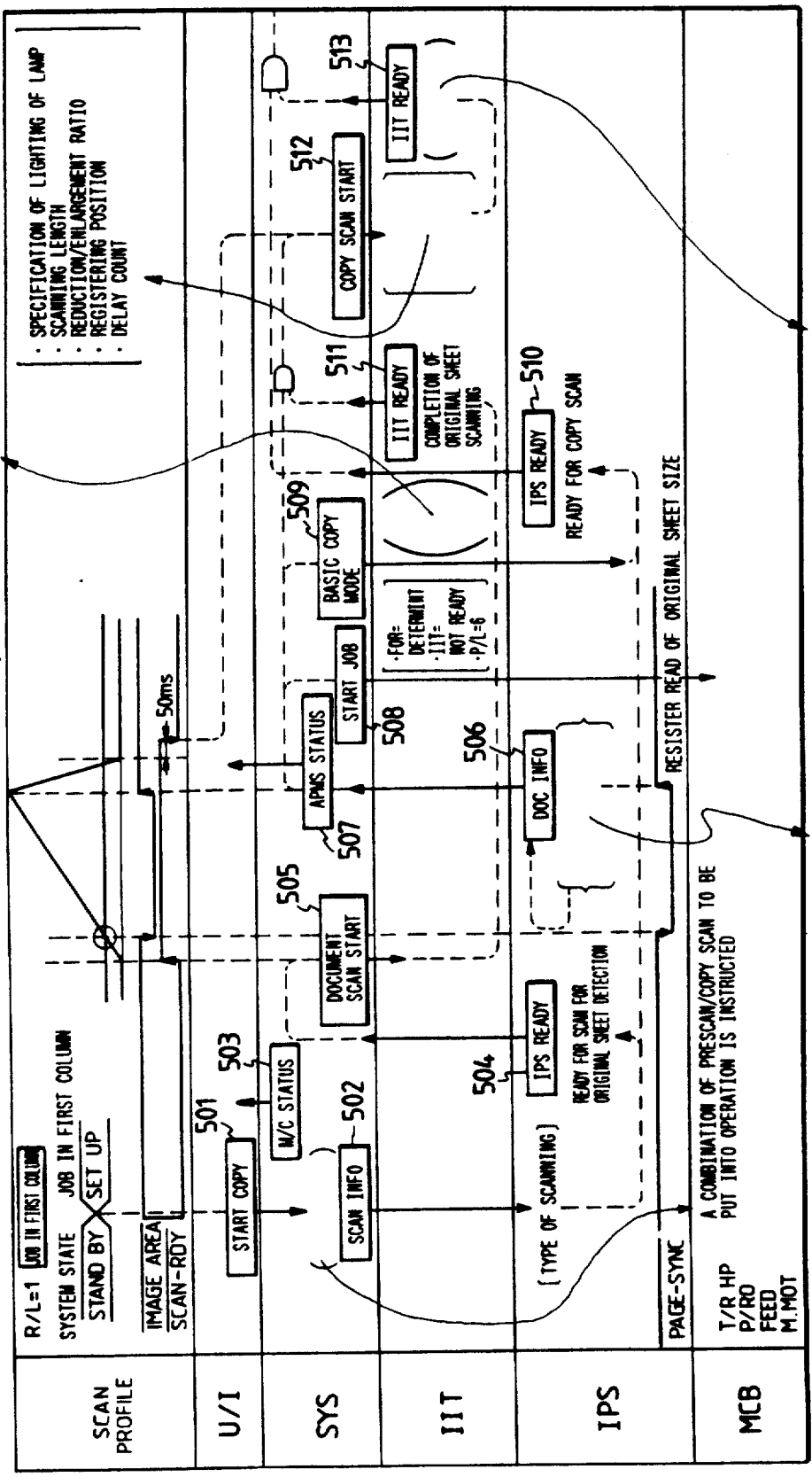
FIGS. 20(a) through 20(d) illustrate the correlations among the interfaces in the enlarging consecutive copying process.
Figure 20B:
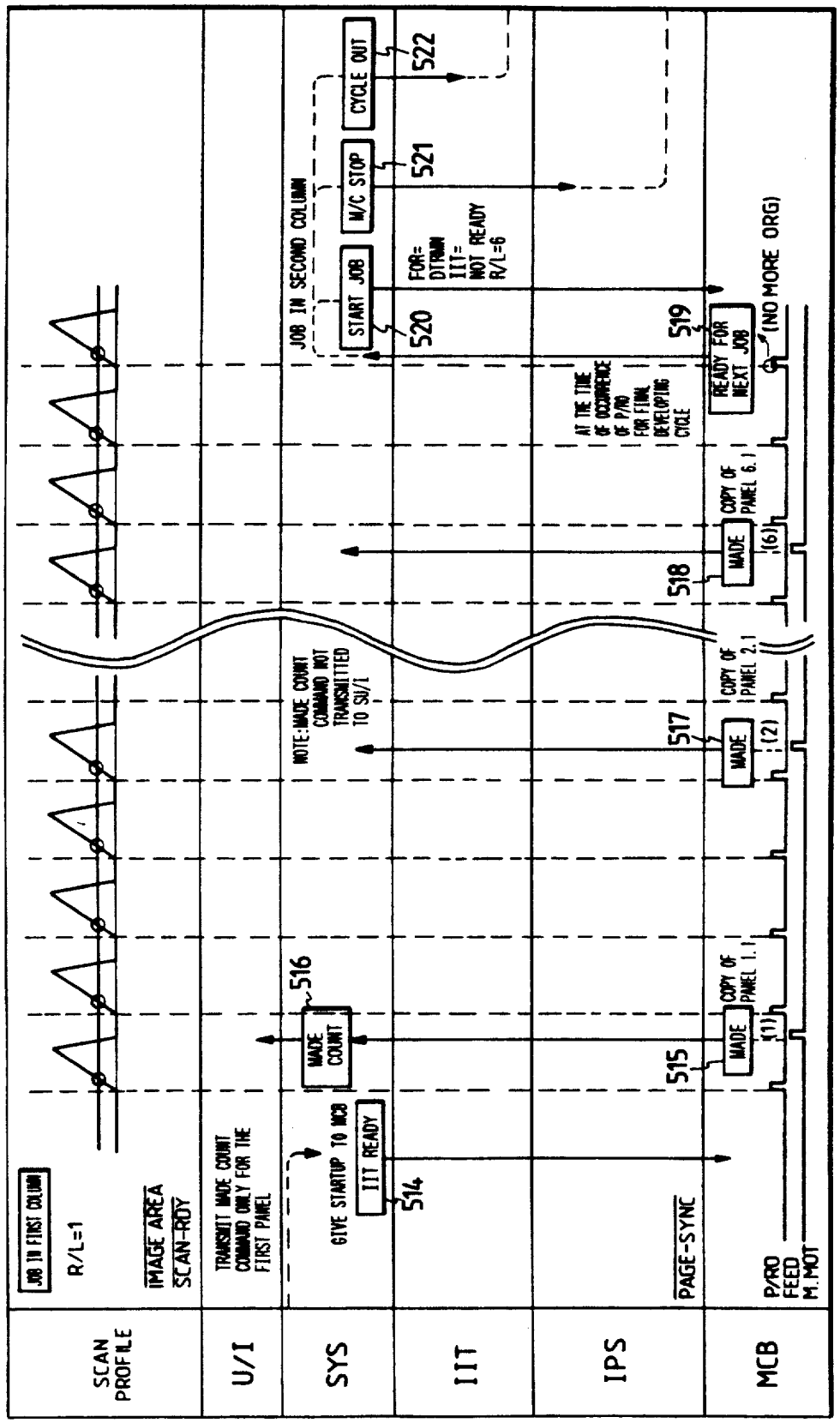
Figure 20C:
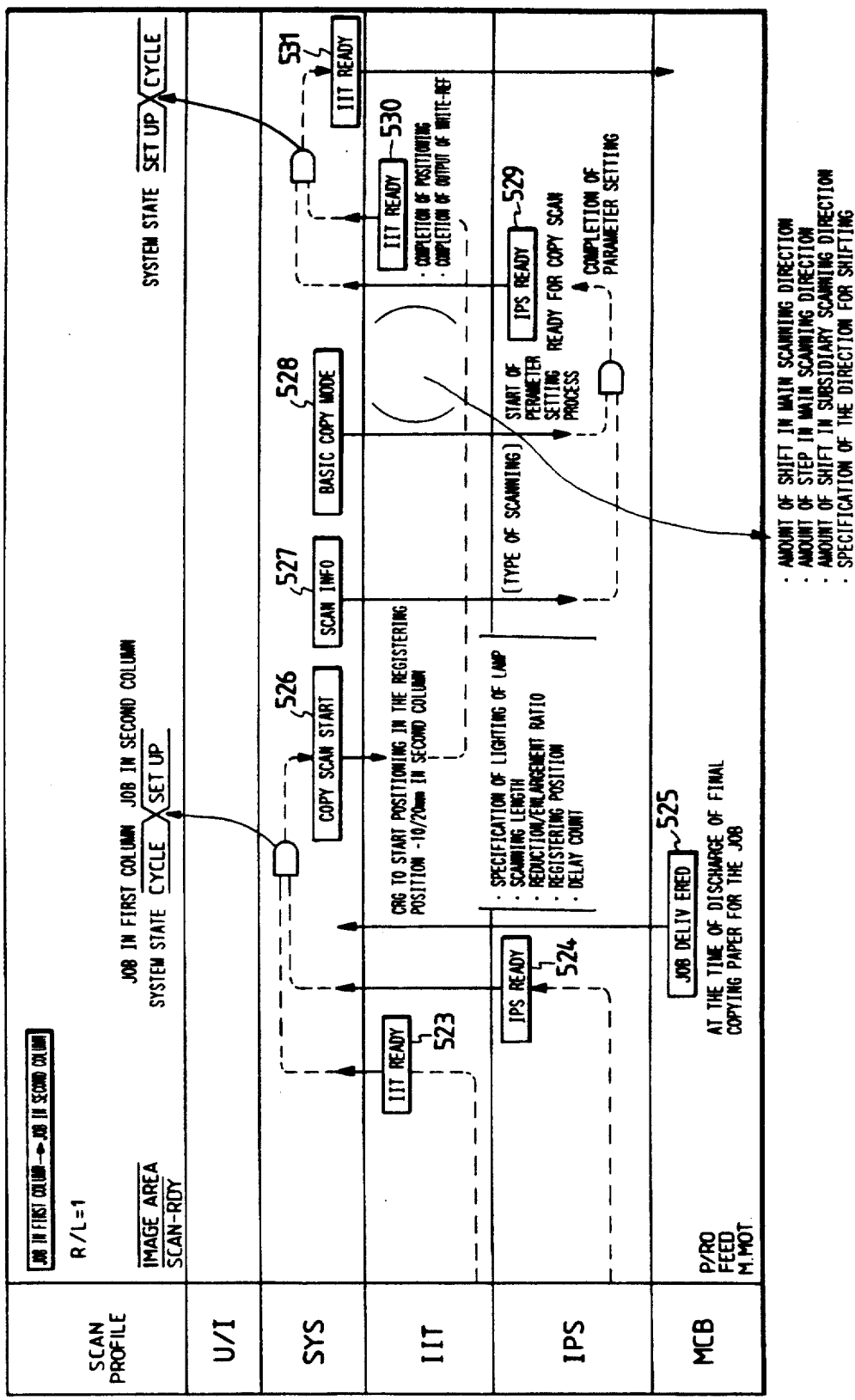
Figure 20D:
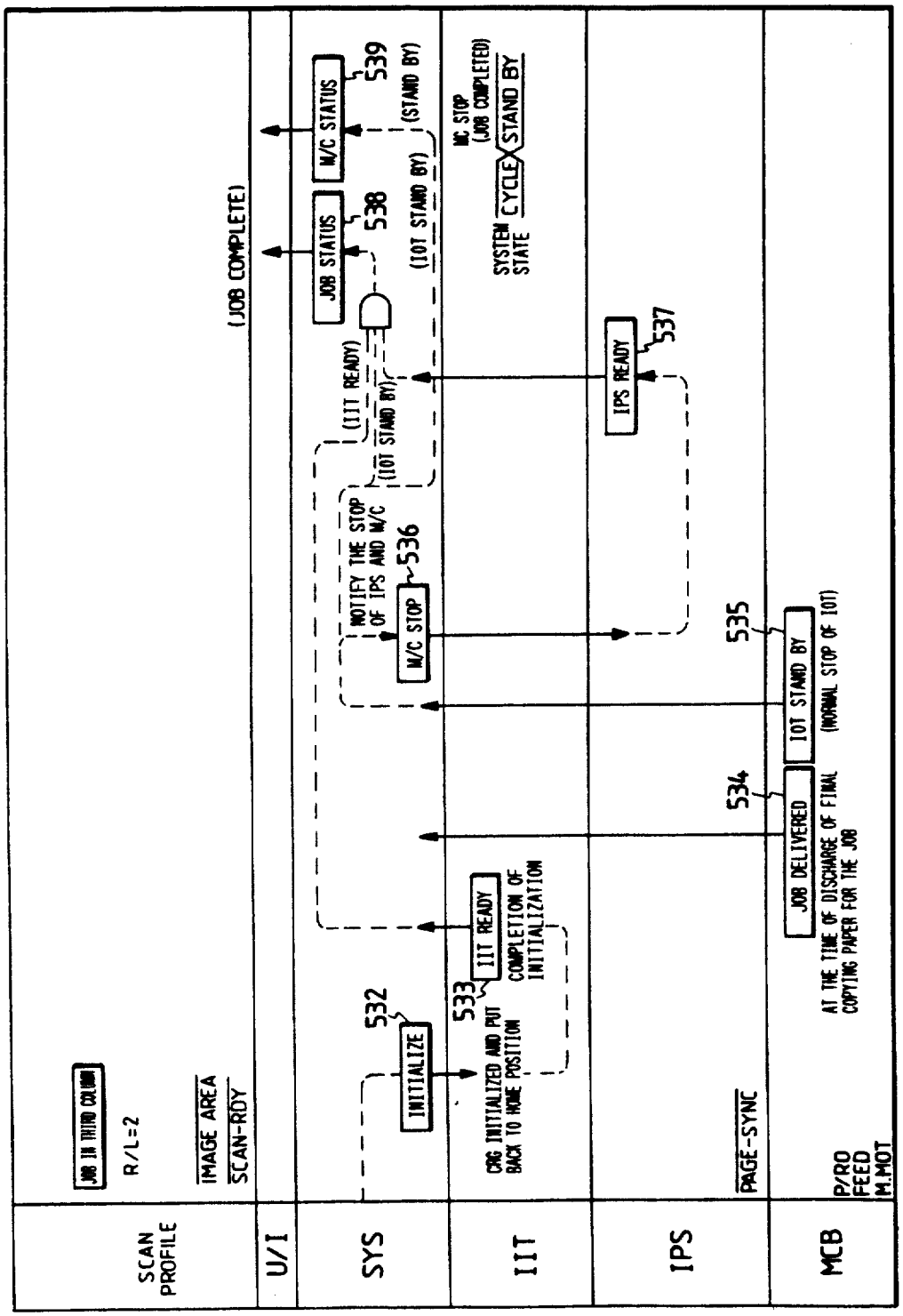

FIGS. 18(a) through 18(c) illustrate the correlations among the interfaces in the full-color manual copying mode in four colors.

FIG. 18 (a) shows that the system transmits the start job command 403 to the MCB when the SYS UI issues the star copying command 401 to it, indicating that the start key has been pushed when the equipment is in the standby state, and the MCB also rewrites the state in the shared RAM from "standby" to "setup". Then, the control of the CPU is handed over from the standby control section 102 to the setup control section 103, and the operations are executed accordingly.

This start job command 403 includes such additional items of information as the information on the original number, which indicates from which sheet of the original (as counted in terms of the ordinary number) the copying job should be started, the made count information, which indicates what ordinal number of sheet the current copy is, the information on the number of colors, such as four colors, three colors, and a single color, the feeder information, which indicates which tray should be used, the input and output information, which indicates whether or not the ADP is provided, whether or not there is a sorter, and so forth, the information on the readiness of the IIT, and the merge information, which indicates whether or not the job is to be performed in the synthesizing mode, and the system also transmits the IIT ready information. The IIT ready information is transmitted in the start job command to the MCB because the copying job is to be done in the manual mode, in which the paper size and the magnification are to be determined by the user's choice, and it would not be necessary to take any separate step later to transmit any IIT ready command to the MCB so long as a startup command is given to the MCB as a part of the start job command, and this approach makes it possible to perform the copying jobs quickly. This is also to be viewed in relation to the fact that the IIT not ready command is transmitted in such a case as a synthesizing composition, for example, in which there still remain some jobs to be performed by the IIT, such as the movement of the carriage to the position for the start of the scanning operation over the second original sheet, as described later, at the point in time when the system transmits the start job command. In contrast to this, nothing of the points just mentioned applied to the manual mode. Therefore, when the MCB receives a start job command, the IIT is ready to start the operation immediately.

Moreover, when the system receives the start copying command 401 from the SYS UI, the system transmits the M/C status command 404 to the SYS UI, conveying the information on the point whether the M/C is in the process of operation or remains stopped, and the SYS UI transmits the command 402 to the UI, thereby causing the message on display to be changed from "Ready for Copying" to "Copying".

Next, the system transmits to the IIT the copy scanning start command 405, which is necessary for the performance of the scanning operation. This command includes such additional items as the specifications of the scanning length, the reduction or enlargement ratio, the registering position, the delay count, and the lighting of the exposure lamps. The delay count is set by the counter for specifying the position for the start of the scanning operation at the second and the subsequent times in the case of the synthesizing copying job, as described later on. The registering position relates to the information on the position from which the copying operation is to be started.

Furthermore, the system transmits the scanning information command 406 to the IPS. This command is one that specifies one of AE scanning for determining the amount of light, prescanning for performing the recognition of color, and document scanning for detecting the size of the original sheet. In addition, the system transmits the basic copying mode command 407, which conveys the command information which, for example, includes the paper size, the paper type, the magnification values for the main scanning operation and the subsidiary scanning operation, the amounts of movement in the main scanning direction and the subsidiary scanning direction, the color cycles such as YCYK, YMC, YM, and MC, the color modes, the picture quality information, and the editing mode information, and at the same time rewrites the state in the shared RAM from the setup state to the cycle state, and, with the control over the CPU is delivered from the setup control section 103 to the cycle control section 104, the processing operations are executed. In this case, the system is designed to give instructions first to the IIT, which takes time in preparation. The system receives the IPS ready command 408 and the IIT ready command 409, in which case the system does not particularly transmits any ready signal to the MCB. This is due to the fact that the system has already transmitted the IIT ready command to the MCB together with the start job command, as mentioned above.

Next, as illustrated in FIG. 18 (b), the MCB sends the PR0 signals to the IIT at the intervals of 2000 msec if in three pitches, for example, in the cycle state, as shown in FIG. 18 (b), and the IIT automatically performs the carriage scanning operation each time it receives the PR0 signal from the MCB. The pitch represents the number of divisions applied to the division of the photosensitive material into a plural number of areas in such a way that the latent image formed on the photosensitive material will not be placed on the seam (the joint) of the photosensitive material, and, in the case of three pitches, the circumference of the photosensitive material is divided into three parts, with which three copying frames are formed. This number of divisions is determined by the paper size and the magnification ratio. Then, the PR0 signal is generated as the standard timing, so that a latent image is formed exactly in each of the copying frames. In this regard, the IIT does not perform any scanning operation unless the PR0 signal is generated. This PR0 signal relates to the copying layer, and thus forms a type of information with which the system does not concern itself.

The scanning operation is performed in the order of MCYK in the full-color copying process with four colors, and, with the PR0 signal for the scanning operation for magenta, the made (1/1) command 410, which signifies that one sheet of paper is fed out, is transmitted to the system, and, when the system receives the made command transmitted from the MCB, the system transmits the made count (1/1) command 411 to the SYS UI, which in its turn transmits the command 412 to the UI, thereby having the UI display "1/1". Upon the reception of the PR0 signal, the IIT starts the scanning operation from the home position, then performing the scanning operation again for cyan at the next PR0 signal and thereafter performing the scanning operations for yellow and for black respectively. The timing of the scanning operations is set with the scanning ready signal.

Then, each time the carriage passes the registering position, the IIT generates the image area signal, and, in synchronization with this, the page synchronizing signal comes into the IPS, and the IPS takes into itself the data generated from the IIT in the period. The image area is set up with the delay count value set by the definition of the area by the user for use as the area where a copy is to be produced, and this area is delimited in a signal generated by the IIT. Thereafter, the ready for next job command 413 is transmitted from the MCB to the system at the time of the final scanning operation. This command conveys the communication data taken as the basis for the judgment on the point whether or not the shutdown operation is to be executed, and the system sends the stop job command 414 to the MCB, thereby instructing the MCB to shut down the equipment.

At the same time, the system monitors the image area signal and transmits to the IIT the cycle out command 415 in demand of the shutdown operation for turning off the lamp, using as the trigger the falling of the image area signal after the carriage passes the registering position in the back scanning with the carriage in the final scanning operation.

Next, as shown in FIG. 18 (c), the IIT turns off the lamp in response to the cycle out command 415, sending out the IIT ready command 416 to the system and notifying the system that the carriage has returned to its home position. Furthermore, the MCB informs the system, by the job delivered command, that the paper for the job has been discharged and then notifies the system, by the IOT standby command 418, that the MCB has come to a stop. When the system is informed of the stopping of the MCB by the IOT standby command 418 which it has thus received, the MCB issues the M/C stop command 419 to the IPS, thereby shutting down the IPS and causing the parameters transmitted to the IPS in the basic copying mode command to be cleared. Then, the system receives in return the IPS ready command 420, which means that the IPS, responding to the M/C stop command 419, has cleared the parameters transmitted to it in the basic copying mode command and has made preparations for the next copying job. When the AND condition for the IIT ready command 416, the IOT standby command 418, and the IPS ready command 420 is satisfied, the cycle control section 104 rewrites the state from "cycle" to "standby", then delivering the control of the CPU to the standby control section 102. When the system is so set into the standby state, it transmits to the SYS UI the job status command 421, which indicates the job complete and further transmits the standby command as the M/C status command, and the SYS UI sends the message command 423 to the U/I, making the U/I display the message, "Ready for Copying".

(c) Example 3 of Correlations of Interfaces

FIGS. 19(a) through 19(e) illustrate the correlations of the interfaces in the synthesizing copying operation in the manual mode.

Here, the term, synthesizing copying, means the mode in which a synthesized copy is produced on one sheet of paper from two original sheets in equal size copied by a reduction in size with the image on one sheet being set in the other. For example, this mode is applied to two original sheets in the A4-size are copied by a 70-percent reduction for their synthesized reproduction in a copy on one sheet in the A4-size.

FIG. 19 (a) illustrates a case in which the start key is pushed for a copying job in the synthesizing copying mode when the equipment is in the standby state.

In the present example of embodiment, the information on merging (synthesizing the images on the original sheets to form one integrated copy) is additionally furnished to the MCB at the stage where the system, having received the start copying command 452, transmits the start job command 454 to the MCB, and the value of the delay for the second original sheet is set. Yet, unlike the case of the basic manual operation mode, the IIT not ready command is transmitted to the MCB. That is to say, unlike the case with the basic manual operation mode, there still remain some jobs, such as the setting of the position for the start of the scanning operation over the second original sheet, which the IIT should finish, and therefore the startup command is not given to the MCB in this case. In the copy scanning start command 456 transmitted from the system to the IIT, the value of the delay count is set in addition to the information specifying the scanning length, the reduction or enlargement, the registering position, the lighting of the exposure lamp, etc., and the position for start of the scanning operation for the production of the second copy is set with the said delay count. Moreover, in the case of the basic copying mode, the state is rewritten from "setup" to "cycle" at the same time as the transmission of the scanning information command 457 and the basic copying mode command 458, which together specify the type of scanning, but, in addition to these, the editing mode command 459 is transmitted to the IPS in the case of this example of embodiment. This is a command which is always transmitted in case the editing mode is selected, and this command conveys the area point information for the selected area, the overall marker editing information, the area point editing information, the area coordinates, and so forth. In contrast to this, the system effects the transition from the setup state to the cycle state at the timing at which the system returns the IIT ready command 462 to the MCB on condition that it has been decided which is the area in which the IPS should read into itself out of the data read as they are transmitted by the scanning operation by the IIT, that is, on condition that the IPS ready command 460, which indicates the completion of the preparations for the start of the scanning operation by the IIT, and the IIT ready command 61, which indicates the completion of the setting of the individual parameters for the copy scanning start command, have been returned. Since the editing mode is thus included, the system is so designed that it informs the completion of the preparations for the said mode in the IIT ready command 462 which it issues to the MCB.

FIG. 19 (b) illustrate the copy scanning operation in the cycle state. The operations are the same as those performed in the case of the basic mode, but are different in the point that the command which the system returns to the MCB in response to the ready for next job command 466 issued from the MCB at the final scanning operation is not "stop job", but the start job command 467 for the execution of the scanning operation for the second original sheet. Moreover, even in case the scanning operation for the second original sheet should be continued further, the system always sends the cycle out command 468, which is the command for turning off the lamp, to the IIT in the final scanning operation for the first original sheet and transmits the M/C stop command 469 to the IPS, thereby shutting down the IPS. These operations form the process for clearing the parameters returned to the IPS by the basic copying mode command and for setting the IPS into its preparations for the second original sheet.

Next, as shown in FIG. 19 (c), the system rewrites the state from "cycle" to "setup" upon its reception of the IIT ready command 470, which is issued in response to the cycle out command 468, and the IPS ready command 471, which means that the parameters for the preceding operation have been cleared in response to the M/C stop command. In this setup state, the system makes preparations for the start of the next scanning operation, and, as shown in FIG. 19 (a), specifies, for example, the scanning length, the reduction or enlargement, the registering position, the delay count, the lighting of the exposure lamp, and so forth by the copy scanning start command 472, the scanning information command 473, the basic copying mode command 474, and the editing mode command 475, and moves the position of the carriage under the instructions by the copy scanning start command 472, bringing the carriage to the position for the start of the carriage for the second original sheet. When the IPS ready command 476 and the IIT ready command 478 have been transmitted to the system as these preparations have been made, the system transmits the IIT ready command 478 to the MCB and rewrites the state from "setup" to "cycle".

Thereafter, the scanning operation is performed in the same manner for the second original sheet. This copy scanning operation is the same as that performed in the case of the full-color copying process in the four colors (FIG. 19 (d)). Then, when the IIT ready command 485 is transmitted to the system, as shown in FIG. 19 (e), after the lamp is turned off by the IIT in response to the cycle out command 484 transmitted from the system, the system transmits the initialize command 486 to the IIT, thereby causing the carriage to be initialized. This step is the initializing process performed in order to prevent the carriage from stopping in the position for the scanning operation of the second original sheet since the registering position has been shifted to the position for scanning the second original sheet as the copying operations are in the synthesizing copying mode. In this initializing process, the carriage is brought to the home position across the registering position in the basic copying mode.

Upon the completion of the initialization of the carriage, the IIT ready command is transmitted to the system. Moreover, the MCB transmits the job delivered command 488, which notifies the completion of the discharge of the paper, and the IOT standby command 488, which notifies that the MCB has stopped, to the system. The system issues the M/C stop command 490, thereby notifying the IPS that the MCB has stopped and instructing the IPS to shut down. In response to this, the IPS transmits the IPS ready command 491, which means that the parameters transmitted to the IPS by the basic copying mode command have been cleared, to the system. The system rewrites the state from "cycle" to "standby", on condition that the IIT ready command 487 and the IPS ready command 491 have been received, and notifies the SYS UI of the effected rewriting of the state. As the user interface control authority is present on the system side, the SYS UI transmits the message command 494 to the UI, thereby making the UI to display the message, "Ready for Copying".

(D) Example 4 of Correlations of Interfaces

FIGS. 20(a) through 20(d) illustrates the correlations of the interfaces in the enlarging consecutive copying mode. In this regard, FIG. 20 puts the SUI and the UI together and represent them as the UI in the illustration for convenience in view of the limited space on the sheet.

The enlarging consecutive copying mode is the mode in which the various parts of the original sheet in magnified forms and connecting a plural number of such enlarged copies, thereby producing a very large copy, and thus this is the mode for dividing one original sheet into a plural number of areas and enlarging the individual divided areas in such a manner as to produce a composite copy in the specified finish size. Now, this example of embodiment is described with respect to a case with R/L=2, the original sheet in A4L (297 mm×210 mm), the copying paper in A4S (210 mm×297 mm), the image size A0L (1,188 mm×840 mm), the magnification 40%, and six lines in three columns.

Figure 21A:
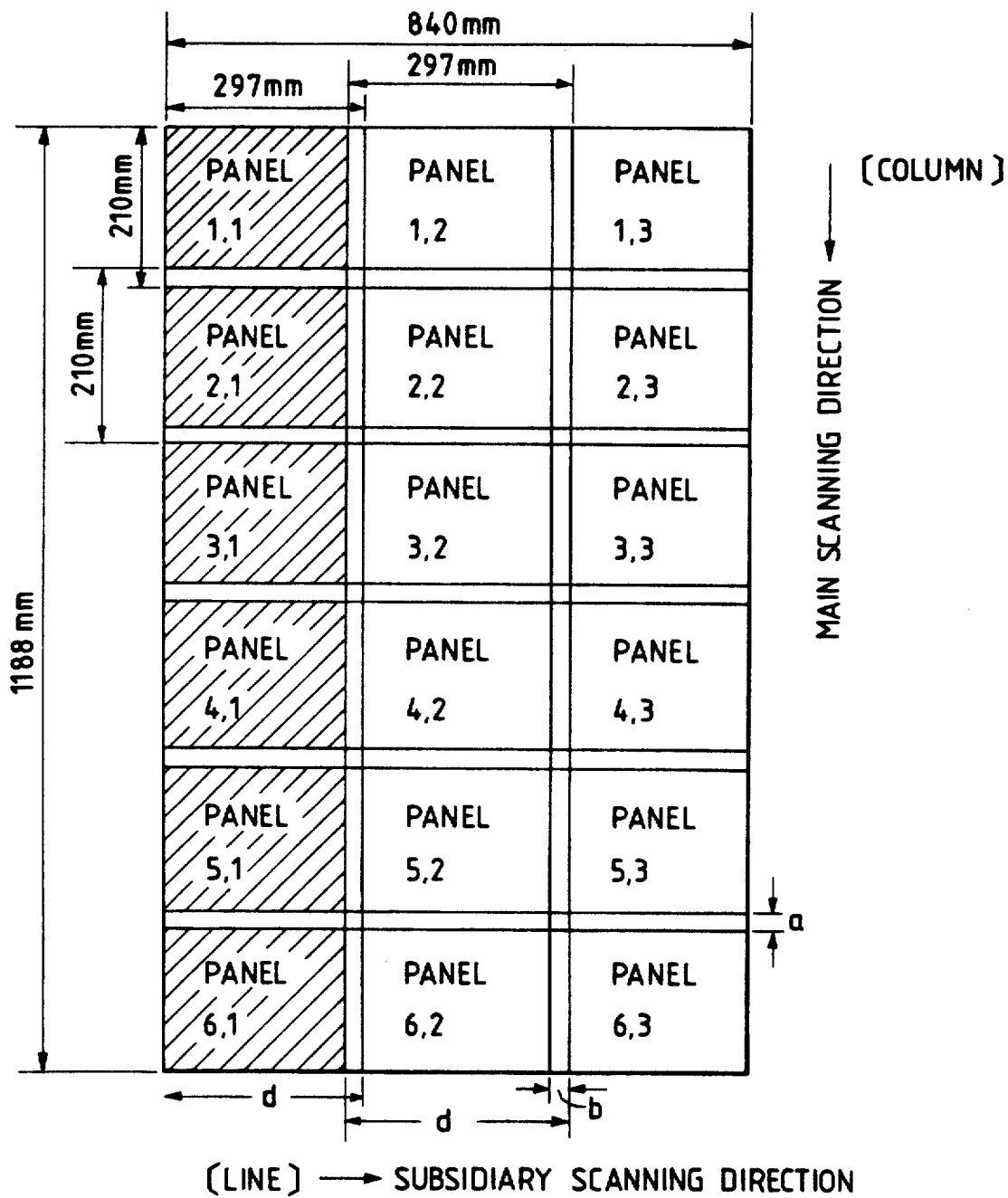
FIGS. 21(a) through 21(c) illustrate the division into the panels in the enlarging consecutive copying process.
Figure 21B:
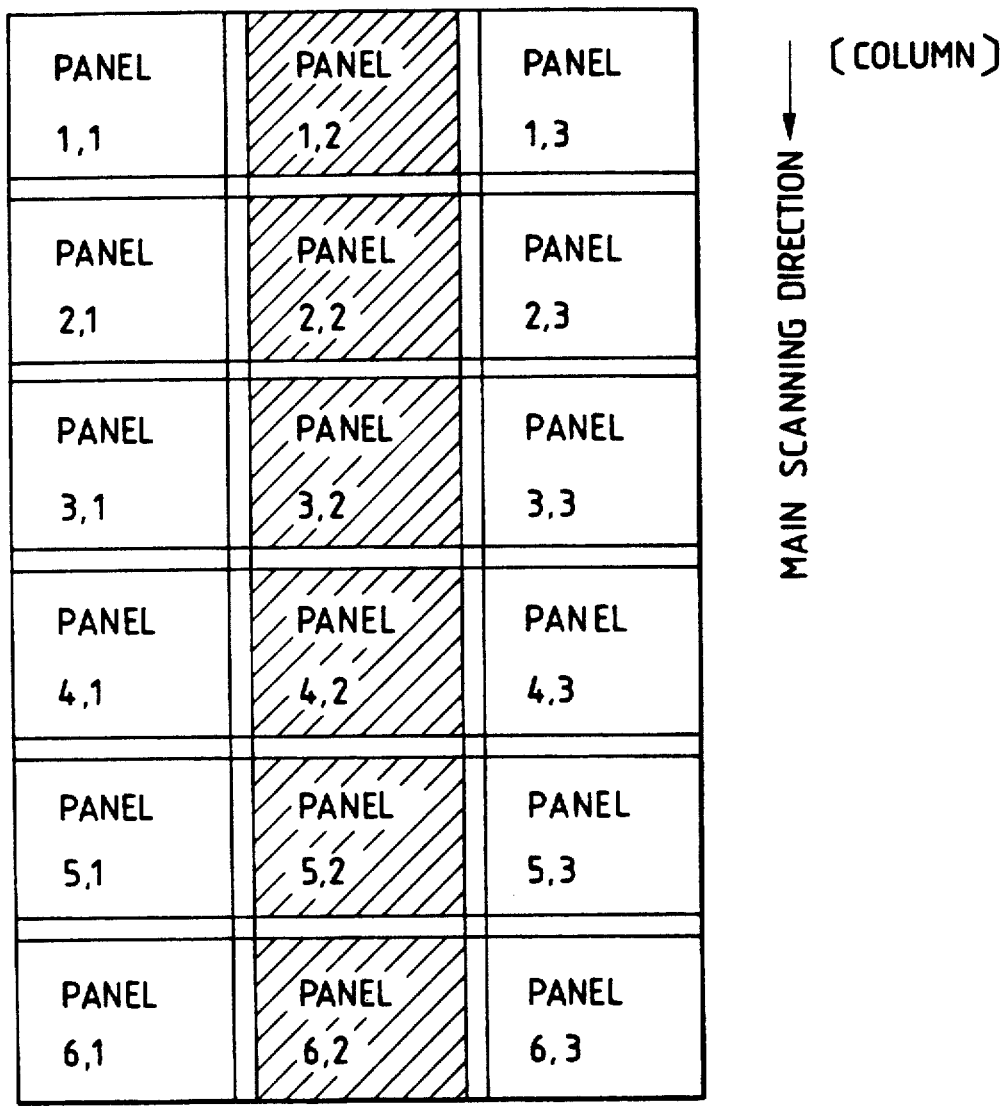
Figure 21C:
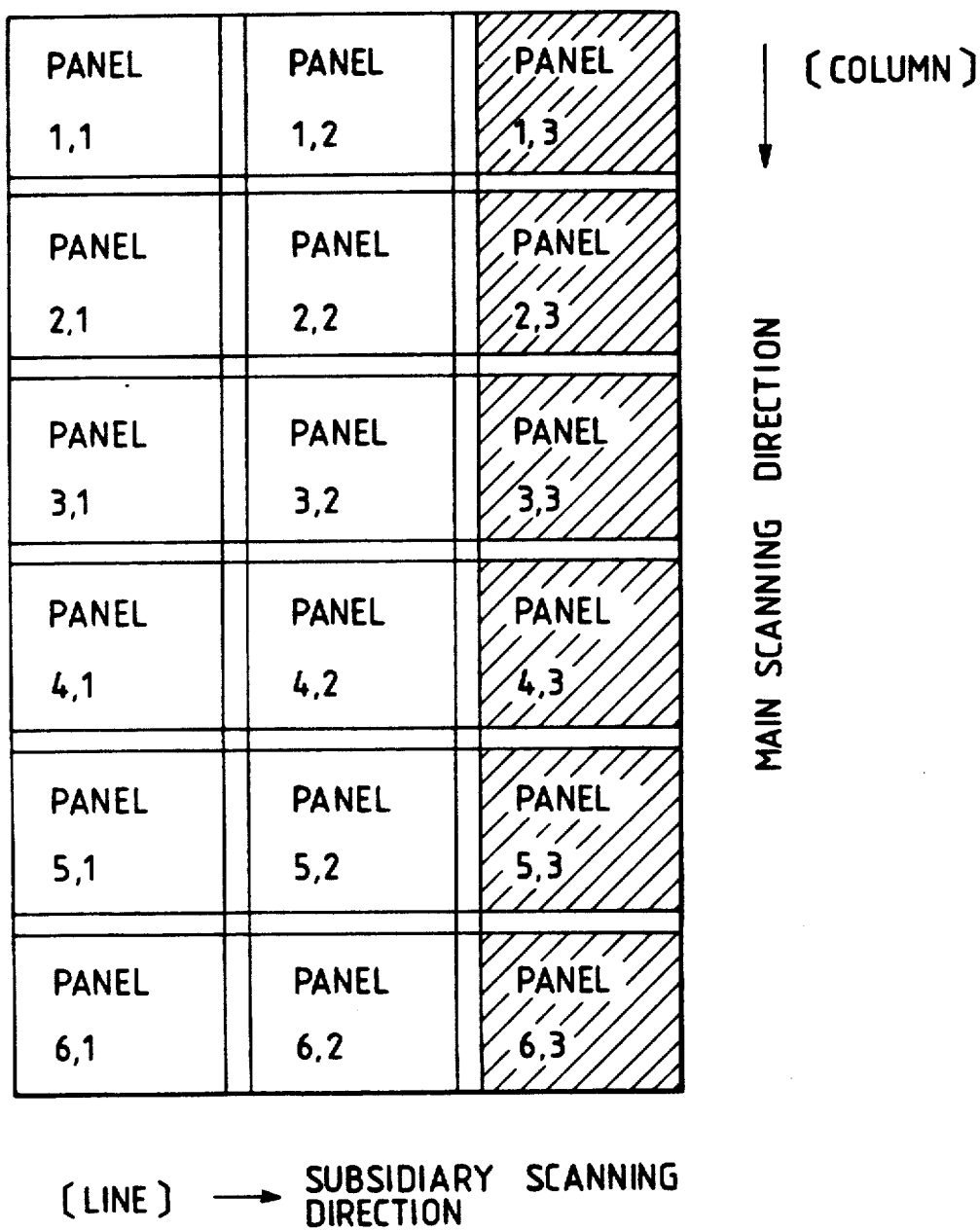

As shown in FIG. 21 (a), the original sheet is divided into six parts in the main scanning direction (columns) and into three parts in the subsidiary scanning direction (lines) to produce a form composed of six lines and three columns, and the individual divided parts are enlarged and copied with the magnification of 40%. The eighteen individual panels together correspond to the paper size of A4S in terms of the finished size, and the length of the copy in the main scanning direction is 210 mm and the length of the said copy in the subsidiary scanning direction is 297 mm. As the image size of these panels as joined together or as finished corresponds to A0L, the overall length in the main scanning direction is 1,188 mm while the length in the subsidiary scanning direction is 840 mm.

Accordingly, the overlapping amount a of the individual panels in the main scanning direction is:

$$a = (210 \times 6 \text{ mm} - 1,188 \text{ mm}) \div 5 = 14.4 \text{ mm}$$

The overlapping amount b of the individual panels in the subsidiary scanning direction is:

$$b = (297 \times 3 \text{ mm} - 840 \text{ mm}) \div 3 = 17 \text{ mm}$$

By joining the copies with some overlappings in the main scanning direction and the subsidiary scanning direction in this manner, the system according to this invention as shown in this example of embodiment is capable of producing an enlarged composite copy without seams or breaks.

First, the job for the first column is performed by copy scanning the areas corresponding the paper size of A4S in the order of the panels 1.1, 2.1, . . . 6.1. Next, copy scanning is performed in the order of the job for the second column, which is performed with the registering position being shifted just by d=297−17=280 mm, and then the job for the third column, which is performed with the registering position being shifted by the same amount.

As shown in FIG. 20 (a), the system rewrites the state from "standby" to "setup", with the start copying command 501 received from the UI. The system transmits the scanning information command 502 to the IPS, thereby specifying the type of scanning, i.e. which of prescanning, document scanning, and copy scanning is to be employed. Then, when the IPS ready command 504, which is a ready signal for the document scanning, has come transmitted to the system, the system transmits the document scanning start command 505 to the IIT, and the IIT performs document scanning in response to this command. When the detection of the original sheet has been done as the result of the document scanning, the IPS transmits the document information command 506 to the system. Also, in case of an error in the detection of the original document, a caution command is transmitted from the IPS to the system, but the document information command is not sent out. On the basis of this caution command, the system forms the judgment that the detection of the original sheet has not been done. However, when the document information command has come transmitted, the system sends the APMS status command 507 to the UI, thereby informing whether or not the proper copying paper is available. If the proper copying paper is not available, the system judges that there is a fault, for which the system have the equipment shut down. When the proper copying paper is present, the system transmits the start job command 508 to the MCB. On this occasion, as in the synthesizing copying process, the system transmits the IIT not ready command to the MCB, and does not effect the start here since there still remain some jobs to be executed. Also, the present number of sheets is to be set at 6 as the copying operations are to be performed on six lines.

Next, the system transmits the basic copying mode command 509 to the IPS, thereby instructing the amount of shift in the main scanning direction, the amount of the shifting step in the main scanning direction, the amount of shift in the subsidiary scanning direction, and so forth, and, when the IPS sends a ready signal for the copy scanning operation as the IPS ready command 510, the system transmits to the IIT the APMS status command 507 and the copy scanning start command 512 with the AND condition set for the IIT ready command 511, thereby instructing the specification for the lighting of the lamp, the scanning length, the reduction or enlargement ratio, the registering position, and the delay count. Then, when the output of the blank space referencing signal is completed, with the carriage moved to the position for starting the scanning operation, the IIT ready signal comes transmitted to the system. When the AND condition of this IIT ready command 513 and the IPS ready command 510 is fulfilled, the system starts up the equipment by sending the IIT ready command 514 to the MCB, as illustrated in FIG. 20 (b). At the same time, the system rewrites the state from "setup" to "cycle". Thereafter, the equipment execute the copying operations in the regular sequence as though the preset number of sheets were six, in the same manner as in the case of the synthesizing copying mode described above. Then, at the time when the PR0 reference signal is generated for the final developing cycle in which the job in the first column is finished, the MCB transmits the ready for next job command 519 to the system, and the preparations for the second column is started therewith. Now, in the same manner as in the case of the synthesizing copying operation described with reference to FIG. 19 (b), the system transmits to the IIT the cycle out command 522, which is the command for turning off the lamp, and also sends the M/C stop command 521 to the IPS, thereby shutting down the IPS and clearing the IPS of the parameters transmitted to the IPS by the basic copying mode command.

Next, as shown in FIG. 20 (c), the system rewrites the state from "cycle" to "setup" when the system receives the IPS ready command 524, which means that the parameters for the preceding run have been cleared in response to the M/C stop command 521. This step is taken because the logic of the start copying command to be employed at the next step has nothing but "setup", as mentioned above. In this setup state, the system specifies the scanning length, the reduction or enlargement, the registering position, the delay count, the specification for the lighting of the exposure lamp, and so forth by the copy scanning start command 526, the scanning information command 27, and the basic copying mode command 528, in the same way as in the case shown in FIG. 20 (a), and then causes the position of the carriage to be shifted to the starting position for the carriage under the instructions by the copy scanning start command 472. When the IPS ready command and the IIT ready command 530 are transmitted to the system, upon the completion of these preparations, the system sends forth the IIT ready command 531 for the next scanning operation to the MCB and rewrites the state from "setup" to "cycle".

Thereafter, the system executes the copy scanning operation in the same manner in regular sequence, performing the same scanning operation two times since R/L=2 is specified for it, although a description thereof is omitted here, transmits the stop job command in response to the ready for next job command, which comes transmitted to the system from the MCB at the time when the PR0 signal is generated for the final developing cycle, and transmitting the cycle out command to the IIT, thereby causing the lamp to be turned off, and, in response to this, the IIT ready command comes transmitted to the system.

When the system receives this IIT ready command, the system transmits the initialize command 532 to the IIT, thereby causing the carriage of the IIT to be initialized. When this initializing operation is completed, the system receives the IIT ready command 533 transmitted to it. Also, when the job delivered command 534, which indicates that the final sheet of paper for the job has been discharged, and the IOT standby command 535, which indicates that the MCB has come to a stop, the system informs the IPS, by the M/C stop command 536, that the MCB has stopped, and the system then transmits the job status command 538 to the U/I, thereby causes the job to be finished, when the AND condition is fulfilled for the IIT ready command 533, the IOT standby command 535, and the LIP ready command 537. Then, the system transmits the M/C status command 539 to the U/I, rewriting the state from "cycle" to "standby" and finishing the job.

As described hereinabove, the state control system according to the present invention is so designed that the modules of the system are divided into states and that the modules of the system are set in their correspondence to the individual states, with one of the said modules being activated to perform control over each state and the activated module performing the shifting of the state when the condition for the finish of the current state is fulfilled. Hence, even if any change is made of one module, it does not affect any other module, and it is therefore possible for this system to accept the modifications, etc. of its specifications. Furthermore, since this invention has rendered it unnecessary to operate with a system which performs constant monitoring on the entire states, it is possible to prevent the corpulence of just one system, and this feature proves very effective for programming or as a measure for debugging.

What is claimed is:

1. An apparatus having a sequence of processing operations divided into a plurality of states including an initializing state, for setting parameters of said apparatus to initial values a standby state, for readying said apparatus to accept commands from a user a setup state, for setting up said apparatus to perform image processing operations a cycle state, for performing image processing operations and a diagnostic state, with jobs specified for performance in each of the states, and having a state for diagnosing faults in said apparatus control system for controlling the plurality of states of the apparatus, comprising:

an image input terminal for accepting input image information;

an image processing system for performing image processing operations on the input image information;

a user interface for allowing a user to communicate with said apparatus;

memory means for storing a current state of said apparatus;

state control means for rewriting said current stage stored in said memory means and making a transition to a next state on condition that the jobs in the current state have been completed, said state control means further including means for receiving a token pass from a master control board in said apparatus, said token pass acting to transfer mastering authority over the user interface from the master control board to said state control means;

means for receiving an image input terminal ready command transmitted from the image input terminal upon completion of an initialization of said image input terminal, said image input terminal ready command indicating that the parameters of the image input terminal have been set to their initial values;

means for receiving an initialization end command transmitted from the image processing system upon completion of an initialization of the image processing system, said initialization end command indicating that the parameters of the image processing system have been set to their initial values; and means for making a transition from the initializing state to the standby state when the token pass, image input terminal ready command, and initialization end command have been received by the state control means.

2. An apparatus according to claim 1, wherein said state control means includes a plurality of modules capable of being individually activated by the system, each module controlling the processing operations of a corresponding one of said plurality of states.

3. An apparatus according to claim 2, further comprising:

a monitor controlling said plurality of modules;

wherein said memory means for storing said current state is a shared RAM used in common for said monitor and the individual modules under control of the monitor, and said states are written by said state control means as their respective state numbers corresponding to the state into the shared RAM.

4. An apparatus according to claim 3, wherein said state numbers are written by the state control means in an area of the shared RAM adjacent to RAM areas exclusively used by the monitor and the individual modules under control of the monitor.

5. An apparatus according to claim 2, wherein said rewriting of the current state is performed by a currently activated module, said currently activated module thereafter activating another module corresponding to the rewritten state.

6. An apparatus according to claim 1, wherein controlling authority for performing control over the entirety of a given state and mastering authority over a user interface are given to the state control means by a master control board in said apparatus upon completion of a power-on state.

7. An apparatus according to claim 1, wherein the state control means distributes parameters stored in a non-volatile memory to an image input terminal and an image processing system in the initializing state.

8. An apparatus according to claim 1, wherein the state control means transmits a status command to a system user interface after the state control means has received a subsystem status command and a feeder status command from a master control board in the standby state, so as to make it possible for said user interface to accept a start key.

9. An apparatus according to claim 1, wherein the state control means effects a transition from the standby state to the setup state upon reception of a start copying command from a system user interface.

10. An apparatus according to claim 1, wherein the state control means transmits a copy scanning start command for specifying such parameters as that of a scanning length to an image input terminal, a scanning information command for specifying a type of scanning to an image processing system, and a basic copying mode command for specifying such copying modes as those of a paper size and a color cycle.

11. An apparatus according to claim 10, wherein the state control section additionally transmits an editing mode command in case that an editing mode is selected.

12. An apparatus according to claim 1, wherein the state control section transmits an image input terminal ready command, together with a start copying command, to a master control board, in a manual basic mode.

13. An apparatus according to claim 12, wherein the state control means transmits the image input terminal ready command to the master control board at the time of transition from the setup state to the cycle state in any mode other than the manual basic mode.

14. An apparatus according to claim 1, wherein the state control section transmits a cycle out command to an image input terminal so as to turn off a lamp even if there is any subsequent scanning operation, and transmits a stop command to an image processing system so as to make the image processing system shut down, when a final scanning operation for an original sheet is finished.

15. An apparatus according to claim 1, wherein the state control section makes a transition from the cycle state to the standby state upon reception of an image input terminal ready command in response to a cycle out command, an image processing system ready command in response to a stop command, and an image output terminal standby command which notifies that a master control board has come to a stop.

16. An apparatus according to claim 3, wherein at the time of a power-on operation said monitor conducts a RAM test which clears to zero an area of the RAM, including the area in which said state numbers are written, thereby initializing said current state.

17. A state control system for controlling an apparatus whose processing operations are divided into a plurality of states, each state having a plurality of jobs to be performed in that state, comprising:
a memory for storing a current state of said apparatus;
a plurality of modules having a one-to-one correspondence with said plurality of states, each module capable of being individually activated by the system, each module also controlling the processing operations of a corresponding one of said plurality of states and being capable of passing independent judgment on the commands received during its corresponding state, wherein one of said plurality of modules is a currently activated module controlling said current state of said apparatus, and said currently activated module corresponds to said current state stored in said memory;
means for determining when all jobs in said current state have been completed; and
means, within said currently activated module, for rewriting said current state in said memory and effecting a transition from said current state to a next state on a condition that all jobs have been completed in said current state.

18. A state control system according to claim 17, further comprising:
a user interface;
system control unit means for controlling a first set of functions of said apparatus;
master control board means for controlling a second set of functions of said apparatus;
wherein said system control unit means includes means for performing control over the entirety of a given state and mastering authority over said user interface during a first plurality of said processing operations of said apparatus and said master control board means includes means for performing control over the entirety of a given state and mastering authority over said user interface during a second plurality of said processing operations of said apparatus.

19. A method for performing state control of an apparatus in which processing operations are divided into a plurality of states, each state having a plurality of jobs to be performed in that state, said method comprising the steps of:
storing a current state of said apparatus in a memory;
individually activating one of a plurality of modules, said plurality of modules having a one-to-one correspondence with said plurality of states, wherein each module controls the processing operations of a corresponding one of said plurality of states and each module is capable of passing independent judgment on the commands received during its corresponding state, and wherein the module currently activated corresponds to said current state stored in said memory;
determining when all jobs in said current state have been completed; and
rewriting said current state in said memory and effecting a transition from said current state to a next state on a condition that all jobs have been completed in said current state.

* * * * *

UNITED STATES PATENT AND TRADEMARK OFFICE
CERTIFICATE OF CORRECTION

PATENT NO. : 5,276,875
DATED : January 04, 1994
INVENTOR(S) : Yoshiaki SATOH

It is certified that error appears in the above-indentified patent and that said Letters Patent is hereby corrected as shown below:

Claim 1, column 37, line 57, after "state", delete ","
   line 58, after "values", insert --,--, and after "state", delete ",";
   line 59 after "user", insert --,--, and delete "," after "state";
   line 61, after "operations", insert --,--, and delete "," after "state";
   line 62, after "state", delete "," and insert --for diagnosing faults in said apparatus--;
   line 64, delete "for diagnosing faults in said apparatus".

Claim 3, column 38, line 51, "state" should read --states--.

Claim 11, column 39, line 26, "section" should read --means--.

Claim 12, column 39, line 29, "section" should read --means--.

Claim 14, column 39, line 40, "section" should read --means--.

UNITED STATES PATENT AND TRADEMARK OFFICE
CERTIFICATE OF CORRECTION

PATENT NO. : 5,276,875
DATED : January 04, 1994
INVENTOR(S) : Yoshiaki SATOH

It is certified that error appears in the above-indentified patent and that said Letters Patent is hereby corrected as shown below:

Claim 15, column 39, line 48, "section" should read --means--.

Claim 17, column 40, line 3, delete "a" (first occurence), and after "memory", insert --means--.

Signed and Sealed this

Second Day of May, 1995

Attest:

BRUCE LEHMAN

*Attesting Officer*     *Commissioner of Patents and Trademarks*